United States Patent
Yeh et al.

(10) Patent No.: US 12,481,132 B2
(45) Date of Patent: Nov. 25, 2025

(54) IMAGING LENS SYSTEM, IMAGE CAPTURING UNIT AND ELECTRONIC DEVICE

(71) Applicant: LARGAN PRECISION CO., LTD., Taichung (TW)

(72) Inventors: Kuan-Ting Yeh, Taichung (TW); Chun-Yen Chen, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 360 days.

(21) Appl. No.: 18/136,307

(22) Filed: Apr. 18, 2023

(65) Prior Publication Data
US 2024/0280789 A1    Aug. 22, 2024

(30) Foreign Application Priority Data
Feb. 17, 2023 (TW) .................................. 112105671

(51) Int. Cl.
*G02B 13/00* (2006.01)
*G02B 9/64* (2006.01)
*H04N 23/55* (2023.01)

(52) U.S. Cl.
CPC ............ *G02B 13/0045* (2013.01); *G02B 9/64* (2013.01); *H04N 23/55* (2023.01)

(58) Field of Classification Search
CPC ................................ G02B 13/0045; G02B 9/64
See application file for complete search history.

(56) References Cited

U.S. PATENT DOCUMENTS

| 2018/0188485 A1 | 7/2018 | Fan et al. |
| 2021/0048643 A1 | 2/2021 | Lin et al. |
| 2021/0149156 A1* | 5/2021 | Huh ............... G02B 27/0037 |
| 2021/0239947 A1 | 8/2021 | Geng et al. |
| 2024/0118520 A1* | 4/2024 | Cho ................. G02B 13/18 |

FOREIGN PATENT DOCUMENTS

| CN | 109188662 A | 1/2019 |
| CN | 110376721 A | 10/2019 |
| CN | 110764228 A | 2/2020 |
| CN | 111025575 A | 4/2020 |
| CN | 112748523 A | 5/2021 |

(Continued)

OTHER PUBLICATIONS

TW Office Action dated Dec. 1, 2023 as received in Application No. 112105671.

*Primary Examiner* — Jessica M Merlin
(74) *Attorney, Agent, or Firm* — Maschoff Brennan

(57) ABSTRACT

An imaging lens system includes seven lens elements which are, in order from an object side to an image side along an optical path, a first lens element through a seventh lens element. Each of the seven lens elements has an object-side surface facing toward the object side and an image-side surface facing toward the image side. The image-side surface of the sixth lens element is concave in a paraxial region thereof. The object-side surface of the seventh lens element is concave in a paraxial region thereof. At least one of the object-side surface and the image-side surface of at least one of the seven lens elements has at least one inflection point in an off-axis region thereof.

24 Claims, 26 Drawing Sheets

(56) References Cited

FOREIGN PATENT DOCUMENTS

| | | | | |
|---|---|---|---|---|
| CN | 112748529 A | | 5/2021 | |
| CN | 112748531 A | * | 5/2021 | ......... G02B 13/0045 |
| JP | 2009251367 A | | 10/2009 | |
| WO | 2021051981 A1 | | 3/2021 | |
| WO | 2021/128144 A1 | | 7/2021 | |

* cited by examiner

IMAGING LENS SYSTEM, IMAGE CAPTURING UNIT AND ELECTRONIC DEVICE

RELATED APPLICATIONS

This application claims priority to Taiwan Application 112105671, filed on Feb. 17, 2023, which is incorporated by reference herein in its entirety.

BACKGROUND

Technical Field

The present disclosure relates to an imaging lens system, an image capturing unit and an electronic device, more particularly to an imaging lens system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging lens system includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

Preferably, the object-side surface of the second lens element is convex in a paraxial region thereof. Preferably, the third lens element has positive refractive power. Preferably, the image-side surface of the sixth lens element is concave in a paraxial region thereof. Preferably, the object-side surface of the seventh lens element is concave in a paraxial region thereof. Preferably, at least one of the object-side surface and the image-side surface of at least one of the seven lens elements has at least one inflection point in an off-axis region thereof.

When a central thickness of the third lens element is CT3, a central thickness of the fifth lens element is CT5, a central thickness of the sixth lens element is CT6, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and an axial distance between the sixth lens element and the seventh lens element is T67, the following conditions are preferably satisfied:

$$3.4 < CT3/T23;$$
$$1.4 < T67/CT6 < 5.5;$$
$$0.98 < T34/T12 < 3.2;$$
$$\text{and } 1.00 < (T45 + T56)/CT5 < 5.50.$$

According to another aspect of the present disclosure, an imaging lens system includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

Preferably, the second lens element has negative refractive power. Preferably, the object-side surface of the sixth lens element is convex in a paraxial region thereof. Preferably, the image-side surface of the sixth lens element is concave in a paraxial region thereof. Preferably, the object-side surface of the seventh lens element is concave in a paraxial region thereof. Preferably, at least one of the object-side surface and the image-side surface of at least one of the seven lens elements has at least one inflection point in an off-axis region thereof.

When a central thickness of the third lens element is CT3, a central thickness of the fifth lens element is CT5, a central thickness of the sixth lens element is CT6, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and an axial distance between the sixth lens element and the seventh lens element is T67, the following conditions are preferably satisfied:

$$3.4 < CT3/T23;$$
$$1.4 < T67/CT6 < 5.5;$$
$$0.98 < T34/T12 < 3.2;$$
$$\text{and } 1.00 < (T45 + T56)/CT5 < 5.50.$$

According to another aspect of the present disclosure, an imaging lens system includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

Preferably, the third lens element has positive refractive power. Preferably, the object-side surface of the sixth lens element is convex in a paraxial region thereof. Preferably, the image-side surface of the sixth lens element is concave in a paraxial region thereof. Preferably, the object-side surface of the seventh lens element is concave in a paraxial region thereof. Preferably, at least one of the object-side surface and the image-side surface of at least one of the seven lens elements has at least one inflection point in an off-axis region thereof.

When a central thickness of the third lens element is CT3, a central thickness of the fifth lens element is CT5, a central thickness of the sixth lens element is CT6, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and an axial distance between the sixth lens element and the seventh lens element is T67, the following conditions are preferably satisfied:

$$3.4 < CT3/T23;$$

$$1.4 < T67/CT6 < 5.5;$$

$$0.85 < T34/T12 < 3.5;$$

$$\text{and } 1.25 < (T45 + T56)/CT5 < 4.50.$$

According to another aspect of the present disclosure, an image capturing unit includes one of the aforementioned imaging system lens assemblies and an image sensor, wherein the image sensor is disposed on an image surface of the imaging lens system.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
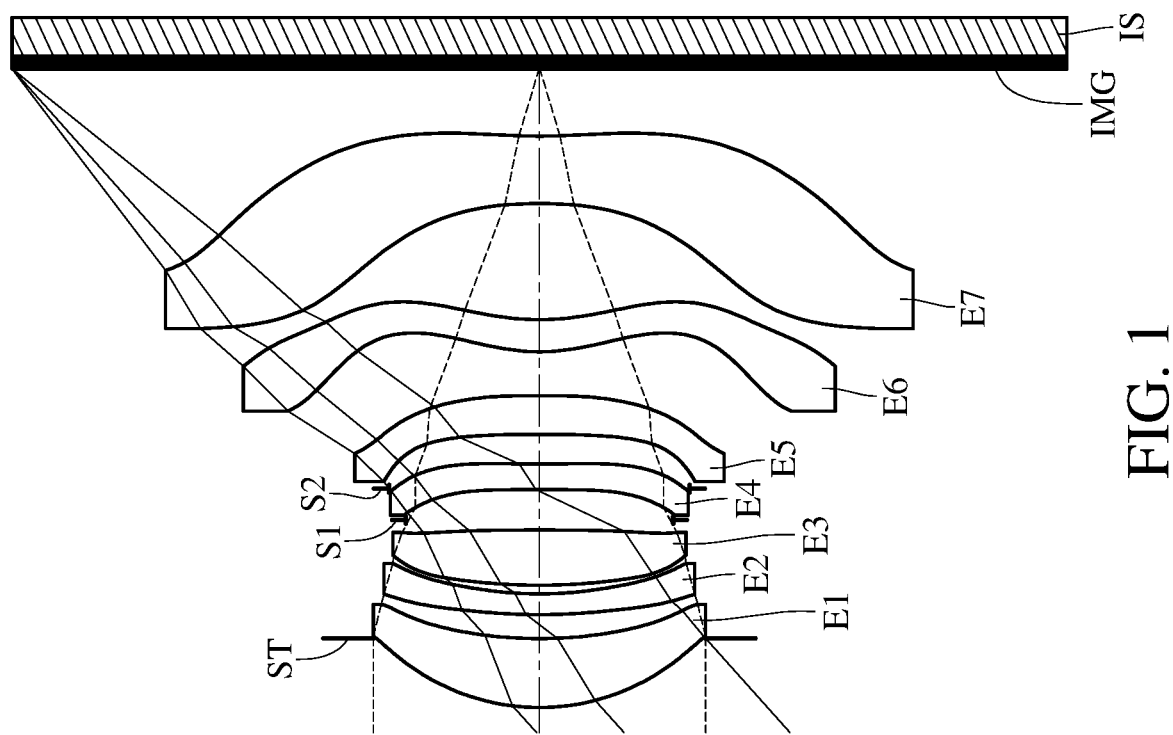
FIG. 1 is a schematic view of an image capturing unit according to the 1st embodiment of the present disclosure.

An imaging lens system includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements of the imaging lens system has an object-side surface facing toward the object side and an image-side surface facing toward the image side.

The first lens element can have positive refractive power. Therefore, it is favorable for reducing the size at the object side of the imaging lens system. The object-side surface of the first lens element can be convex in a paraxial region thereof. Therefore, it is favorable for controlling the traveling direction of light so as to reduce surface reflection of light at the wide field of view. The image-side surface of the first lens element can be concave in a paraxial region thereof. Therefore, it is favorable for adjusting the shape as well as the refractive power of the first lens element so as to reduce the size and correct aberrations.

The second lens element can have negative refractive power. Therefore, it is favorable for balancing aberrations, such as spherical aberration, generated due to compactness. The object-side surface of the second lens element can be convex in a paraxial region thereof. Therefore, it is favorable for controlling the traveling direction of light into the second lens element so as to eliminate stray light. The image-side surface of the second lens element can be concave in a paraxial region thereof. Therefore, it is favorable for adjusting the shape of the second lens element so as to correct aberrations, such as astigmatism.

The third lens element can have positive refractive power. Therefore, it is favorable for adjusting the refractive power distribution of the imaging lens system so as to reduce sensitivity. The object-side surface of the third lens element can be convex in a paraxial region thereof. Therefore, it is favorable for adjusting the shape as well as the refractive power of the third lens element so as to reducing the size at the object side of the imaging lens system.

The object-side surface of the sixth lens element can be convex in a paraxial region thereof. Therefore, it is favorable for adjusting the shape of the sixth lens element so as to correct aberrations. The image-side surface of the sixth lens element can be concave in a paraxial region thereof. Therefore, it is favorable for controlling the traveling direction of light so as to reduce the size at the image side of the imaging lens system.

The seventh lens element can have negative refractive power. Therefore, it is favorable for a proper back focal length of the imaging lens system. The object-side surface of the seventh lens element can be concave in a paraxial region thereof. Therefore, it is favorable for controlling the traveling direction of light so as to enlarge the image surface.

Figure 23:
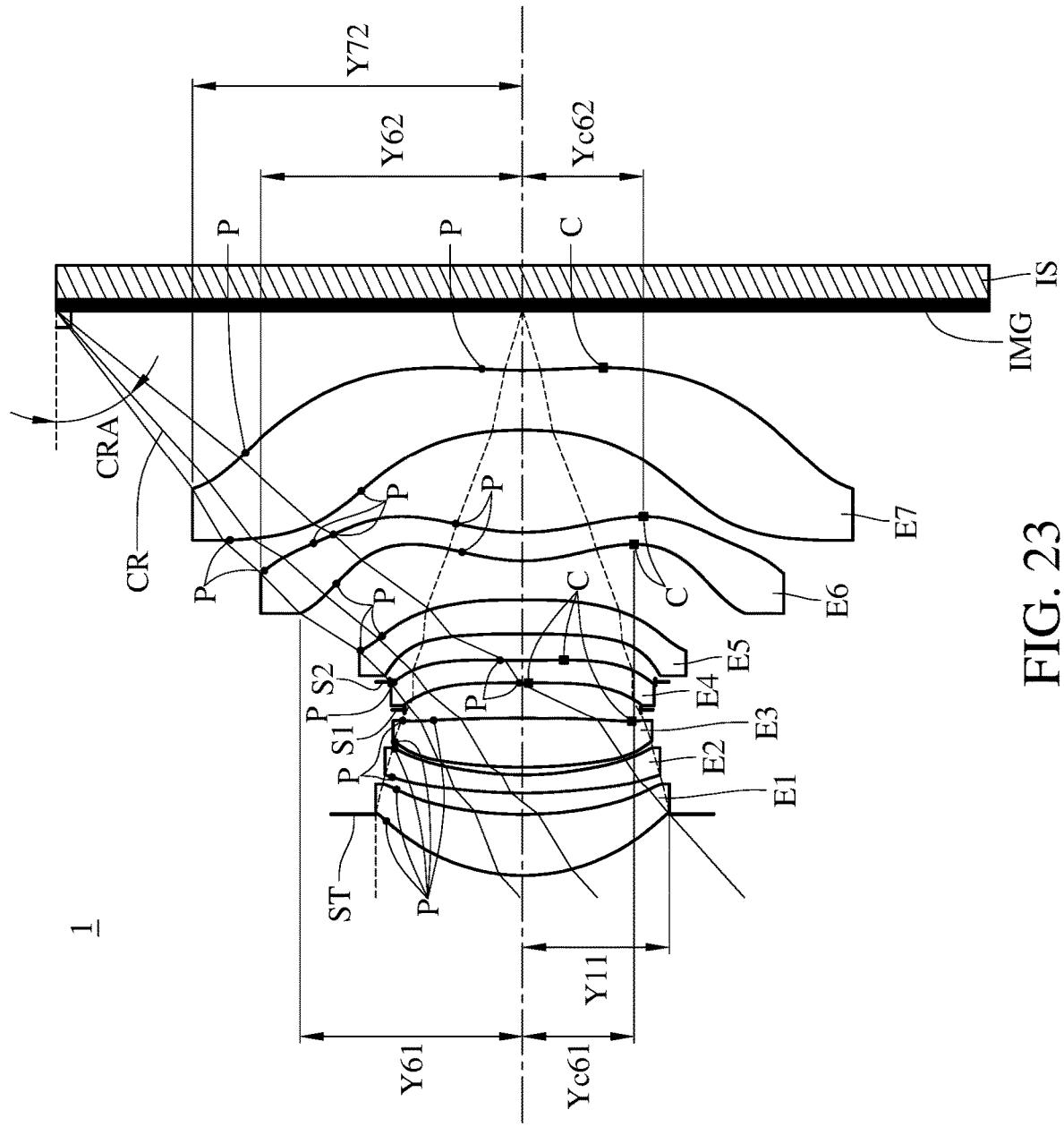
FIG. 23 shows a schematic view of Y11, Y61, Yc61, Y62, Yc62, Y72, CRA, inflection points on some lens surfaces and critical points on some lens surfaces according to the 1st embodiment of the present disclosure.

According to the present disclosure, at least one of the object-side surface and the image-side surface of at least one of the seven lens elements has at least one inflection point in an off-axis region thereof. Therefore, it is favorable for enhancing the variation of the lens surface so as to reduce the size of the lens element and correct aberrations. Moreover, at least one of the object-side surface and the image-side surface of each of at least two of the seven lens elements can have at least one inflection point in an off-axis region thereof. Please refer to FIG. 23 which shows a schematic view of inflection points P on some lens surfaces according to the 1st embodiment of the present disclosure. The abovementioned one or more inflection points P on any lens surface in FIG. 23 are only exemplary. Each of lens surfaces in various embodiments of the present disclosure may also have one or more inflection points.

According to the present disclosure, at least one of the object-side surface and the image-side surface of at least one of the seven lens elements can have at least one critical point in an off-axis region thereof. Therefore, it is favorable for enhancing the variation of the lens surface so as to reduce the size of the imaging lens system and improve image quality. Moreover, the object-side surface of the sixth lens element can have at least one critical point in an off-axis region thereof. Therefore, it is favorable for adjusting the shape of the sixth lens element so as to correct off-axial aberrations, such as field curvature. Moreover, when a vertical distance between the critical point on the object-side surface of the sixth lens element and an optical axis is Yc61, and a maximum effective radius of the object-side surface of the sixth lens element is Y61, the at least one critical point on the object-side surface of the sixth lens element in the off-axis region thereof can satisfy the following condition: $0.20<Yc61/Y61<0.80$. Therefore, it is favorable for further correcting aberrations. Moreover, the image-side surface of the sixth lens element can have at least one critical point in an off-axis region thereof. Therefore, it is favorable for adjusting the shape of the sixth lens element so as to enlarge the image surface and improve image quality at the wide field of view. Moreover, when a vertical distance between the critical point on the image-side surface of the sixth lens element and the optical axis is Yc62, and a maximum effective radius of the image-side surface of the sixth lens element is Y62, the at least one critical point on the image-side surface of the sixth lens element in the off-axis region thereof can satisfy the following condition: $0.20<Yc62/Y62<0.85$. Therefore, it is favorable for further improving image quality. Please refer to FIG. 23 which shows a schematic view of Y61, Yc61, Y62, Yc62, and critical points C on some lens surfaces according to the 1st embodiment of the present disclosure. The abovementioned critical points C on the third lens element E3, the fourth lens element E4, the sixth lens element E6 and the seventh lens element E7 in FIG. 23 are only exemplary. Each of lens surfaces in various embodiments of the present disclosure may also have one or more critical points.

At least one lens element of the imaging lens system can have an average light transmission less than 10% at wavelengths of 700 nanometers (nm) to 1000 nm for infrared filtering. Therefore, it is favorable for a configuration without a space for accommodating filter so as to keep the imaging lens system compact. Moreover, the material of said at least one lens element can include additives provided to absorb infrared light or reflect infrared light. Moreover, a lens surface of said at least one lens element can include a microstructure or be coated with a film provided to absorb infrared light or reflect infrared light. Moreover, the first lens element can have an average light transmission less than 10% at wavelengths of 700 nm to 1000 nm for infrared filtering. Therefore, it is favorable for reducing stray light among the lens elements of the imaging lens system. Moreover, a lens surface of the first lens element can be coated with a film provided to absorb infrared light. Therefore, it is favorable for broad selection of materials of the first lens element.

When a central thickness of the third lens element is CT3, and an axial distance between the second lens element and the third lens element is T23, the following condition is satisfied: $3.4<CT3/T23$. Therefore, it is favorable for the second lens element collaborating with the third lens element so as to reduce the size at the object side of the imaging lens system. Moreover, the following condition can also be satisfied: $3.6<CT3/T23$. Moreover, the following condition can also be satisfied: $3.8<CT3/T23$. Moreover, the following condition can also be satisfied: $CT3/T23<20$. Therefore, it is favorable for the second lens element collaborating with the third lens element so as to reduce the size at the object side of the imaging lens system. Moreover, the following condition can also be satisfied: $CT3/T23<16$. Moreover, the following condition can also be satisfied: $CT3/T23<13$. Moreover, the following condition can also be satisfied: $3.8<CT3/T23<13$.

When an axial distance between the sixth lens element and the seventh lens element is T67, and a central thickness of the sixth lens element is CT6, the following condition is satisfied: $1.4<T67/CT6<5.5$. Therefore, it is favorable for the sixth lens element collaborating with the seventh lens element so as to correct aberrations. Moreover, the following condition can also be satisfied: $1.5<T67/CT6<4.5$.

When an axial distance between the first lens element and the second lens element is T12, and an axial distance between the third lens element and the fourth lens element is T34, the following condition is satisfied: $0.85<T34/T12<3.5$. Therefore, it is favorable for the arrangement of the lens elements at the object side of the imaging lens system so as to reduce the size thereof. Moreover, the following condition can also be satisfied: $0.98<T34/T12<3.2$. Moreover, the following condition can also be satisfied: $1.1<T34/T12<2.9$.

When an axial distance between the fourth lens element and the fifth lens element is T45, an axial distance between the fifth lens element and the sixth lens element is T56, and a central thickness of the fifth lens element is CT5, the following condition is satisfied: $1.00<(T45+T56)/CT5<5.50$. Therefore, it is favorable for the arrangement of the lens elements so as to balance the size distribution of the imaging lens system. Moreover, the following condition can also be satisfied: $1.15<(T45+T56)/CT5<5.00$. Moreover, the following condition can also be satisfied: $1.25<(T45+T56)/CT5<4.50$. Moreover, the following condition can also be satisfied: $1.35<(T45+T56)/CT5<4.00$.

When a focal length of the second lens element is f2, and a focal length of the third lens element is f3, the following condition can be satisfied: $-1.75<f2/f3<-1.10$. Therefore, it is favorable for the second lens element collaborating with the third lens element so as to correct aberrations, such as spherical aberration.

When a focal length of the imaging lens system is f, a focal length of the fourth lens element is f4, a focal length of the fifth lens element is f5, and a focal length of the sixth lens element is f6, the following condition can be satisfied: $|f/f4|+|f/f5|+|f/f6|<1.1$. Therefore, it is favorable for the refractive powers of the lens elements collaborating with one another so as to correct aberrations.

When the focal length of the imaging lens system is f, a curvature radius of the object-side surface of the sixth lens element is R11, and a curvature radius of the image-side surface of the sixth lens element is R12, the following condition can be satisfied: $0<(R11+R12)/f<2.2$. Therefore, it is favorable for adjusting the shape as well as the refractive power of the sixth lens element so as to correct aberrations. Moreover, the following condition can also be satisfied: $0.30<(R11+R12)/f<1.9$.

When a central thickness of the first lens element is CT1, a central thickness of the second lens element is CT2, the central thickness of the third lens element is CT3, and the axial distance between the third lens element and the fourth lens element is T34, the following condition can be satisfied: $2.7<(CT1+CT2+CT3)/T34<9.0$. Therefore, it is favorable for the arrangement of the lens elements at the object side of the imaging lens system so as to reduce the size thereof. Moreover, the following condition can also be satisfied: $3.1<(CT1+CT2+CT3)/T34<7.0$.

When an f-number of the imaging lens system is Fno, the following condition can be satisfied: $1.4<Fno<2.0$. Therefore, it is favorable for obtaining a balance between the requirements on the illuminance and the depth of field.

When half of a maximum field of view of the imaging lens system is HFOV, the following condition can be satisfied: $35.0$ degrees$<HFOV<50.0$ degrees. Therefore, it is favorable for enlarging the field of view and preventing aberrations such as distortion caused by an overly wide field of view.

When a maximum image height of the imaging lens system (which can be half of a diagonal length of an effective photosensitive area of an image sensor) is ImgH, and an axial distance between the image-side surface of the seventh lens element and the image surface is BL, the following condition can be satisfied: $6.5<ImgH/BL<15$. Therefore, it is favorable for obtaining a balance between the requirements of a large image surface and a short back focal length.

When a curvature radius of the object-side surface of the first lens element is R1, a curvature radius of the image-side surface of the first lens element is R2, and a focal length of the first lens element is f1, the following condition can be satisfied: $0.75<(R1+R2)/f1<1.2$. Therefore, it is favorable for adjusting the shape as well as the refractive power of the first lens element so as to reduce size and correct aberrations.

When a minimum value among the axial distance between the third lens element and the fourth lens element, the axial distance between the fourth lens element and the fifth lens element, the axial distance between the fifth lens element and the sixth lens element and the axial distance between the sixth lens element and the seventh lens element is minT37, and a minimum value among a central thickness of the fourth lens element, the central thickness of the fifth lens element and the central thickness of the sixth lens element is minCT46, the following condition can be satisfied: $0.75<minT37/minCT46<1.6$. Therefore, it is favorable for the arrangement of the lens elements so as to balance the size distribution of the imaging lens system.

When the curvature radius of the image-side surface of the first lens element is R2, and a curvature radius of the object-side surface of the second lens element is R3, the following condition can be satisfied: $0.20<R2/R3<1.3$. Therefore, it is favorable for the first lens element collaborating with the second lens element so as to reduce the outer diameter at the object side of the imaging lens system. Moreover, the following condition can also be satisfied: $0.40<R2/R3<1.1$.

When a curvature radius of the image-side surface of the second lens element is R4, and a curvature radius of the object-side surface of the third lens element is R5, the following condition can be satisfied: $0.90<R5/R4<2.1$. Therefore, it is favorable for the second lens element collaborating with the third lens element so as to correct aberrations.

When a composite focal length of the second lens element and the third lens element is f23, and the focal length of the imaging lens system is f, the following condition can be satisfied: $4.0<f23/f<11$. Therefore, it is favorable for adjusting the refractive powers of the second lens element and the third lens element so as to reduce the size and correct aberrations.

When an Abbe number of the first lens element is V1, an Abbe number of the second lens element is V2, and an Abbe number of the third lens element is V3, the following condition can be satisfied: $5.0<(V1+V3)/V2<7.0$. Therefore, it is favorable for the materials of the lens elements so as to correct chromatic aberration.

When an axial distance between the object-side surface of the first lens element and the image surface is TL, and the maximum image height of the imaging lens system is ImgH, the following condition can be satisfied: $0.80<TL/ImgH<1.4$. Therefore, it is favorable for obtaining a balance between the requirements of a short total track length and a large image surface.

When a chief ray angle at the maximum image height of the imaging lens system is CRA, the following condition can be satisfied: $38.0$ degrees$<CRA<50.0$ degrees. Therefore, it is favorable for obtaining a proper balance between the back focal length, the size of the image surface as well as the image-sensing efficiency of the image sensor. Please refer to FIG. 23 which shows a schematic view of CRA according to the 1st embodiment of the present disclosure. A chief ray CR is projected onto the maximum image height position on the image surface IMG, and CRA is an angle between the normal direction of the image surface IMG and the chief ray CR.

When a curvature radius of the object-side surface of the seventh lens element is R13, and a focal length of the seventh lens element is f7, the following condition can be satisfied: 0.10<R13/f7<1.7. Therefore, it is favorable for adjusting the shape as well as the refractive power of the seventh lens element so as to correct aberrations and enlarge image surface. Moreover, the following condition can also be satisfied: 0.20<R13/f7<1.4. Moreover, the following condition can also be satisfied: 0.30<R13/f7<1.1.

When a maximum effective radius of the object-side surface of the first lens element is Y11, and a maximum effective radius of the image-side surface of the seventh lens element is Y72, the following condition can be satisfied: 1.5<Y72/Y11<4.0. Therefore, it is favorable for controlling the traveling direction of light so as to obtain a proper balance between the field of view, the size distribution and the size of the image surface. Moreover, the following condition can also be satisfied: 1.8<Y72/Y11<3.4. Please refer to FIG. 23 which shows a schematic view of Y11 and Y72 according to the 1st embodiment of the present disclosure.

According to the present disclosure, the aforementioned features and conditions can be utilized in numerous combinations so as to achieve corresponding effects.

According to the present disclosure, the lens elements of the imaging lens system can be made of either glass or plastic material. When the lens elements are made of glass material, the refractive power distribution of the imaging lens system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the imaging lens system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the imaging lens system, based on the corresponding image sensor, can be flat or curved, especially a curved surface being concave facing towards the object side of the imaging lens system.

According to the present disclosure, an image correction unit, such as a field flattener, can be optionally disposed between the lens element closest to the image side of the imaging lens system along the optical path and the image surface for correction of aberrations such as field curvature. The optical characteristics of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 24:
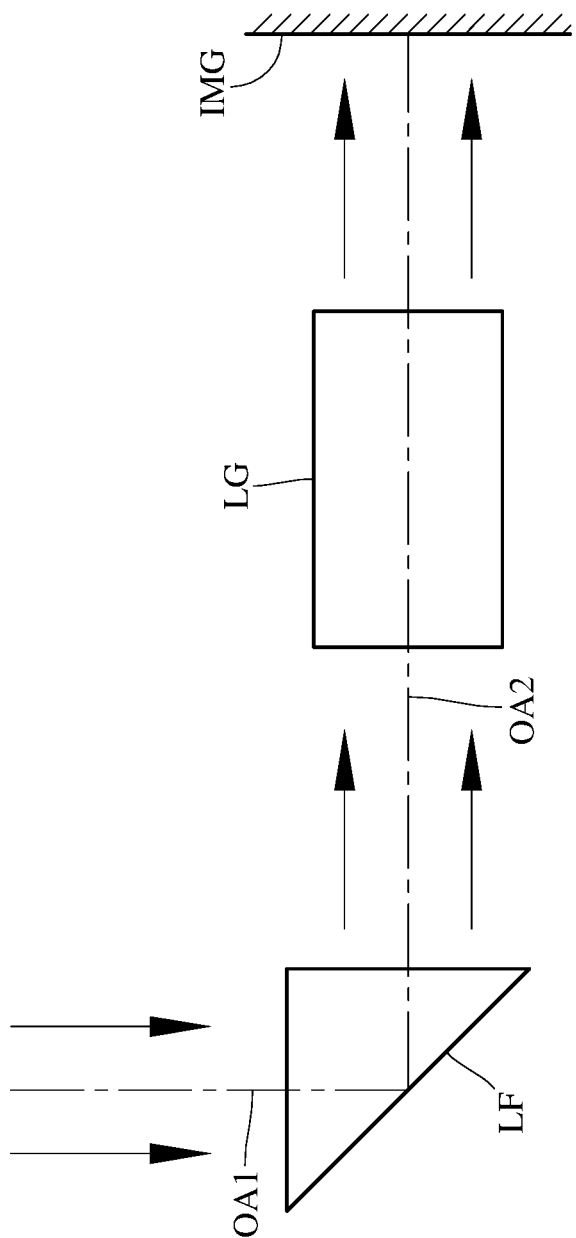
FIG. 24 shows a schematic view of a configuration of one light-folding element in an imaging lens system according to one embodiment of the present disclosure.
Figure 25:
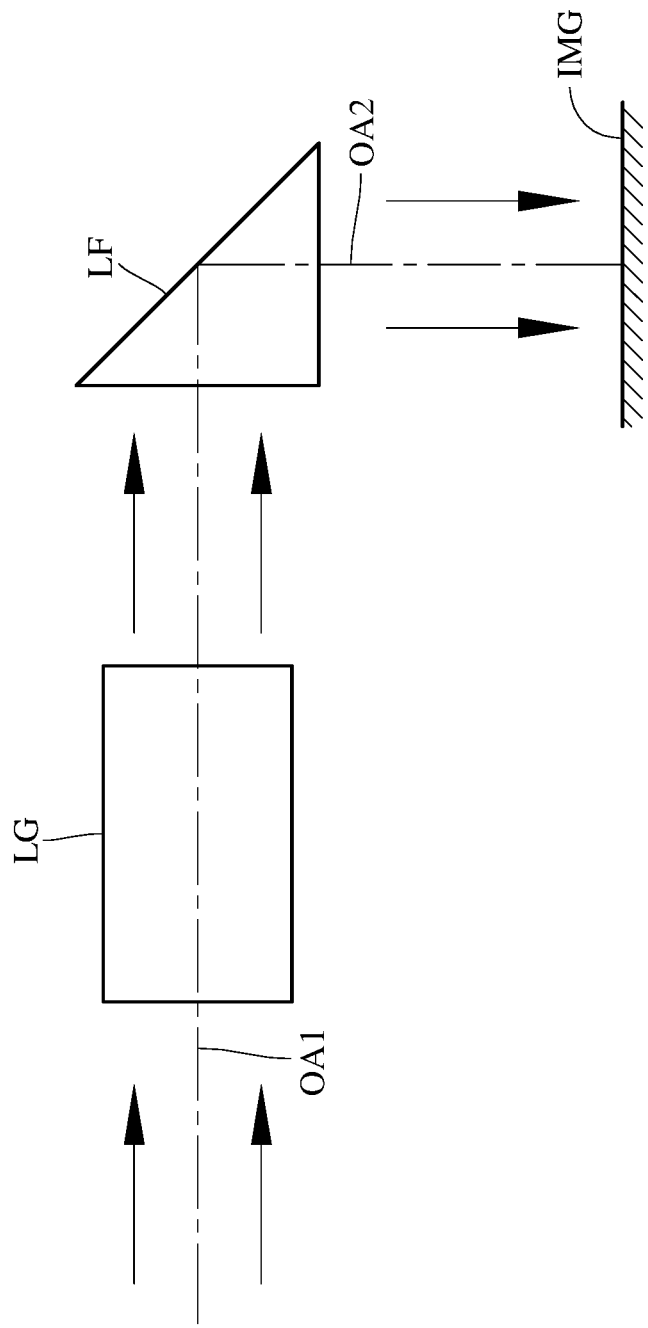
FIG. 25 shows a schematic view of another configuration of one light-folding element in an imaging lens system according to one embodiment of the present disclosure.
Figure 26:
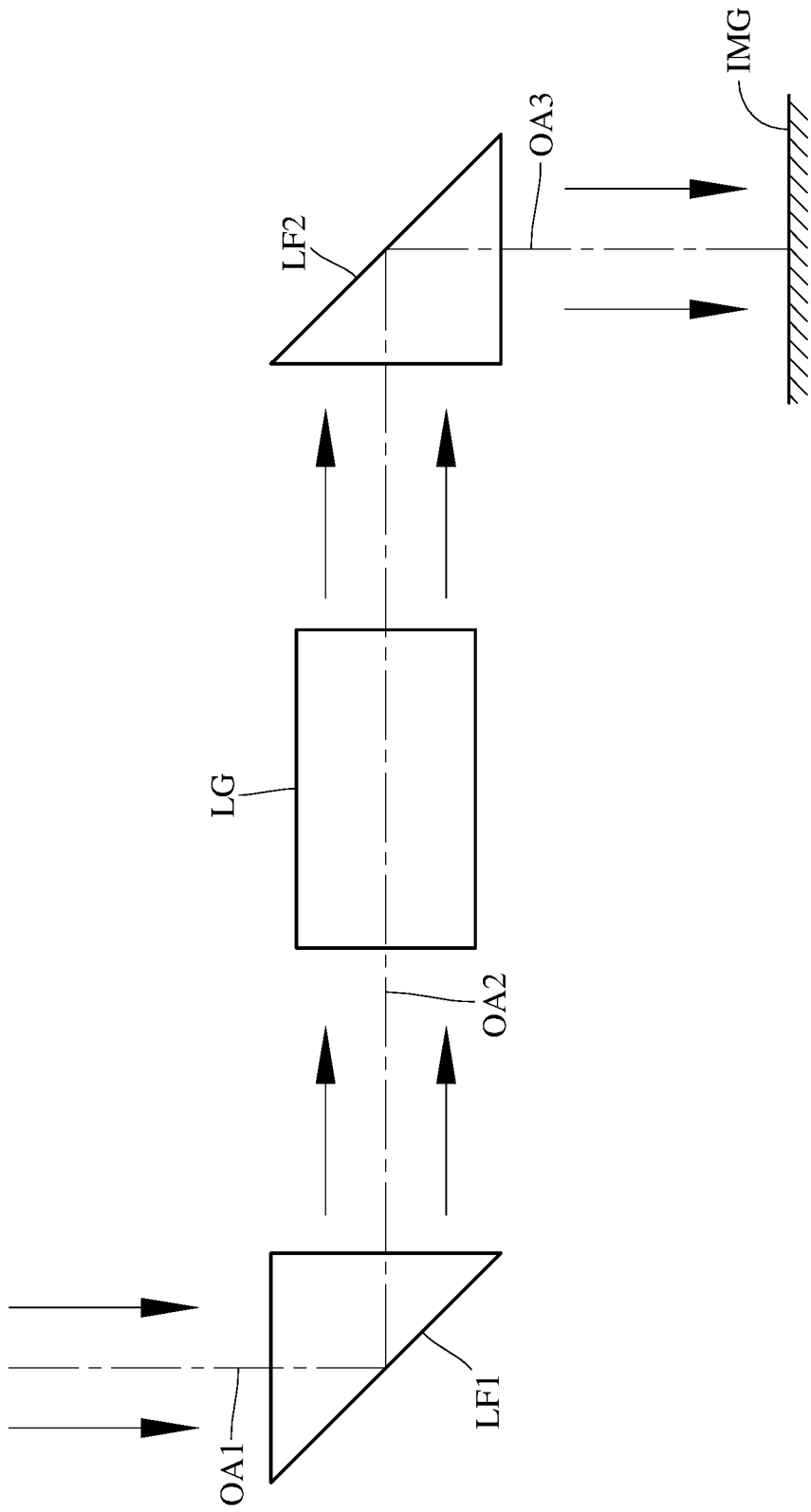
FIG. 26 shows a schematic view of a configuration of two light-folding elements in an imaging lens system according to one embodiment of the present disclosure.

According to the present disclosure, at least one light-folding element, such as a prism or a mirror, can be optionally disposed between an imaged object and the image surface on the imaging optical path, and the surface shape of the prism or mirror can be planar, spherical, aspheric or freeform surface, such that the imaging lens system can be more flexible in space arrangement, and therefore the dimensions of an electronic device is not restricted by the total track length of the imaging lens system. Specifically, please refer to FIG. 24 and FIG. 25. FIG. 24 shows a schematic view of a configuration of one light-folding element in an imaging lens system according to one embodiment of the present disclosure, and FIG. 25 shows a schematic view of another configuration of one light-folding element in an imaging lens system according to one embodiment of the present disclosure. In FIG. 24 and FIG. 25, the imaging lens system can have, in order from an imaged object (not shown in the figures) to an image surface IM along an optical path, a first optical axis OA1, a light-folding element LF and a second optical axis OA2. The light-folding element LF can be disposed between the imaged object and a lens group LG of the imaging lens system as shown in FIG. 24, or disposed between a lens group LG of the imaging lens system and the image surface IM as shown in FIG. 25. Furthermore, please refer to FIG. 26, which shows a schematic view of a configuration of two light-folding elements in an imaging lens system according to one embodiment of the present disclosure. In FIG. 26, the imaging lens system can have, in order from an imaged object (not shown in the figure) to an image surface IM along an optical path, a first optical axis OA1, a first light-folding element LF1, a second optical axis OA2, a second light-folding element LF2 and a third optical axis OA3. The first light-folding element LF1 is disposed between the imaged object and a lens group LG of the imaging lens system, the second light-folding element LF2 is disposed between the lens group LG of the imaging lens system and the image surface IM. The imaging lens system can be optionally provided with three or more light-folding elements, and the present disclosure is not limited to the type, amount and position of the light-folding elements of the embodiments disclosed in the aforementioned figures.

According to the present disclosure, the imaging lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging lens system and thereby provides a wider field of view for the same.

According to the present disclosure, the imaging lens system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the imaging lens system can include one or more optical elements for limiting the form of light passing through the imaging lens system. Each optical element can be, but not limited to, a filter, a polarizer, etc., and each optical element can be, but not limited to, a single-piece element, a composite component, a thin film, etc. The optical element can be located at the object side or the image side of the imaging lens system or between any two adjacent lens elements so as to allow light in a specific form to pass through, thereby meeting application requirements.

According to the present disclosure, the imaging lens system can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element, a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the object side and image side are defined in accordance with the direction of the optical axis, and the axial optical data are calculated along the optical axis. Furthermore, if the optical axis is folded by a light-folding element, the axial optical data are also calculated along the folded optical axis.

According to the above description of the present disclosure, the following specific embodiments are provided for further explanation.

1st Embodiment

Figure 2:
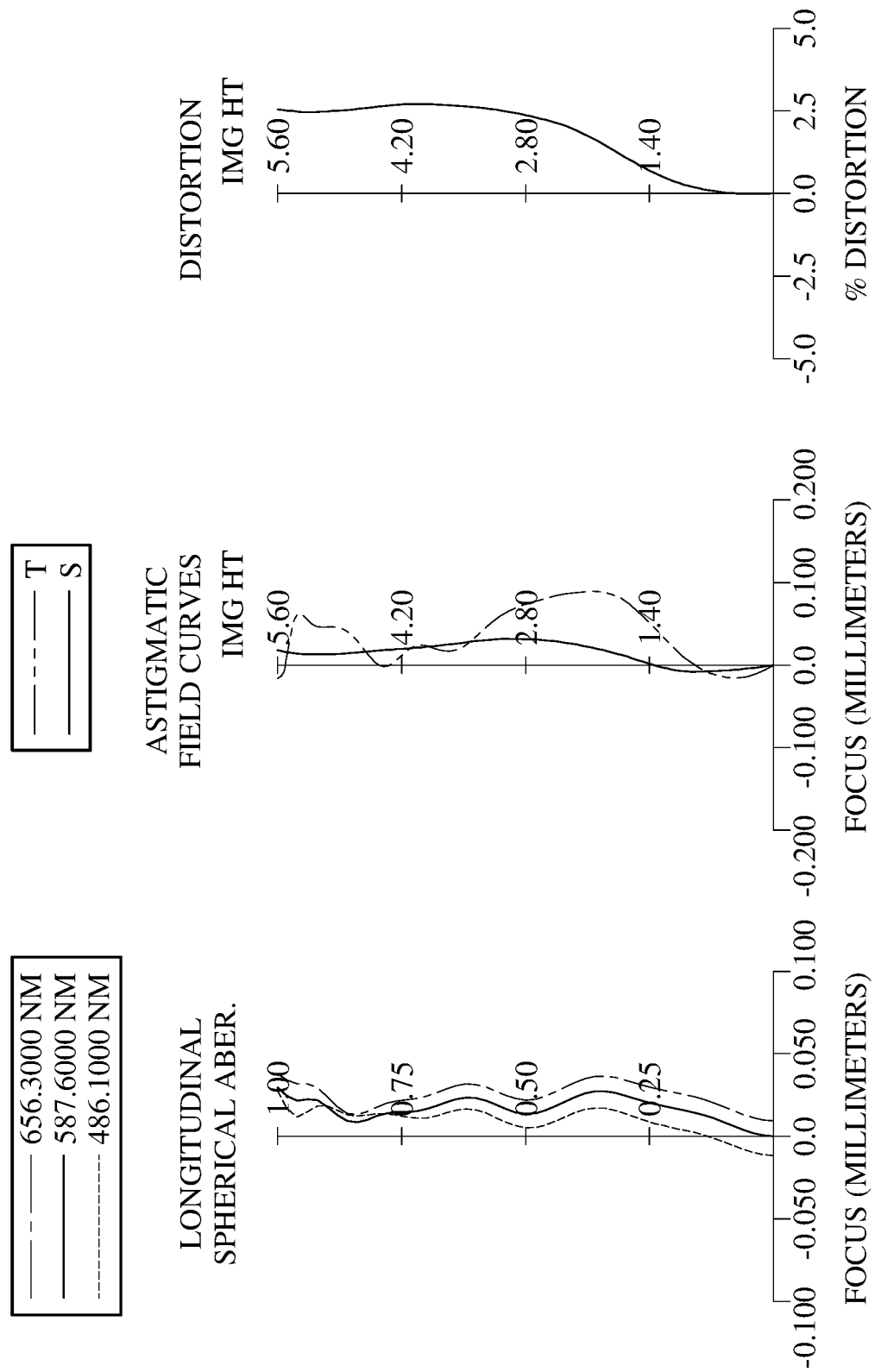
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes an imaging lens system (its reference numeral is omitted) of the present disclosure and an image sensor IS. The imaging lens system includes, in order from an object side to an image side along an optical path, an aperture stop ST, a first lens element E1, a second lens element E2, a third lens element E3, a stop S1, a fourth lens element E4, a stop S2, a fifth lens element E5, a sixth lens element E6, a seventh lens element E7 and an image surface IMG. The imaging lens system includes seven lens elements (E1, E2, E3, E4, E5, E6 and E7) with no additional lens element disposed between each of the adjacent seven lens elements.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric. The object-side surface of the first lens element E1 has one inflection point in an off-axis region thereof. The image-side surface of the first lens element E1 has one inflection point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point in an off-axis region thereof. The image-side surface of the second lens element E2 has one inflection point in an off-axis region thereof.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has one inflection point in an off-axis region thereof. The image-side surface of the third lens element E3 has two inflection points in an off-axis region thereof. The image-side surface of the third lens element E3 has one critical point in an off-axis region thereof.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point in an off-axis region thereof. The image-side surface of the fourth lens element E4 has two inflection points in an off-axis region thereof. The object-side surface of the fourth lens element E4 has one critical point in an off-axis region thereof. The image-side surface of the fourth lens element E4 has one critical point in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The image-side surface of the fifth lens element E5 has two inflection points in an off-axis region thereof.

The sixth lens element E6 with positive refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points in an off-axis region thereof. The image-side surface of the sixth lens element E6 has four inflection points in an off-axis region thereof. The object-side surface of the sixth lens element E6 has one critical point in an off-axis region thereof. The image-side surface of the sixth lens element E6 has one critical point in an off-axis region thereof.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The object-side surface of the seventh lens element E7 has two inflection points in an off-axis region thereof. The image-side surface of the seventh lens element E7 has two inflection points in an off-axis region thereof. The image-side surface of the seventh lens element E7 has one critical point in an off-axis region thereof.

In this embodiment, the first lens element E1 has an average light transmission less than 10% at wavelengths of 700 nm to 1000 nm for infrared filtering. For example, a lens surface of the first lens element can be coated with a film configured to absorb infrared light. The image sensor IS is disposed on or near the image surface IMG of the imaging lens system.

The equation of the aspheric surface profiles of the aforementioned lens elements of the 1st embodiment is expressed as follows:

$$X(Y) = (Y^2/R)/(1 + sqrt(1 - (1+k)\times(Y/R)^2)) + \sum_i (Ai)\times(Y^i),$$

where,
X is the displacement in parallel with the optical axis from an axial vertex on the aspheric surface to a point at a distance of Y from the optical axis on the aspheric surface;
Y is the vertical distance from the point on the aspheric surface to the optical axis;
R is the curvature radius;
k is the conic coefficient; and
Ai is the i-th aspheric coefficient, and in the embodiments, i may be, but is not limited to, 4, 6, 8, 10, 12, 14, 16, 18, 20, 22, 24, 26, 28 and 30.

In the imaging lens system of the image capturing unit 1 according to the 1st embodiment, when a focal length of the imaging lens system is f, an f-number of the imaging lens system is Fno, and half of a maximum field of view of the imaging lens system is HFOV, these parameters have the following values: f=6.07 millimeters (mm), Fno=1.72, and HFOV=41.9 degrees (deg.).

When an Abbe number of the first lens element E1 is V1, an Abbe number of the second lens element E2 is V2, and an Abbe number of the third lens element E3 is V3, the following condition is satisfied: (V1+V3)/V2=6.38.

When a central thickness of the first lens element E1 is CT1, a central thickness of the second lens element E2 is CT2, a central thickness of the third lens element E3 is CT3, and an axial distance between the third lens element E3 and the fourth lens element E4 is T34, the following condition is satisfied: (CT1+CT2+CT3)/T34=3.59. In this embodiment, an axial distance between two adjacent lens elements is a distance in a paraxial region between two adjacent lens surfaces of the two adjacent lens elements.

When an axial distance between the fourth lens element E4 and the fifth lens element E5 is T45, an axial distance between the fifth lens element E5 and the sixth lens element E6 is T56, and a central thickness of the fifth lens element E5 is CT5, the following condition is satisfied: (T45+T56)/CT5=1.90.

When the central thickness of the third lens element E3 is CT3, and an axial distance between the second lens element E2 and the third lens element E3 is T23, the following condition is satisfied: CT3/T23=6.38.

When a minimum value among the axial distance between the third lens element E3 and the fourth lens element E4, the axial distance between the fourth lens element E4 and the fifth lens element E5, the axial distance between the fifth lens element E5 and the sixth lens element E6 and an axial distance between the sixth lens element E6 and the seventh lens element E7 is minT37, and a minimum value among a central thickness of the fourth lens element E4, the central thickness of the fifth lens element E5 and a central thickness of the sixth lens element E6 is minCT46, the following condition is satisfied: minT37/minCT46=1.15. In this embodiment, minT37 is equal to the axial distance between the fourth lens element E4 and the fifth lens element E5, and minCT46 is equal to the central thickness of the fourth lens element E4.

When an axial distance between the first lens element E1 and the second lens element E2 is T12, and the axial distance between the third lens element E3 and the fourth lens element E4 is T34, the following condition is satisfied: T34/T12=1.68.

When the axial distance between the sixth lens element E6 and the seventh lens element E7 is T67, and the central thickness of the sixth lens element E6 is CT6, the following condition is satisfied: T67/CT6=3.61.

When an axial distance between the object-side surface of the first lens element E1 and the image surface IMG is TL, and a maximum image height of the imaging lens system is ImgH, the following condition is satisfied: TL/ImgH=1.21.

When a curvature radius of the object-side surface of the first lens element E1 is R1, a curvature radius of the image-side surface of the first lens element E1 is R2, and a focal length of the first lens element E1 is f1, the following condition is satisfied: (R1+R2)/f1=0.96.

When the focal length of the imaging lens system is f, a curvature radius of the object-side surface of the sixth lens element E6 is R11, and a curvature radius of the image-side surface of the sixth lens element E6 is R12, the following condition is satisfied: (R11+R12)/f=0.77.

When a curvature radius of the object-side surface of the seventh lens element E7 is R13, and a focal length of the seventh lens element E7 is f7, the following condition is satisfied: R13/f7=0.99.

When the curvature radius of the image-side surface of the first lens element E1 is R2, and a curvature radius of the object-side surface of the second lens element E2 is R3, the following condition is satisfied: R2/R3=0.75.

When a curvature radius of the image-side surface of the second lens element E2 is R4, and a curvature radius of the object-side surface of the third lens element E3 is R5, the following condition is satisfied: R5/R4=1.64.

When the focal length of the imaging lens system is f, a focal length of the fourth lens element is f4, a focal length of the fifth lens element is f5, and a focal length of the sixth lens element is f6, the following condition is satisfied: |f/f4|+|f/f5|+|f/f6|=0.83.

When a focal length of the second lens element E2 is f2, and a focal length of the third lens element E3 is f3, the following condition is satisfied: f2/f3=−1.60.

When a composite focal length of the second lens element E2 and the third lens element E3 is f23, and the focal length of the imaging lens system is f, the following condition is satisfied: f23/f=4.63.

When a chief ray angle at the maximum image height of the imaging lens system is CRA, the following condition is satisfied: CRA=41.6 degrees.

When the maximum image height of the imaging lens system is ImgH, and an axial distance between the image-side surface of the seventh lens element E7 and the image surface IMG is BL, the following condition is satisfied: ImgH/BL=7.84.

When a maximum effective radius of the object-side surface of the first lens element E1 is Y11, and a maximum effective radius of the image-side surface of the seventh lens element E7 is Y72, the following condition is satisfied: Y72/Y11=2.25.

When a vertical distance between the critical point on the object-side surface of the sixth lens element E6 and the optical axis is Yc61, and a maximum effective radius of the object-side surface of the sixth lens element E6 is Y61, the following condition is satisfied: Yc61/Y61=0.50.

When a vertical distance between the critical point on the image-side surface of the sixth lens element E6 and the optical axis is Yc62, and a maximum effective radius of the image-side surface of the sixth lens element E6 is Y62, the following condition is satisfied: Yc62/Y62=0.46.

The detailed optical data of the 1st embodiment are shown in Table 1A and the aspheric surface data are shown in Table 1B below.

TABLE 1A

1st Embodiment
f = 6.07 mm, Fno = 1.72, HFOV = 41.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.736 | | | | |
| 2 | Lens 1 | 2.3402 | (ASP) | 0.733 | Glass | 1.589 | 61.2 | 7.22 |
| 3 | | 4.5976 | (ASP) | 0.255 | | | | |
| 4 | Lens 2 | 6.1099 | (ASP) | 0.221 | Plastic | 1.686 | 18.4 | −16.59 |
| 5 | | 3.9172 | (ASP) | 0.092 | | | | |
| 6 | Lens 3 | 6.4062 | (ASP) | 0.587 | Plastic | 1.544 | 56.0 | 10.37 |
| 7 | | −45.6859 | (ASP) | 0.106 | | | | |
| 8 | Stop | Plano | | 0.323 | | | | |
| 9 | Lens 4 | 692.6119 | (ASP) | 0.273 | Plastic | 1.686 | 18.4 | −23.96 |
| 10 | | 16.0573 | (ASP) | −0.263 | | | | |
| 11 | Stop | Plano | | 0.578 | | | | |
| 12 | Lens 5 | −38.3167 | (ASP) | 0.412 | Plastic | 1.587 | 28.3 | 78.87 |
| 13 | | −21.0516 | (ASP) | 0.466 | | | | |
| 14 | Lens 6 | 1.9960 | (ASP) | 0.342 | Plastic | 1.562 | 44.6 | 12.12 |
| 15 | | 2.6494 | (ASP) | 1.235 | | | | |
| 16 | Lens 7 | −4.9650 | (ASP) | 0.717 | Plastic | 1.534 | 56.0 | −5.01 |
| 17 | | 6.0871 | (ASP) | 0.715 | | | | |
| 18 | Image | Plano | | — | | | | |

Note:
Reference wavelength is 587.6 nm (d-line).
An effective radius of the stop S1 (Surface 8) is 1.421 mm.
An effective radius of the stop S2 (Surface 11) is 1.596 mm.

TABLE 1B

Aspheric Coefficients

| Surface # | 2 | 3 | 4 | 5 |
|---|---|---|---|---|
| k = | 0.00000E+00 | 0.00000E+00 | 0.00000E+00 | 0.00000E+00 |
| A4 = | −1.351117154E−02 | −1.631157534E−04 | −1.179139629E−02 | −1.648723158E−02 |
| A6 = | 7.600272434E−02 | 1.374153570E−02 | −1.887024688E−02 | 3.186719105E−02 |
| A8 = | −2.500052668E−01 | −4.139706764E−02 | 5.369608370E−02 | −1.624141857E−01 |
| A10 = | 5.126384719E−01 | 6.993694911E−02 | −9.056984590E−02 | 4.024504217E−01 |
| A12 = | −6.923527792E−01 | −6.881642474E−02 | 1.180139876E−01 | −5.650496108E−01 |
| A14 = | 6.346640474E−01 | 4.160340778E−02 | −1.119549713E−01 | 4.837495356E−01 |

TABLE 1B-continued

Aspheric Coefficients

| | | | | |
|---|---|---|---|---|
| A16 = | −4.004774883E−01 | −1.492225714E−02 | 7.468326615E−02 | −2.534323754E−01 |
| A18 = | 1.737737818E−01 | 2.694793599E−03 | −3.357781135E−02 | 7.885512801E−02 |
| A20 = | −5.087227423E−02 | −6.759078176E−06 | 9.566853995E−03 | −1.334240580E−02 |
| A22 = | 9.589065972E−03 | −8.688225342E−05 | −1.548240812E−03 | 9.430511583E−04 |
| A24 = | −1.049995590E−03 | 1.100925953E−05 | 1.078970962E−04 | — |
| A26 = | 5.072225701E−05 | — | — | — |

| Surface # | 6 | 7 | 9 | 10 |
|---|---|---|---|---|
| k = | 0.00000E+00 | 0.00000E+00 | 0.00000E+00 | 0.00000E+00 |
| A4 = | −6.842757520E−03 | −2.058862397E−02 | −6.274974039E−02 | −9.619299771E−02 |
| A6 = | 6.966079543E−02 | 1.116418003E−01 | −5.529109596E−02 | 2.462180036E−01 |
| A8 = | −3.083681976E−01 | −6.584020335E−01 | 3.951808038E−01 | −9.478017326E−01 |
| A10 = | 7.548151282E−01 | 2.231884370E+00 | −1.409408765E+00 | 2.519100828E+00 |
| A12 = | −1.144178414E+00 | −4.743568726E+00 | 3.047093779E+00 | −4.710195760E+00 |
| A14 = | 1.129723136E+00 | 6.677560874E+00 | −4.341862877E+00 | 6.254766849E+00 |
| A16 = | −7.387270067E−01 | −6.390564135E+00 | 4.228947047E+00 | −5.938420015E+00 |
| A18 = | 3.203319296E−01 | 4.180366279E+00 | −2.837142486E+00 | 4.032080131E+00 |
| A20 = | −8.946288413E−02 | −1.839704787E+00 | 1.290065635E+00 | −1.938410401E+00 |
| A22 = | 1.468249636E−02 | 5.205608837E−01 | −3.795744533E−01 | 6.432555207E−01 |
| A24 = | −1.080414591E−03 | −8.548150742E−02 | 6.514566274E−02 | −1.399413301E−01 |
| A26 = | — | 6.185670588E−03 | −4.947202351E−03 | 1.793525747E−02 |
| A28 = | — | — | — | −1.024887842E−03 |

| Surface # | 12 | 13 | 14 | 15 |
|---|---|---|---|---|
| k = | 0.00000E+00 | 0.00000E+00 | −9.94702E−01 | −8.42674E−01 |
| A4 = | −9.511518280E−02 | −1.353533320E−01 | −1.066735197E−01 | −4.208947489E−02 |
| A6 = | 1.701295424E−01 | 1.368819379E−01 | 2.534545919E−02 | −2.375436989E−02 |
| A8 = | −1.894259960E−01 | −6.960115401E−02 | 4.971900036E−03 | 3.577755576E−02 |
| A10 = | −1.323458387E−01 | −1.011620318E−01 | −2.000502548E−02 | −3.173880218E−02 |
| A12 = | 8.424527642E−01 | 2.646836550E−01 | 1.627323578E−02 | 1.841489747E−02 |
| A14 = | −1.493851417E+00 | −2.919854124E−01 | −7.212638250E−03 | −7.170867414E−03 |
| A16 = | 1.552542236E+00 | 1.960514568E−01 | 1.988191827E−03 | 1.927915196E−03 |
| A18 = | −1.060334889E+00 | −8.636933133E−02 | −3.548196062E−04 | −3.647076897E−04 |
| A20 = | 4.902884254E−01 | 2.535126725E−02 | 4.097167451E−05 | 4.895350306E−05 |
| A22 = | −1.524305127E−01 | −4.877170741E−03 | −2.925916684E−06 | −4.645311504E−06 |
| A24 = | 3.056911193E−02 | 5.848546738E−04 | 1.125177833E−07 | 3.054883851E−07 |
| A26 = | −3.575566152E−03 | −3.909925281E−05 | −1.280606908E−09 | −1.329007074E−08 |
| A28 = | 1.854325443E−04 | 1.088039921E−06 | −3.059625798E−11 | 3.453512980E−10 |
| A30 = | — | — | — | −4.075189106E−12 |

| Surface # | 16 | 17 |
|---|---|---|
| k = | 0.00000E+00 | 0.00000E+00 |
| A4 = | −6.578968701E−02 | −7.432459527E−02 |
| A6 = | 2.841328647E−02 | 3.549697708E−02 |
| A8 = | −1.092509362E−02 | −1.733936165E−02 |
| A10 = | 4.351394133E−03 | 7.292363194E−03 |
| A12 = | −2.042688300E−03 | −2.415144070E−03 |
| A14 = | 8.039780952E−04 | 5.953293986E−04 |
| A16 = | −2.143305718E−04 | −1.071175268E−04 |
| A18 = | 3.814824811E−05 | 1.400944425E−05 |
| A20 = | −4.625989666E−06 | −1.325952264E−06 |
| A22 = | 3.856442022E−07 | 8.969222757E−08 |
| A24 = | −2.183565153E−08 | −4.220556759E−09 |
| A26 = | 8.046024440E−10 | 1.310769923E−10 |
| A28 = | −1.744068360E−11 | −2.413067516E−12 |
| A30 = | 1.690025089E−13 | 1.992951009E−14 |

In Table 1A, the curvature radius, the thickness and the focal length are shown in millimeters (mm). Surface numbers 0-18 represent the surfaces sequentially arranged from the object side to the image side along the optical axis. In Table 1B, k represents the conic coefficient of the equation of the aspheric surface profiles. A4-A30 represent the aspheric coefficients ranging from the 4th order to the 30th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
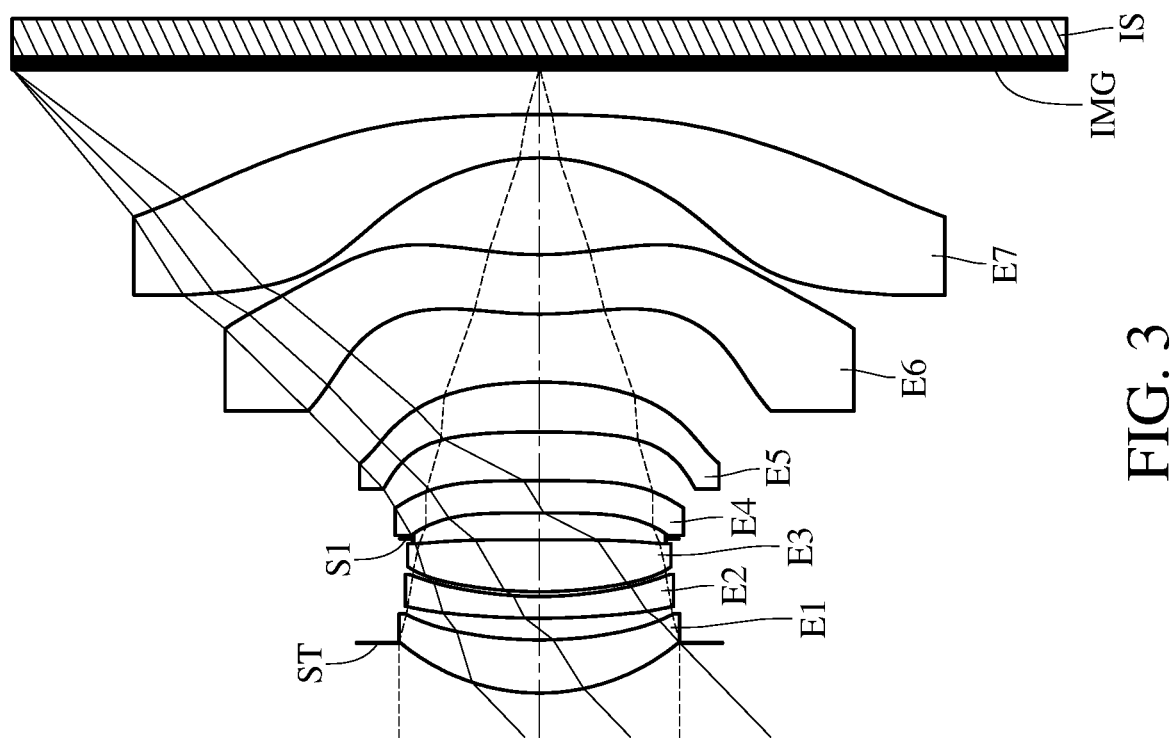
FIG. 3 is a schematic view of an image capturing unit according to the 2nd embodiment of the present disclosure.
Figure 4:
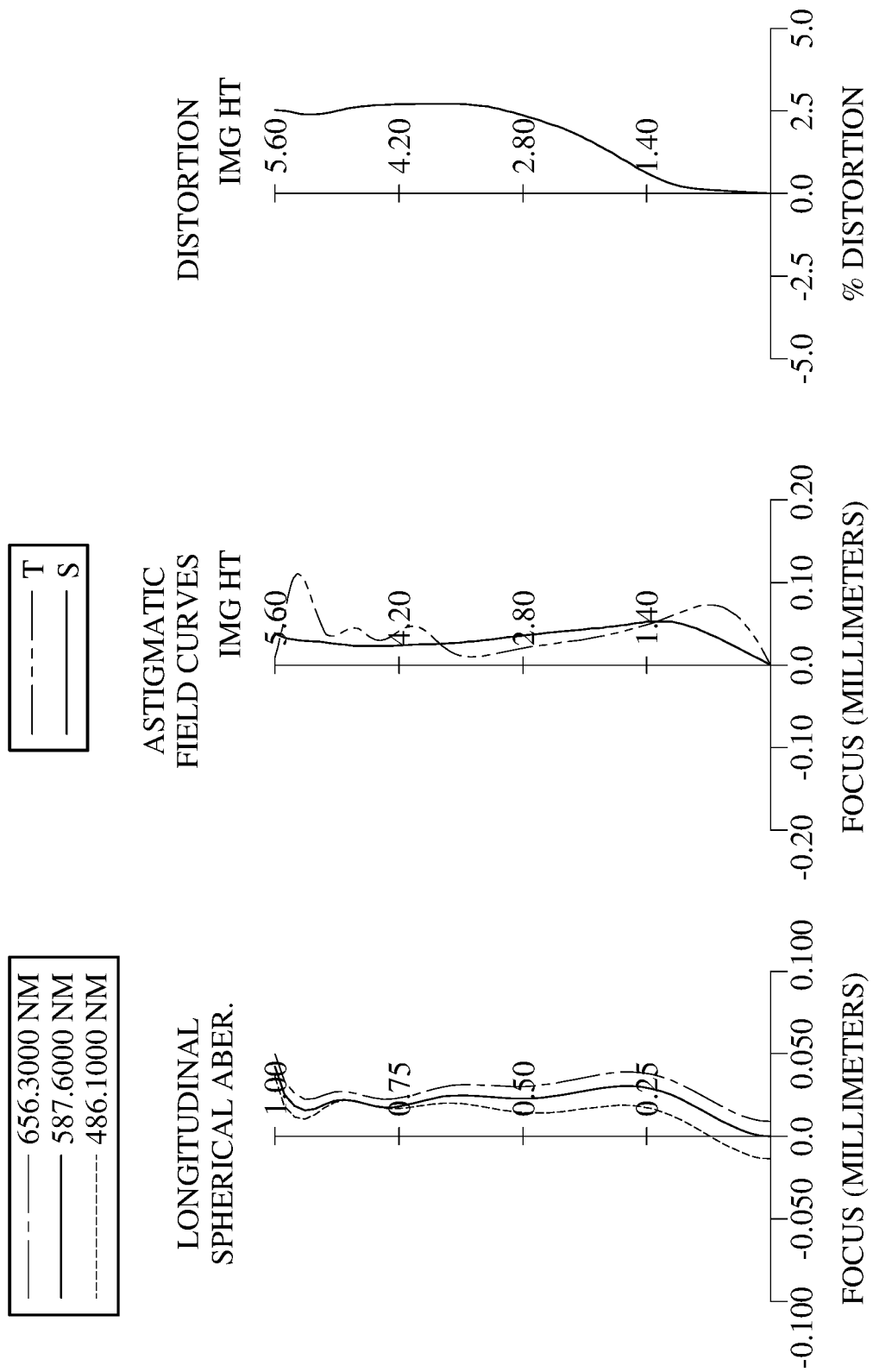
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes an imaging lens system (its reference numeral is omitted) of the present disclosure and an image sensor IS. The imaging lens system includes, in order from an object side to an image side along an optical path, an aperture stop ST, a first lens element E1, a second lens element E2, a third lens element E3, a stop S1, a fourth lens element E4, a fifth lens element E5, a sixth lens element E6, a seventh lens element E7 and an image surface IMG. The imaging lens system includes seven lens elements (E1, E2, E3, E4, E5, E6 and E7) with no additional lens element disposed between each of the adjacent seven lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The image-side surface of the first lens element E1 has one inflection point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point in an off-axis region thereof. The image-side surface of the second lens element E2 has one inflection point in an off-axis region thereof.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The image-side surface of the third lens element E3 has two inflection points in an off-axis region thereof. The image-side surface of the third lens element E3 has one critical point in an off-axis region thereof.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The image-side surface of the fourth lens element E4 has one inflection point in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The image-side surface of the fifth lens element E5 has one inflection point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points in an off-axis region thereof. The image-side surface of the sixth lens element E6 has three inflection points in an off-axis region thereof. The object-side surface of the sixth lens element E6 has one critical point in an off-axis region thereof. The image-side surface of the sixth lens element E6 has one critical point in an off-axis region thereof.

The seventh lens element E7 with negative refractive power has an object-side surface being concave in a paraxial region thereof and an image-side surface being convex in a paraxial region thereof. The seventh lens element E7 is made of plastic material and has the object-side surface and the image-side surface being both aspheric. The object-side surface of the seventh lens element E7 has four inflection points in an off-axis region thereof. The image-side surface of the seventh lens element E7 has one inflection point in an off-axis region thereof.

In this embodiment, the first lens element E1 has an average light transmission less than 10% at wavelengths of 700 nm to 1000 nm for infrared filtering. For example, a lens surface of the first lens element can be coated with a film configured to absorb infrared light. The image sensor IS is disposed on or near the image surface IMG of the imaging lens system.

The detailed optical data of the 2nd embodiment are shown in Table 2A and the aspheric surface data are shown in Table 2B below.

TABLE 2A

2nd Embodiment
f = 5.63 mm, Fno = 1.89, HFOV = 44.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.534 | | | | |
| 2 | Lens 1 | 2.2950 | (ASP) | 0.565 | Plastic | 1.545 | 56.1 | 8.03 |
| 3 | | 4.4088 | (ASP) | 0.231 | | | | |
| 4 | Lens 2 | 8.0197 | (ASP) | 0.230 | Plastic | 1.686 | 18.4 | −11.96 |
| 5 | | 4.0083 | (ASP) | 0.052 | | | | |
| 6 | Lens 3 | 4.5569 | (ASP) | 0.551 | Plastic | 1.544 | 56.0 | 8.47 |
| 7 | | 386.5679 | (ASP) | 0.015 | | | | |
| 8 | Stop | Plano | | 0.272 | | | | |
| 9 | Lens 4 | −151.7727 | (ASP) | 0.342 | Plastic | 1.686 | 18.4 | 195.73 |
| 10 | | −71.3128 | | 0.519 | | | | |
| 11 | Lens 5 | −12.8936 | (ASP) | 0.530 | Plastic | 1.544 | 56.0 | 13.85 |
| 12 | | −4.8247 | (ASP) | 0.723 | | | | |
| 13 | Lens 6 | 4.0036 | (ASP) | 0.633 | Plastic | 1.566 | 37.4 | −181.21 |
| 14 | | 3.6330 | (ASP) | 1.029 | | | | |
| 15 | Lens 7 | −2.2872 | (ASP) | 0.460 | Plastic | 1.544 | 56.0 | −4.48 |
| 16 | | −40.0644 | (ASP) | 0.478 | | | | |
| 17 | Image | Plano | | — | | | | |

Note:
Reference wavelength is 587.6 nm (d-line).
An effective radius of the stop S1 (Surface 8) is 1.343 mm.

TABLE 2B

| Aspheric Coefficients | | | | |
|---|---|---|---|---|
| Surface # | 2 | 3 | 4 | 5 |
| k = | 0.00000E+00 | 0.00000E+00 | −3.56285E+00 | 0.00000E+00 |
| A4 = | 2.158977389E−03 | −3.068402036E−03 | −9.026078426E−03 | −1.459097156E−02 |
| A6 = | −7.899970678E−03 | 4.319811280E−02 | −1.652742874E−02 | −5.419140574E−02 |
| A8 = | 7.949577145E−03 | −1.880887911E−01 | 7.360355107E−02 | 2.979498961E−01 |
| A10 = | 1.133995227E−02 | 4.775205860E−01 | −1.456766676E−01 | −7.942657219E−01 |
| A12 = | −4.567933572E−02 | −7.538795266E−01 | 1.784095071E−01 | 1.324312270E+00 |
| A14 = | 6.249502519E−02 | 7.666468155E−01 | −1.333164907E−01 | −1.438302394E+00 |
| A16 = | −4.651243764E−02 | −4.998806283E−01 | 5.942601370E−02 | 1.034688189E+00 |
| A18 = | 1.992483224E−02 | 2.017950257E−01 | −1.451729726E−02 | −4.878030863E−01 |
| A20 = | −4.610314252E−03 | −4.585577588E−02 | 1.485305189E−03 | 1.441004152E−01 |
| A22 = | 4.454753675E−04 | 4.471912443E−03 | — | −2.404389625E−02 |
| A24 = | — | — | — | 1.716890838E−03 |

| Surface # | 6 | 7 | 9 | 10 |
|---|---|---|---|---|
| k = | 0.00000E+00 | 0.00000E+00 | 0.00000E+00 | 0.00000E+00 |
| A4 = | −4.286137239E−03 | −9.825106278E−03 | −5.911078225E−02 | −2.917463305E−02 |
| A6 = | −6.898714027E−02 | −1.095011528E−01 | −6.621450717E−03 | −1.434070670E−01 |
| A8 = | 3.167295136E−01 | 5.912457091E−01 | 5.304966043E−03 | 6.173150499E−01 |
| A10 = | −7.560704392E−01 | −1.893196007E+00 | −1.795109824E−02 | −1.695559169E+00 |
| A12 = | 1.117429870E+00 | 3.869308774E+00 | 3.827465238E−02 | 3.065940381E+00 |
| A14 = | −1.052833241E+00 | −5.213937275E+00 | −4.903823166E−02 | −3.773055576E+00 |
| A16 = | 6.364170549E−01 | 4.683452216E+00 | 3.851501790E−02 | 3.210452496E+00 |
| A18 = | −2.386384327E−01 | −2.772772782E+00 | −1.789057363E−02 | −1.887122793E+00 |
| A20 = | 5.039543547E−02 | 1.038310667E+00 | 4.523136202E−03 | 7.514593655E−01 |
| A22 = | −4.566174602E−03 | −2.227286660E−01 | −4.916824209E−04 | −1.932916232E−01 |
| A24 = | — | 2.083898097E−02 | — | 2.893911842E−02 |
| A26 = | — | — | — | −1.912190351E−03 |

| Surface # | 11 | 12 | 13 | 14 |
|---|---|---|---|---|
| k = | 0.00000E+00 | 0.00000E+00 | 0.00000E+00 | 0.00000E+00 |
| A4 = | −7.607411539E−02 | −6.898684417E−02 | −8.712820902E−02 | −5.190624183E−02 |
| A6 = | 3.672511701E−01 | 1.553920431E−01 | 5.682185450E−02 | −1.296556443E−03 |
| A8 = | −1.653632397E+00 | −4.762245353E−01 | −1.259619453E−01 | 4.475753608E−03 |
| A10 = | 4.690125641E+00 | 9.929995855E−01 | 1.926505670E−01 | −1.950338266E−03 |
| A12 = | −8.988382324E+00 | −1.402069469E+00 | −1.930452149E−01 | 1.995484089E−04 |
| A14 = | 1.204785753E+01 | 1.367340665E+00 | 1.324338842E−01 | 1.814069723E−04 |
| A16 = | −1.154831708E+01 | −9.362373145E−01 | −6.401369957E−02 | −1.004120650E−04 |
| A18 = | 8.001412211E+00 | 4.523033229E−01 | 2.211834610E−02 | 2.701212019E−05 |
| A20 = | −4.008545905E+00 | −1.529673972E−01 | −5.477269115E−03 | −4.601585389E−06 |
| A22 = | 1.435888154E+00 | 3.534256278E−02 | 9.625000510E−04 | 5.252578030E−07 |
| A24 = | −3.580629652E−01 | −5.301074271E−03 | −1.169334908E−04 | −4.014075872E−08 |
| A26 = | 5.897211792E−02 | 4.640845882E−04 | 9.322089295E−06 | 1.972245154E−09 |
| A28 = | −5.760606201E−03 | −1.796210497E−05 | −4.381350296E−07 | −5.632277885E−11 |
| A30 = | 2.525528437E−04 | — | 9.191261889E−09 | 7.103697880E−13 |

| Surface # | 15 | 16 |
|---|---|---|
| k = | −9.84878E−01 | 0.00000E+00 |
| A4 = | −7.980009924E−03 | −4.213501857E−02 |
| A6 = | 1.071320022E−02 | 3.063294905E−02 |
| A8 = | −2.762578745E−03 | −1.412886348E−02 |
| A10 = | −2.989515673E−03 | 4.194206653E−03 |
| A12 = | 2.211498990E−03 | −8.774462585E−04 |
| A14 = | −6.732723592E−04 | 1.392694218E−04 |
| A16 = | 1.199774945E−04 | −1.739964903E−05 |
| A18 = | −1.385565177E−05 | 1.707223961E−06 |
| A20 = | 1.073685767E−06 | −1.280458584E−07 |
| A22 = | −5.570899213E−08 | 7.075446450E−09 |
| A24 = | 1.862685146E−09 | −2.756035801E−10 |
| A26 = | −3.635762456E−11 | 7.109542656E−12 |
| A28 = | 3.151778713E−13 | −1.085421591E−13 |
| A30 = | — | 7.405473690E−16 |

In the 2nd embodiment, the equation of the aspheric surface profiles of the aforementioned lens elements is the same as the equation of the 1st embodiment. Also, the definitions of these parameters shown in Table 2C below are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

Values of Conditional Expressions

| | |
|---|---|
| f [mm] | 5.63 |
| Fno | 1.89 |
| HFOV [deg.] | 44.0 |
| (V1 + V3)/V2 | 6.10 |
| (CT1 + CT2 + CT3)/T34 | 4.69 |
| (T45 + T56)/CT5 | 2.34 |
| CT3/T23 | 10.60 |
| minT37/minCT46 | 0.84 |
| T34/T12 | 1.24 |
| T67/CT6 | 1.63 |
| TL/ImgH | 1.18 |
| (R1 + R2)/f1 | 0.84 |
| (R11 + R12)/f | 1.36 |
| R13/f7 | 0.51 |
| R2/R3 | 0.55 |
| R5/R4 | 1.14 |
| |f/f4| + |f/f5| + |f/f6| | 0.47 |
| f2/f3 | −1.41 |
| f23/f | 5.30 |
| CRA [deg.] | 45.0 |
| ImgH/BL | 11.72 |
| Y72/Y11 | 2.89 |
| Yc61/Y61 | 0.40 |
| Yc62/Y62 | 0.38 |

3rd Embodiment

Figure 5:
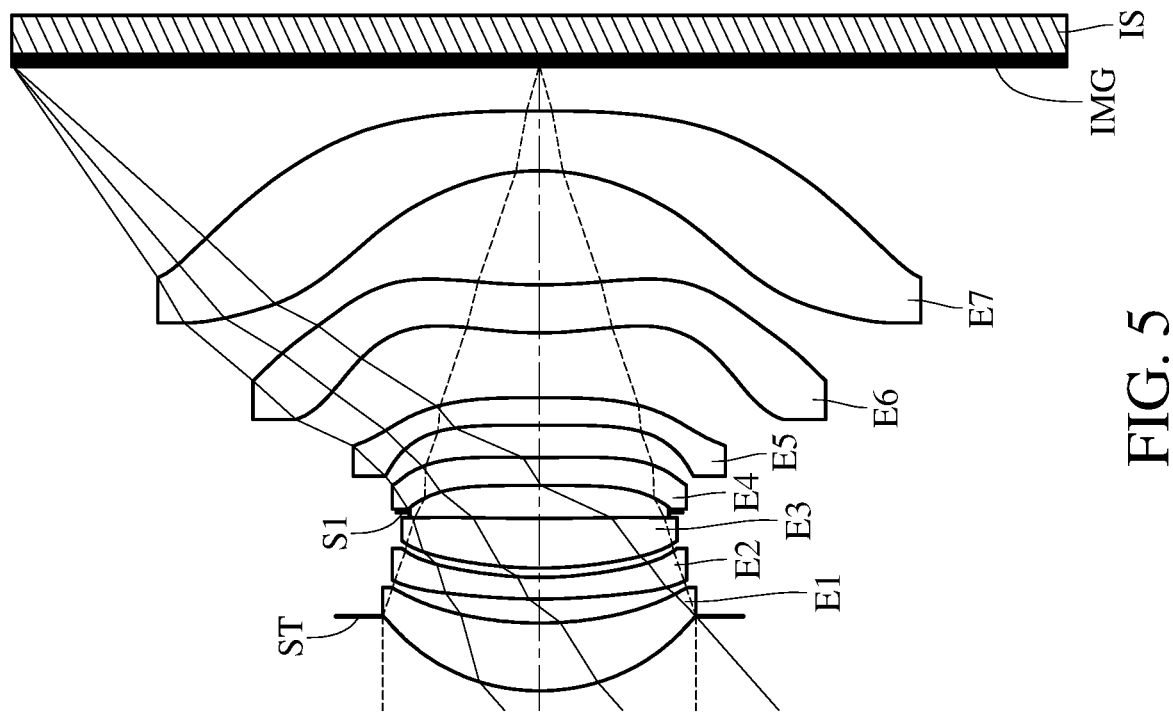
FIG. 5 is a schematic view of an image capturing unit according to the 3rd embodiment of the present disclosure.
Figure 6:
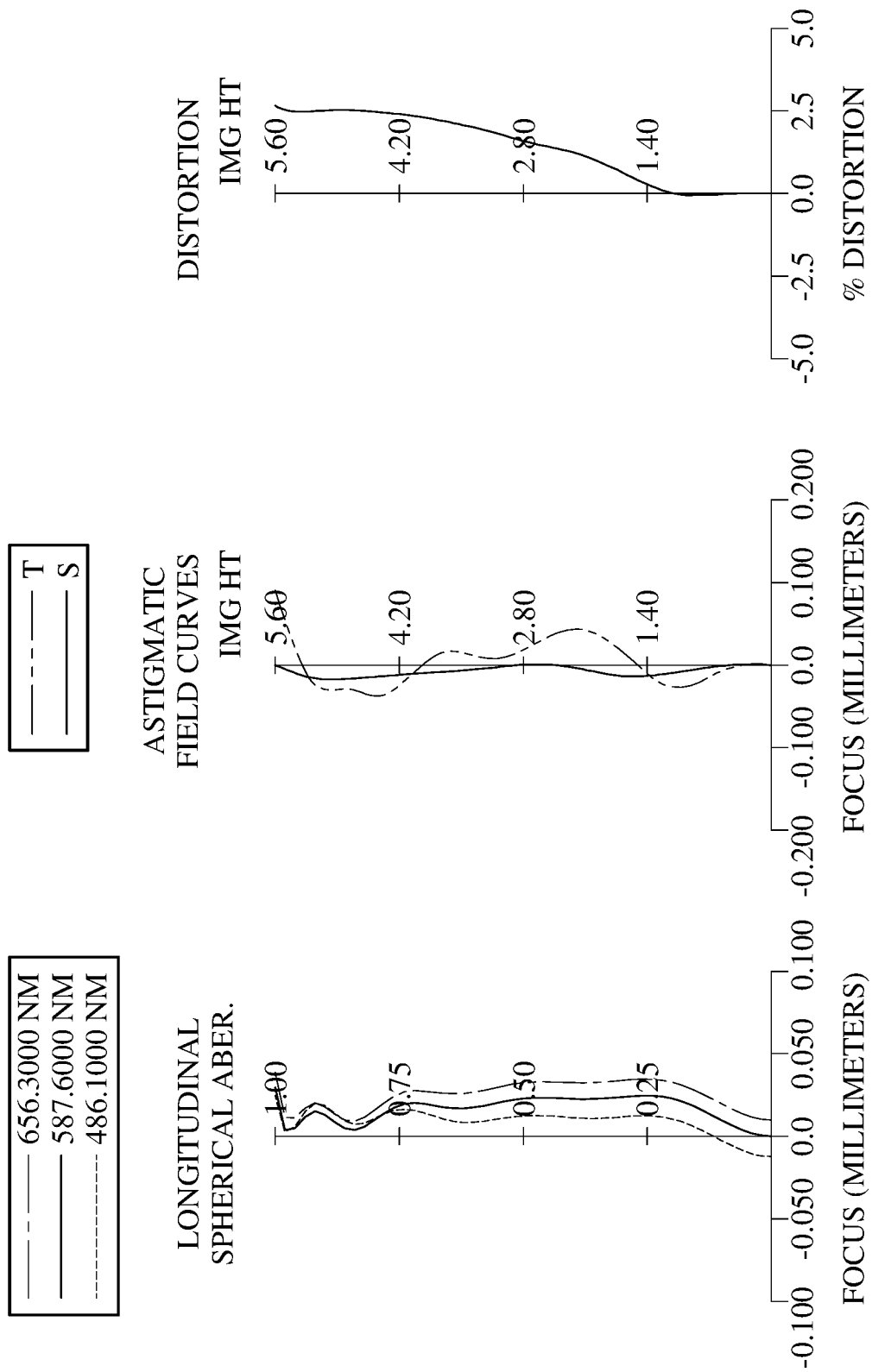
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes an imaging lens system (its reference numeral is omitted) of the present disclosure and an image sensor IS. The imaging lens system includes, in order from an object side to an image side along an optical path, an aperture stop ST, a first lens element E1, a second lens element E2, a third lens element E3, a stop S1, a fourth lens element E4, a fifth lens element E5, a sixth lens element E6, a seventh lens element E7 and an image surface IMG. The imaging lens system includes seven lens elements (E1, E2, E3, E4, E5, E6 and E7) with no additional lens element disposed between each of the adjacent seven lens elements.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric. The object-side surface of the first lens element E1 has one inflection point in an off-axis region thereof. The image-side surface of the first lens element E1 has one inflection point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The image-side surface of the third lens element E3 has three inflection points in an off-axis region thereof. The image-side surface of the third lens element E3 has three critical points in an off-axis region thereof.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point in an off-axis region thereof. The image-side surface of the fourth lens element E4 has two inflection points in an off-axis region thereof. The object-side surface of the fourth lens element E4 has one critical point in an off-axis region thereof. The image-side surface of the fourth lens element E4 has one critical point in an off-axis region thereof.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point in an off-axis region thereof. The image-side surface of the fifth lens element E5 has two inflection points in an off-axis region thereof. The object-side surface of the fifth lens element E5 has one critical point in an off-axis region thereof.

The sixth lens element E6 with positive refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points in an off-axis region thereof. The image-side surface of the sixth lens element E6 has four inflection points in an off-axis region thereof. The object-side surface of the sixth lens element E6 has one critical point in an off-axis region thereof. The image-side surface of the sixth lens element E6 has one critical point in an off-axis region thereof.

The seventh lens element E7 with negative refractive power has an object-side surface being concave in a paraxial region thereof and an image-side surface being convex in a paraxial region thereof. The seventh lens element E7 is made of plastic material and has the object-side surface and the image-side surface being both aspheric. The object-side surface of the seventh lens element E7 has one inflection point in an off-axis region thereof. The image-side surface of the seventh lens element E7 has one inflection point in an off-axis region thereof.

In this embodiment, the first lens element E1 has an average light transmission less than 10% at wavelengths of 700 nm to 1000 nm for infrared filtering. For example, a lens surface of the first lens element can be coated with a film configured to absorb infrared light. The image sensor IS is disposed on or near the image surface IMG of the imaging lens system.

The detailed optical data of the 3rd embodiment are shown in Table 3A and the aspheric surface data are shown in Table 3B below.

TABLE 3A

3rd Embodiment
f = 6.17 mm, Fno = 1.85, HFOV = 41.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.792 | | | | |
| 2 | Lens 1 | 2.1418 | (ASP) | 0.722 | Glass | 1.589 | 61.2 | 6.89 |
| 3 | | 3.9679 | (ASP) | 0.255 | | | | |
| 4 | Lens 2 | 6.5398 | (ASP) | 0.230 | Plastic | 1.686 | 18.4 | −14.29 |
| 5 | | 3.8666 | (ASP) | 0.100 | | | | |
| 6 | Lens 3 | 4.4983 | (ASP) | 0.527 | Plastic | 1.544 | 56.0 | 10.22 |
| 7 | | 22.5814 | (ASP) | 0.067 | | | | |
| 8 | Stop | Plano | | 0.283 | | | | |
| 9 | Lens 4 | 139.5525 | (ASP) | 0.298 | Plastic | 1.686 | 18.4 | −33.89 |
| 10 | | 19.9115 | (ASP) | 0.343 | | | | |
| 11 | Lens 5 | 42.5608 | (ASP) | 0.293 | Plastic | 1.614 | 25.6 | 39.18 |
| 12 | | −55.2253 | (ASP) | 0.690 | | | | |
| 13 | Lens 6 | 3.8935 | (ASP) | 0.510 | Plastic | 1.544 | 56.0 | 19.37 |
| 14 | | 5.8896 | (ASP) | 1.214 | | | | |
| 15 | Lens 7 | −2.3736 | (ASP) | 0.635 | Plastic | 1.534 | 56.0 | −4.72 |
| 16 | | −44.4015 | (ASP) | 0.473 | | | | |
| 17 | Image | Plano | | — | | | | |

Note:
Reference wavelength is 587.6 nm (d-line).
An effective radius of the stop S1 (Surface 8) is 1.378 mm.

TABLE 3B

Aspheric Coefficients

| Surface # | 2 | 3 | 4 | 5 |
|---|---|---|---|---|
| k = | 0.00000E+00 | 0.00000E+00 | −2.26438E+00 | 0.00000E+00 |
| A4 = | −1.365391224E−02 | 1.464523359E−02 | −2.118817662E−02 | −3.022276086E−02 |
| A6 = | 6.444663802E−02 | −5.085217046E−02 | 2.722694074E−02 | 6.532774552E−02 |
| A8 = | −1.533233327E−01 | 1.457630948E−01 | −6.239312391E−02 | −2.656868448E−01 |
| A10 = | 2.240116639E−01 | −2.422183358E−01 | 1.095430745E−01 | 7.440572288E−01 |
| A12 = | −2.091562645E−01 | 2.468026839E−01 | −1.265372106E−01 | −1.354834296E+00 |
| A14 = | 1.272915316E−01 | −1.557600518E−01 | 9.884515308E−02 | 1.641123951E+00 |
| A16 = | −5.015140252E−02 | 5.933671514E−02 | −5.101216464E−02 | −1.324458944E+00 |
| A18 = | 1.229338192E−02 | −1.243845917E−02 | 1.664545215E−02 | 7.033161288E−01 |
| A20 = | −1.694859031E−03 | 1.094256488E−03 | −3.110696390E−03 | −2.358319341E−01 |
| A22 = | 9.928371272E−05 | — | 2.533460936E−04 | 4.520966518E−02 |
| A24 = | — | — | — | −3.770207902E−03 |

| Surface # | 6 | 7 | 9 | 10 |
|---|---|---|---|---|
| k = | 0.00000E+00 | 0.00000E+00 | 0.00000E+00 | 0.00000E+00 |
| A4 = | 4.159599438E−03 | −3.922278493E−02 | −4.416927943E−02 | −5.956115964E−02 |
| A6 = | −8.035555513E−02 | 1.948214819E−01 | −1.105563246E−01 | 7.922703143E−03 |
| A8 = | 3.284989335E−01 | −7.178695689E−01 | 4.829519952E−01 | 7.455432908E−02 |
| A10 = | −7.814023915E−01 | 1.603862548E+00 | −1.209190444E+00 | −3.639743143E−01 |
| A12 = | 1.149777648E+00 | −2.285684304E+00 | 1.849081902E+00 | 8.561778440E−01 |
| A14 = | −1.076653806E+00 | 2.116306008E+00 | −1.807070981E+00 | −1.274792545E+00 |
| A16 = | 6.453469117E−01 | −1.265087119E+00 | 1.132949823E+00 | 1.268062266E+00 |
| A18 = | −2.393908468E−01 | 4.705136401E−01 | −4.404685973E−01 | −8.509966495E−01 |
| A20 = | 4.995826340E−02 | −9.890319067E−02 | 9.654958829E−02 | 3.797355750E−01 |
| A22 = | −4.477077937E−03 | 8.963266810E−03 | −9.114388314E−03 | −1.077852337E−01 |
| A24 = | — | — | — | 1.757732351E−02 |
| A26 = | — | — | — | −1.250820671E−03 |

| Surface # | 11 | 12 | 13 | 14 |
|---|---|---|---|---|
| k = | 0.00000E+00 | 0.00000E+00 | 0.00000E+00 | 0.00000E+00 |
| A4 = | −8.697641314E−02 | −9.543111578E−02 | −6.146383628E−02 | −1.753508607E−02 |
| A6 = | 7.612686894E−02 | 8.156133287E−02 | 1.774234406E−02 | −1.472799078E−02 |
| A8 = | −1.026426994E−01 | −1.112348483E−01 | −3.210262775E−02 | 1.007864478E−02 |
| A10 = | 7.234324383E−02 | 1.410820001E−01 | 3.020972319E−02 | −8.411551184E−03 |
| A12 = | 5.667399815E−02 | −1.388773331E−01 | −1.791063639E−02 | 5.484433100E−03 |
| A14 = | −2.230606531E−01 | 9.827684140E−02 | 7.140609552E−03 | −2.349333851E−03 |
| A16 = | 2.802178956E−01 | −4.942933493E−02 | −1.958663932E−03 | 6.619014118E−04 |
| A18 = | −2.018301124E−01 | 1.748618141E−02 | 3.685258943E−04 | −1.238391194E−04 |

TABLE 3B-continued

| Aspheric Coefficients | | | | |
|---|---|---|---|---|
| A20 = | 9.118645394E−02 | −4.215818878E−03 | −4.632771761E−05 | 1.529927838E−05 |
| A22 = | −2.601411968E−02 | 6.534705800E−04 | 3.716854273E−06 | −1.203362840E−06 |
| A24 = | 4.551190874E−03 | −5.831718825E−05 | −1.808891474E−07 | 5.382689178E−08 |
| A26 = | −4.795512843E−04 | 2.267347226E−06 | 5.858271921E−09 | −8.188191283E−10 |
| A28 = | 3.602646473E−05 | — | −2.214717034E−10 | −2.958289753E−11 |
| A30 = | −2.315690734E−06 | — | 7.195342147E−12 | 1.075770379E−12 |

| Surface # | 15 | 16 |
|---|---|---|
| k = | −1.00000E+00 | 0.00000E+00 |
| A4 = | −1.248423256E−02 | −3.770144085E−02 |
| A6 = | 1.443574433E−02 | 1.607654008E−02 |
| A8 = | −5.739968613E−03 | −2.445072231E−03 |
| A10 = | −8.056565956E−04 | −1.219116037E−03 |
| A12 = | 1.216085565E−03 | 7.179431607E−04 |
| A14 = | −4.036418286E−04 | −1.786439827E−04 |
| A16 = | 7.383392455E−05 | 2.684859508E−05 |
| A18 = | −8.634854646E−06 | −2.638218538E−06 |
| A20 = | 6.757359314E−07 | 1.702227220E−07 |
| A22 = | −3.542681955E−08 | −6.770616125E−09 |
| A24 = | 1.198951074E−09 | 1.278725871E−10 |
| A26 = | −2.374054533E−11 | 1.026990224E−12 |
| A28 = | 2.093228023E−13 | −9.611224862E−14 |
| A30 = | — | 1.326081836E−15 |

In the 3rd embodiment, the equation of the aspheric surface profiles of the aforementioned lens elements is the same as the equation of the 1st embodiment. Also, the definitions of these parameters shown in Table 3C below are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

| Values of Conditional Expressions | |
|---|---|
| f[mm] | 6.17 |
| Fno | 1.85 |
| HFOV [deg.] | 41.4 |
| (V1 + V3)/V2 | 6.38 |
| (CT1 + CT2 + CT3)/T34 | 4.23 |
| (T45 + T56)/CT5 | 3.53 |
| CT3/T23 | 5.27 |
| minT37/minCT46 | 1.17 |
| T34/T12 | 1.37 |
| T67/CT6 | 2.38 |
| TL/ImgH | 1.19 |
| (R1 + R2)/f1 | 0.89 |
| (R11 + R12)/f | 1.59 |
| R13/f7 | 0.50 |
| R2/R3 | 0.61 |
| R5/R4 | 1.16 |
| \|f/f4\| + \|f/f5\| + \|f/f6\| | 0.66 |
| f2/f3 | −1.40 |
| f23/f | 6.10 |
| CRA [deg.] | 40.0 |
| ImgH/BL | 11.84 |
| Y72/Y11 | 2.43 |
| Yc61/Y61 | 0.41 |
| Yc62/Y62 | 0.38 |

4th Embodiment

Figure 7:
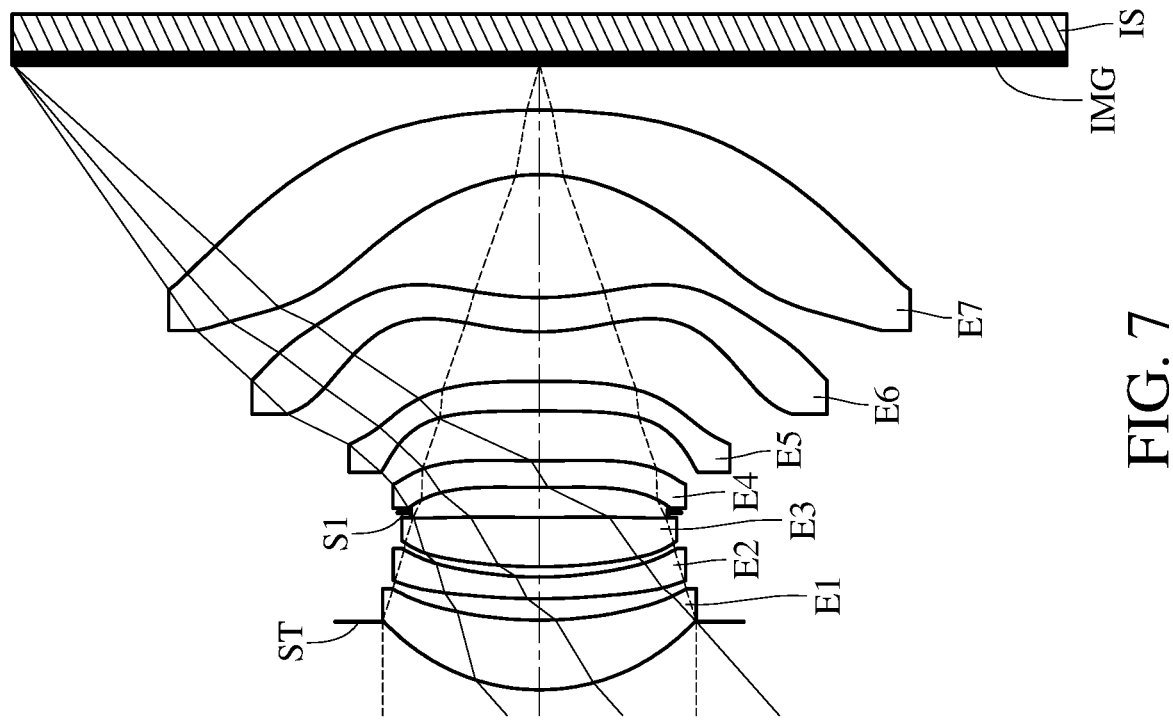
FIG. 7 is a schematic view of an image capturing unit according to the 4th embodiment of the present disclosure.
Figure 8:
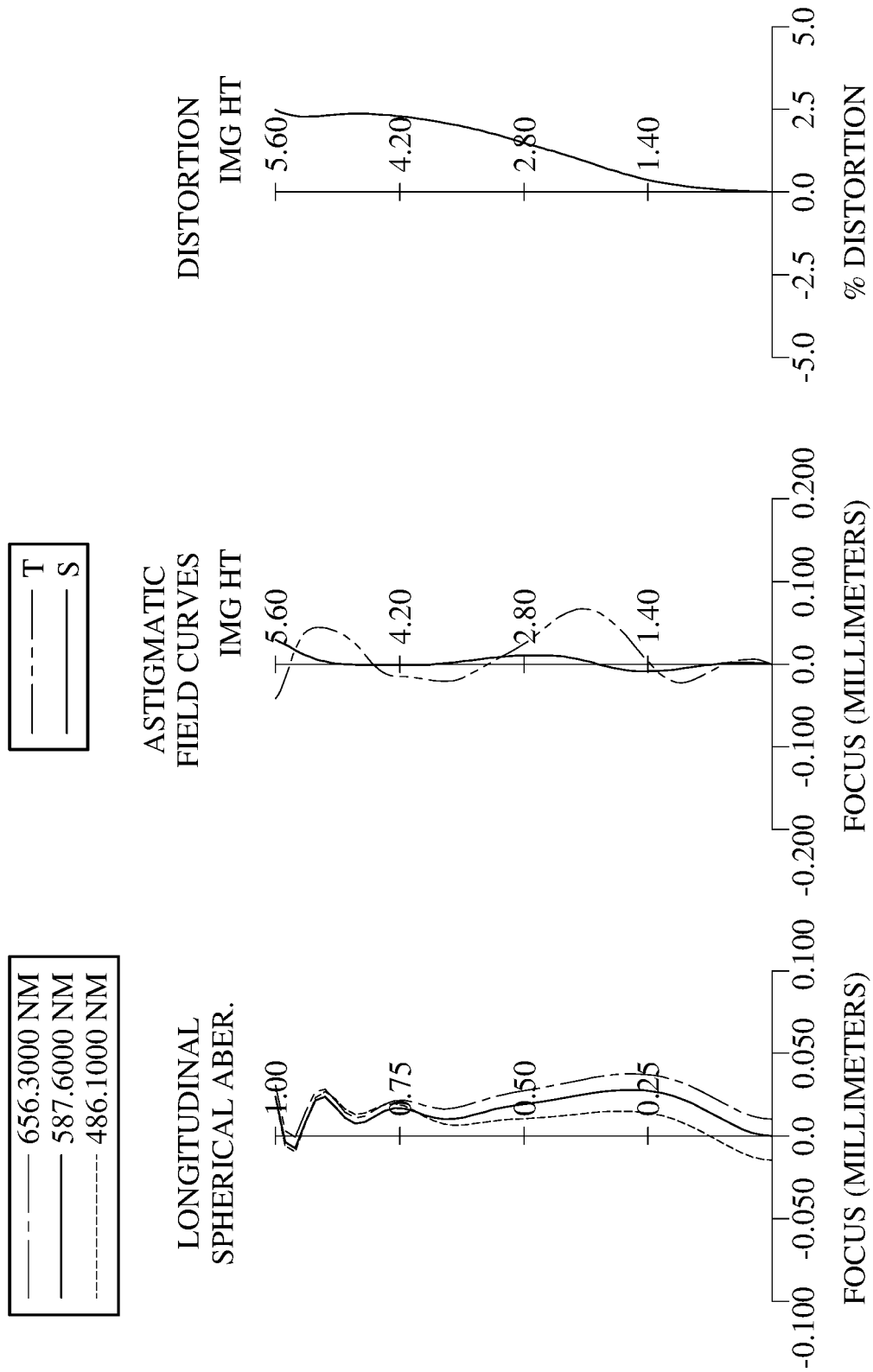
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes an imaging lens system (its reference numeral is omitted) of the present disclosure and an image sensor IS. The imaging lens system includes, in order from an object side to an image side along an optical path, an aperture stop ST, a first lens element E1, a second lens element E2, a third lens element E3, a stop S1, a fourth lens element E4, a fifth lens element E5, a sixth lens element E6, a seventh lens element E7 and an image surface IMG. The imaging lens system includes seven lens elements (E1, E2, E3, E4, E5, E6 and E7) with no additional lens element disposed between each of the adjacent seven lens elements.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric. The object-side surface of the first lens element E1 has one inflection point in an off-axis region thereof. The image-side surface of the first lens element E1 has one inflection point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The image-side surface of the third lens element E3 has three inflection points in an off-axis region thereof. The image-side surface of the third lens element E3 has two critical points in an off-axis region thereof.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point in an off-axis region thereof. The image-side surface of the fourth lens element E4 has two inflection points in an off-axis region thereof. The object-side surface of the fourth lens element E4 has one critical point in an off-axis region thereof. The image-side surface of the fourth lens element E4 has one critical point in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point in an off-axis region thereof. The image-side surface of the fifth lens element E5 has two inflection points in an off-axis region thereof.

The sixth lens element E6 with positive refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points in an off-axis region thereof. The image-side surface of the sixth lens element E6 has two inflection points in an off-axis region thereof. The object-side surface of the sixth lens element E6 has one critical point in an off-axis region thereof. The image-side surface of the sixth lens element E6 has one critical point in an off-axis region thereof.

The seventh lens element E7 with negative refractive power has an object-side surface being concave in a paraxial region thereof and an image-side surface being convex in a paraxial region thereof. The seventh lens element E7 is made of plastic material and has the object-side surface and the image-side surface being both aspheric. The object-side surface of the seventh lens element E7 has three inflection points in an off-axis region thereof. The image-side surface of the seventh lens element E7 has one inflection point in an off-axis region thereof.

In this embodiment, the first lens element E1 has an average light transmission less than 10% at wavelengths of 700 nm to 1000 nm for infrared filtering. For example, a lens surface of the first lens element can be coated with a film configured to absorb infrared light. The image sensor IS is disposed on or near the image surface IMG of the imaging lens system.

The detailed optical data of the 4th embodiment are shown in Table 4A and the aspheric surface data are shown in Table 4B below.

TABLE 4A

4th Embodiment
f = 6.17 mm, Fno = 1.85, HFOV = 41.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.725 | | | | |
| 2 | Lens 1 | 2.2166 | (ASP) | 0.741 | Glass | 1.589 | 61.2 | 6.79 |
| 3 | | 4.3547 | (ASP) | 0.228 | | | | |
| 4 | Lens 2 | 6.8145 | (ASP) | 0.230 | Plastic | 1.686 | 18.4 | −13.74 |
| 5 | | 3.9012 | (ASP) | 0.109 | | | | |
| 6 | Lens 3 | 5.1813 | (ASP) | 0.526 | Plastic | 1.544 | 56.0 | 11.07 |
| 7 | | 35.7120 | (ASP) | 0.051 | | | | |
| 8 | Stop | Plano | | 0.268 | | | | |
| 9 | Lens 4 | 21.9051 | (ASP) | 0.282 | Plastic | 1.686 | 18.4 | −67.95 |
| 10 | | 14.8244 | (ASP) | 0.530 | | | | |
| 11 | Lens 5 | −104.1987 | (ASP) | 0.316 | Plastic | 1.599 | 30.2 | 67.03 |
| 12 | | −29.0033 | (ASP) | 0.526 | | | | |
| 13 | Lens 6 | 2.5156 | (ASP) | 0.364 | Plastic | 1.544 | 56.0 | 15.99 |
| 14 | | 3.3582 | (ASP) | 1.308 | | | | |
| 15 | Lens 7 | −1.9204 | (ASP) | 0.686 | Plastic | 1.534 | 56.0 | −5.21 |
| 16 | | −6.9702 | (ASP) | 0.478 | | | | |
| 17 | Image | Plano | | — | | | | |

Note:
Reference wavelength is 587.6 nm (d-line).
An effective radius of the stop S1 (Surface 8) is 1.367 mm.

TABLE 4B

Aspheric Coefficients

| Surface # | 2 | 3 | 4 | 5 |
|---|---|---|---|---|
| k = | 0.00000E+00 | 0.00000E+00 | 0.00000E+00 | 0.00000E+00 |
| A4 = | −1.302629331E−02 | −4.133746354E−03 | −2.671874392E−02 | −2.965680249E−02 |
| A6 = | 7.035593843E−02 | 3.736444506E−02 | 3.811742147E−02 | 2.331241626E−02 |
| A8 = | −2.210991943E−01 | −1.572527353E−01 | −5.425968370E−02 | 2.155136707E−02 |
| A10 = | 4.368177742E−01 | 3.968285962E−01 | 6.096832126E−02 | −9.630454636E−02 |
| A12 = | −5.761894095E−01 | −6.210439710E−01 | −4.614895573E−02 | 1.414210400E−01 |
| A14 = | 5.253879535E−01 | 6.242350804E−01 | 1.723548751E−02 | −1.198429866E−01 |
| A16 = | −3.368553670E−01 | −4.088296646E−01 | 6.795745718E−03 | 6.836574749E−02 |
| A18 = | 1.518960269E−01 | 1.731102831E−01 | −1.188166732E−02 | −2.602609733E−02 |
| A20 = | −4.726497258E−02 | −4.546577640E−02 | 6.108497726E−03 | 5.779969034E−03 |

TABLE 4B-continued

Aspheric Coefficients

| | | | | |
|---|---|---|---|---|
| A22 = | 9.677990924E−03 | 6.688400740E−03 | −1.482800868E−03 | −5.493618328E−04 |
| A24 = | −1.174597439E−03 | −4.180072574E−04 | 1.435182734E−04 | — |
| A26 = | 6.400918506E−05 | — | — | — |

| Surface # | 6 | 7 | 9 | 10 |
|---|---|---|---|---|
| k = | 0.00000E+00 | 0.00000E+00 | 0.00000E+00 | 0.00000E+00 |
| A4 = | −1.092341877E−02 | −3.653194006E−02 | −5.516646577E−02 | −5.953782187E−02 |
| A6 = | −2.706021806E−02 | 1.667822954E−01 | −8.701484236E−02 | 1.430160668E−02 |
| A8 = | 1.806377932E−01 | −9.454472925E−01 | 2.330936677E−01 | −7.482932676E−02 |
| A10 = | −4.801470129E−01 | 3.392905909E+00 | −1.211070966E−01 | 2.003067316E−01 |
| A12 = | 7.643408028E−01 | −7.869477346E+00 | −8.523405450E−01 | −2.845019894E−01 |
| A14 = | −7.852066003E−01 | 1.219627495E+01 | 2.524301942E+00 | 1.903768654E−01 |
| A16 = | 5.318539924E−01 | −1.286540915E+01 | −3.550720703E+00 | 9.430282744E−03 |
| A18 = | −2.317139024E−01 | 9.260737917E+00 | 3.010299189E+00 | −1.187109968E−01 |
| A20 = | 6.088831571E−02 | −4.473430592E+00 | −1.610739407E+00 | 9.501671596E−02 |
| A22 = | −8.426974009E−03 | 1.385959992E+00 | 5.330890474E−01 | −3.703571121E−02 |
| A24 = | 4.304926752E−04 | −2.486676635E−01 | −9.973823704E−02 | 7.438701660E−03 |
| A26 = | — | 1.962811861E−02 | 8.066807019E−03 | −6.150170524E−04 |

| Surface # | 11 | 12 | 13 | 14 |
|---|---|---|---|---|
| k = | 0.00000E+00 | 0.00000E+00 | −1.00000E+00 | 0.00000E+00 |
| A4 = | −8.861983560E−02 | −1.080264806E−01 | −6.470318075E−02 | −1.488574503E−02 |
| A6 = | 2.099309056E−01 | 1.222194538E−01 | −8.760141473E−03 | −3.717539761E−02 |
| A8 = | −6.834182923E−01 | −1.970087230E−01 | 9.937185354E−03 | 2.149794449E−02 |
| A10 = | 1.525144401E+00 | 2.555483471E−01 | −1.582184388E−02 | −1.059211311E−02 |
| A12 = | −2.374264761E+00 | −2.469756744E−01 | 1.690602426E−02 | 5.309872366E−03 |
| A14 = | 2.613648664E+00 | 1.718006511E−01 | −1.079172599E−02 | −2.250324126E−03 |
| A16 = | −2.067930328E+00 | −8.521208356E−02 | 4.386863127E−03 | 6.939241200E−04 |
| A18 = | 1.182366912E+00 | 2.960517622E−02 | −1.182339657E−03 | −1.476680043E−04 |
| A20 = | −4.852149501E−01 | −6.959888877E−03 | 2.142014080E−04 | 2.132069826E−05 |
| A22 = | 1.396378727E−01 | 1.045730839E−03 | −2.579515157E−05 | −2.048650864E−06 |
| A24 = | −2.679627126E−02 | −9.016465918E−05 | 1.979050895E−06 | 1.254107403E−07 |
| A26 = | 3.080895963E−03 | 3.384189548E−06 | −8.749005164E−08 | −4.425388436E−09 |
| A28 = | −1.603928827E−04 | — | 1.695297957E−09 | 6.849895435E−11 |

| Surface # | 15 | 16 |
|---|---|---|
| k = | −1.00000E+00 | 0.00000E+00 |
| A4 = | 2.124017685E−02 | 2.047629334E−03 |
| A6 = | −1.671696853E−02 | −7.315294375E−03 |
| A8 = | 1.296492776E−02 | 4.437929074E−03 |
| A10 = | −7.847173609E−03 | −1.866632566E−03 |
| A12 = | 3.020305432E−03 | 5.229663242E−04 |
| A14 = | −7.288690265E−04 | −9.775623601E−05 |
| A16 = | 1.152486936E−04 | 1.247611062E−05 |
| A18 = | −1.231920875E−05 | −1.102668661E−06 |
| A20 = | 8.986479412E−07 | 6.716498912E−08 |
| A22 = | −4.411267081E−08 | −2.731618928E−09 |
| A24 = | 1.392544267E−09 | 6.884279298E−11 |
| A26 = | −2.547288425E−11 | −9.102475624E−13 |
| A28 = | 2.043375577E−13 | 3.902327519E−15 |

In the 4th embodiment, the equation of the aspheric surface profiles of the aforementioned lens elements is the same as the equation of the 1st embodiment. Also, the definitions of these parameters shown in Table 4C below are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

Values of Conditional Expressions

| | |
|---|---|
| f[mm] | 6.17 |
| Fno | 1.85 |
| HFOV [deg.] | 41.4 |
| (V1 + V3)/V2 | 6.37 |

TABLE 4C-continued

Values of Conditional Expressions

| | |
|---|---|
| (CT1 + CT2 + CT3)/T34 | 4.69 |
| (T45 + T56)/CT5 | 3.34 |
| CT3/T23 | 4.83 |
| minT37/minCT46 | 1.13 |
| T34/T12 | 1.40 |
| T67/CT6 | 3.59 |
| TL/ImgH | 1.19 |
| (R1 + R2)/f1 | 0.97 |
| (R11 + R12)/f | 0.95 |
| R13/f7 | 0.37 |
| R2/R3 | 0.64 |
| R5/R4 | 1.33 |
| $|f/f4| + |f/f5| + |f/f6|$ | 0.57 |
| f2/f3 | −1.24 |
| f23/f | 9.74 |
| CRA [deg.] | 40.0 |
| ImgH/BL | 11.72 |

TABLE 4C-continued

| Values of Conditional Expressions | |
| --- | --- |
| Y72/Y11 | 2.36 |
| Yc61/Y61 | 0.44 |
| Yc62/Y62 | 0.42 |

5th Embodiment

Figure 9:
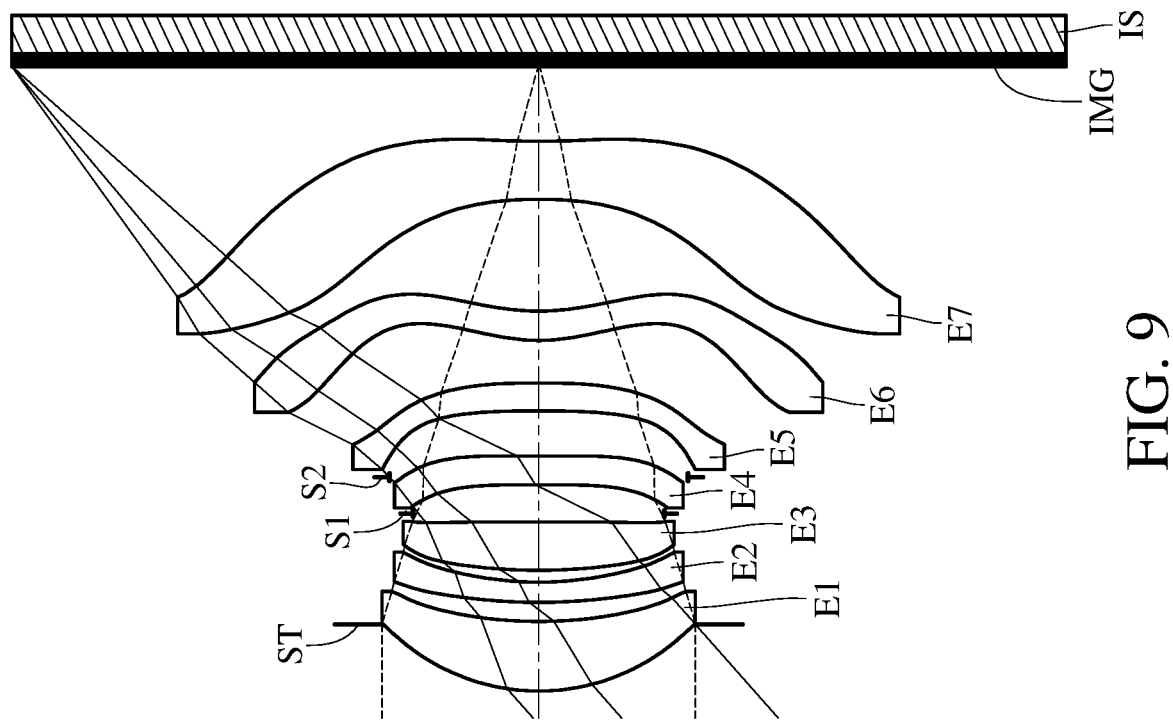
FIG. 9 is a schematic view of an image capturing unit according to the 5th embodiment of the present disclosure.
Figure 10:
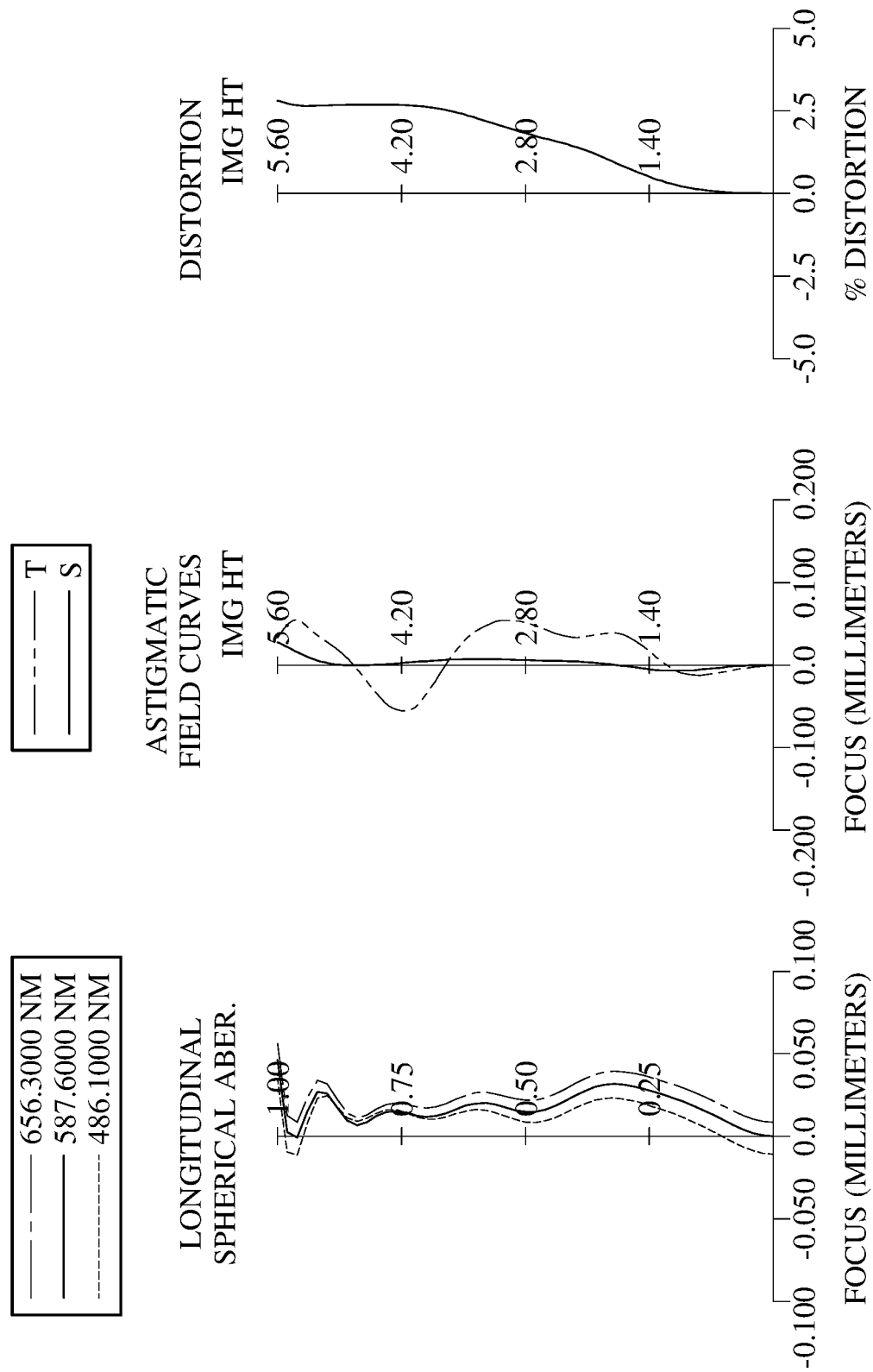
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes an imaging lens system (its reference numeral is omitted) of the present disclosure and an image sensor IS. The imaging lens system includes, in order from an object side to an image side along an optical path, an aperture stop ST, a first lens element E1, a second lens element E2, a third lens element E3, a stop S1, a fourth lens element E4, a stop S2, a fifth lens element E5, a sixth lens element E6, a seventh lens element E7 and an image surface IMG. The imaging lens system includes seven lens elements (E1, E2, E3, E4, E5, E6 and E7) with no additional lens element disposed between each of the adjacent seven lens elements.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric. The object-side surface of the first lens element E1 has one inflection point in an off-axis region thereof. The image-side surface of the first lens element E1 has one inflection point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The image-side surface of the third lens element E3 has three inflection points in an off-axis region thereof. The image-side surface of the third lens element E3 has two critical points in an off-axis region thereof.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The image-side surface of the fourth lens element E4 has two inflection points in an off-axis region thereof. The image-side surface of the fourth lens element E4 has one critical point in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point in an off-axis region thereof. The image-side surface of the fifth lens element E5 has two inflection points in an off-axis region thereof.

The sixth lens element E6 with positive refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points in an off-axis region thereof. The image-side surface of the sixth lens element E6 has two inflection points in an off-axis region thereof. The object-side surface of the sixth lens element E6 has one critical point in an off-axis region thereof. The image-side surface of the sixth lens element E6 has one critical point in an off-axis region thereof.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point in an off-axis region thereof. The image-side surface of the seventh lens element E7 has two inflection points in an off-axis region thereof. The image-side surface of the seventh lens element E7 has one critical point in an off-axis region thereof.

In this embodiment, the first lens element E1 has an average light transmission less than 10% at wavelengths of 700 nm to 1000 nm for infrared filtering. For example, a lens surface of the first lens element can be coated with a film configured to absorb infrared light. The image sensor IS is disposed on or near the image surface IMG of the imaging lens system.

The detailed optical data of the 5th embodiment are shown in Table 5A and the aspheric surface data are shown in Table 5B below.

TABLE 5A

5th Embodiment
f = 6.17 mm, Fno = 1.85, HFOV = 41.4 deg.

| Surface # | | Curvature Radius | | Thickness | Material | Index | Abbe # | Focal Length |
| --- | --- | --- | --- | --- | --- | --- | --- | --- |
| 0 | Object | Plano | | Infinity | | | | |
| 1 | Ape. Stop | Plano | | −0.710 | | | | |
| 2 | Lens 1 | 2.2429 | (ASP) | 0.740 | Glass | 1.589 | 61.2 | 6.58 |
| 3 | | 4.6679 | (ASP) | 0.202 | | | | |
| 4 | Lens 2 | 5.2609 | (ASP) | 0.215 | Plastic | 1.686 | 18.4 | −14.52 |
| 5 | | 3.3854 | (ASP) | 0.127 | | | | |

TABLE 5A-continued

5th Embodiment
f = 6.17 mm, Fno = 1.85, HFOV = 41.4 deg.

| Surface # | | Curvature Radius | | Thickness | Material | Index | Abbe # | Focal Length |
|---|---|---|---|---|---|---|---|---|
| 6 | Lens 3 | 5.9025 | (ASP) | 0.514 | Plastic | 1.544 | 56.0 | 11.66 |
| 7 | | 82.7000 | (ASP) | 0.089 | | | | |
| 8 | Stop | Plano | | 0.306 | | | | |
| 9 | Lens 4 | −573.3980 | (ASP) | 0.306 | Plastic | 1.686 | 18.4 | −39.35 |
| 10 | | 28.3368 | (ASP) | −0.225 | | | | |
| 11 | Stop | Plano | | 0.705 | | | | |
| 12 | Lens 5 | −25.0031 | (ASP) | 0.296 | Plastic | 1.611 | 26.9 | 161.76 |
| 13 | | −20.0465 | (ASP) | 0.454 | | | | |
| 14 | Lens 6 | 1.9841 | (ASP) | 0.312 | Plastic | 1.544 | 56.0 | 14.35 |
| 15 | | 2.5130 | (ASP) | 1.188 | | | | |
| 16 | Lens 7 | −4.9582 | (ASP) | 0.617 | Plastic | 1.534 | 56.0 | −5.31 |
| 17 | | 6.9131 | (ASP) | 0.795 | | | | |
| 18 | Image | Plano | | — | | | | |

Note:
Reference wavelength is 587.6 nm (d-line).
An effective radius of the stop S1 (Surface 8) is 1.334 mm.
An effective radius of the stop S2 (Surface 11) is 1.586 mm.

TABLE 5B

Aspheric Coefficients

| Surface # | 2 | 3 | 4 | 5 |
|---|---|---|---|---|
| k = | 0.00000E+00 | 0.00000E+00 | 0.00000E+00 | 0.00000E+00 |
| A4 = | −1.689497458E−02 | −5.952718507E−03 | −3.301845272E−02 | −3.249760996E−02 |
| A6 = | 1.033205525E−01 | 3.938611588E−02 | 3.084701952E−02 | 1.171064108E−02 |
| A8 = | −3.667287370E−01 | −1.336585814E−01 | 1.435757235E−02 | 8.594775361E−02 |
| A10 = | 8.155600436E−01 | 3.020803769E−01 | −1.348675343E−01 | −2.639804861E−01 |
| A12 = | −1.202391385E+00 | −4.381072376E−01 | 2.758798119E−01 | 4.018863327E−01 |
| A14 = | 1.212990097E+00 | 4.164269838E−01 | −3.171430248E−01 | −3.703098944E−01 |
| A16 = | −8.493505419E−01 | −2.600356447E−01 | 2.321981612E−01 | 2.164559924E−01 |
| A18 = | 4.122178407E−01 | 1.048681722E−01 | −1.105670380E−01 | −7.813103783E−02 |
| A20 = | −1.359725355E−01 | −2.597359023E−02 | 3.325682548E−02 | 1.574767857E−02 |
| A22 = | 2.907274598E−02 | 3.526074673E−03 | −5.753248167E−03 | −1.343666959E−03 |
| A24 = | −3.632599490E−03 | −1.952247467E−04 | 4.366523570E−04 | — |
| A26 = | 2.012681490E−04 | — | — | — |

| Surface # | 6 | 7 | 9 | 10 |
|---|---|---|---|---|
| k = | 0.00000E+00 | 0.00000E+00 | 0.00000E+00 | 0.00000E+00 |
| A4 = | −8.921634968E−03 | −6.056630601E−02 | −7.652351762E−02 | −7.282475650E−02 |
| A6 = | −5.933299410E−03 | 4.125022761E−01 | 4.106480238E−02 | 1.185646896E−01 |
| A8 = | 1.105035894E−01 | −2.098861655E+00 | −6.261842261E−02 | −5.093543507E−01 |
| A10 = | −3.447764474E−01 | 6.706330431E+00 | −5.585109850E−02 | 1.436211565E+00 |
| A12 = | 6.149014032E−01 | −1.409733579E+01 | 3.941203290E−01 | −2.772978341E+00 |
| A14 = | −6.905130853E−01 | 2.018153223E+01 | −7.603935033E−01 | 3.768596445E+00 |
| A16 = | 5.047886090E−01 | −1.999854187E+01 | 8.426307686E−01 | −3.672062049E+00 |
| A18 = | −2.368328994E−01 | 1.371866585E+01 | −6.032243167E−01 | 2.581419898E+00 |
| A20 = | 6.787624972E−02 | −6.393491285E+00 | 2.864381162E−01 | −1.299491175E+00 |
| A22 = | −1.064894666E−02 | 1.931371130E+00 | −8.822365890E−02 | 4.568896179E−01 |
| A24 = | 6.835739779E−04 | −3.409565054E−01 | 1.612900035E−02 | −1.064774308E−01 |
| A26 = | — | 2.668788094E−02 | −1.339625913E−03 | 1.475959742E−02 |
| A28 = | — | — | — | −9.193149019E−04 |

| Surface # | 12 | 13 | 14 | 15 |
|---|---|---|---|---|
| k = | 0.00000E+00 | 0.00000E+00 | −1.00000E+00 | −1.00000E+00 |
| A4 = | −1.011419947E−01 | −1.422132687E−01 | −1.161803807E−01 | −5.413013902E−02 |
| A6 = | 2.692658108E−01 | 1.803704041E−01 | 2.475899060E−02 | −1.018886933E−02 |
| A8 = | −8.862887198E−01 | −2.304645980E−01 | 1.612802232E−02 | 1.884348308E−02 |
| A10 = | 2.160023228E+00 | 2.268521184E−01 | −4.450818988E−02 | −1.992118312E−02 |
| A12 = | −3.734510099E+00 | −1.559371585E−01 | 4.203073022E−02 | 1.356643313E−02 |
| A14 = | 4.560263791E+00 | 6.247490213E−02 | −2.314892547E−02 | −5.982392970E−03 |
| A16 = | −3.970519822E+00 | −4.823094574E−03 | 8.277591066E−03 | 1.752070001E−03 |
| A18 = | 2.470876216E+00 | −9.647666318E−03 | −1.997816985E−03 | −3.454470837E−04 |

TABLE 5B-continued

| Aspheric Coefficients | | | |
|---|---|---|---|
| A20 = | −1.089287569E+00 | 5.988992691E−03 | 3.286738011E−04 | 4.574160419E−05 |
| A22 = | 3.318332863E−01 | −1.805519999E−03 | −3.635699817E−05 | −3.963379946E−06 |
| A24 = | −6.635490772E−02 | 3.111998306E−04 | 2.587634443E−06 | 2.092312161E−07 |
| A26 = | 7.826540101E−03 | −2.927148102E−05 | −1.070449421E−07 | −5.467087363E−09 |
| A28 = | −4.120600620E−04 | 1.167704013E−06 | 1.955789317E−09 | 6.478926169E−12 |
| A30 = | — | — | — | 2.027713479E−12 |

| Surface # | 16 | 17 |
|---|---|---|
| k = | 0.00000E+00 | 0.00000E+00 |
| A4 = | −6.267825667E−02 | −7.285191517E−02 |
| A6 = | 1.134445171E−02 | 2.373683362E−02 |
| A8 = | 1.266936737E−02 | −5.520755281E−03 |
| A10 = | −1.213693252E−02 | 7.079393432E−04 |
| A12 = | 5.013424280E−03 | −3.777653086E−05 |
| A14 = | −1.213543530E−03 | −2.008159536E−07 |
| A16 = | 1.894959443E−04 | −8.575312908E−08 |
| A18 = | −1.984449199E−05 | 3.651954425E−08 |
| A20 = | 1.400309842E−06 | −3.448594292E−09 |
| A22 = | −6.457727587E−08 | 2.000564139E−10 |
| A24 = | 1.767896816E−09 | −1.350716177E−11 |
| A26 = | −2.010740738E−11 | 8.583927599E−13 |
| A28 = | −1.927338437E−13 | −3.052119876E−14 |
| A30 = | 5.690601363E−15 | 4.267501870E−16 |

In the 5th embodiment, the equation of the aspheric surface profiles of the aforementioned lens elements is the same as the equation of the 1st embodiment. Also, the definitions of these parameters shown in Table 5C below are the same as those stated in the 1st embodiment with corresponding values for the 5th embodiment, so an explanation in this regard will not be provided again.

Moreover, these parameters can be calculated from Table 5A and Table 5B as the following values and satisfy the following conditions:

TABLE 5C

| Values of Conditional Expressions | |
|---|---|
| f[mm] | 6.17 |
| Fno | 1.85 |
| HFOV [deg.] | 41.4 |
| (V1 + V3)/V2 | 6.37 |
| (CT1 + CT2 + CT3)/T34 | 3.72 |
| (T45 + T56)/CT5 | 3.16 |
| CT3/T23 | 4.05 |
| minT37/minCT46 | 1.33 |
| T34/T12 | 1.96 |
| T67/CT6 | 3.81 |
| TL/ImgH | 1.19 |
| (R1 + R2)/f1 | 1.05 |
| (R11 + R12)/f | 0.73 |
| R13/f7 | 0.93 |
| R2/R3 | 0.89 |
| R5/R4 | 1.74 |
| |f/f4| + |f/f5| + |f/f6| | 0.62 |
| f2/f3 | −1.25 |
| f23/f | 10.08 |
| CRA [deg.] | 40.0 |
| ImgH/BL | 7.04 |
| Y72/Y11 | 2.30 |
| Yc61/Y61 | 0.47 |
| Yc62/Y62 | 0.45 |

6th Embodiment

Figure 11:
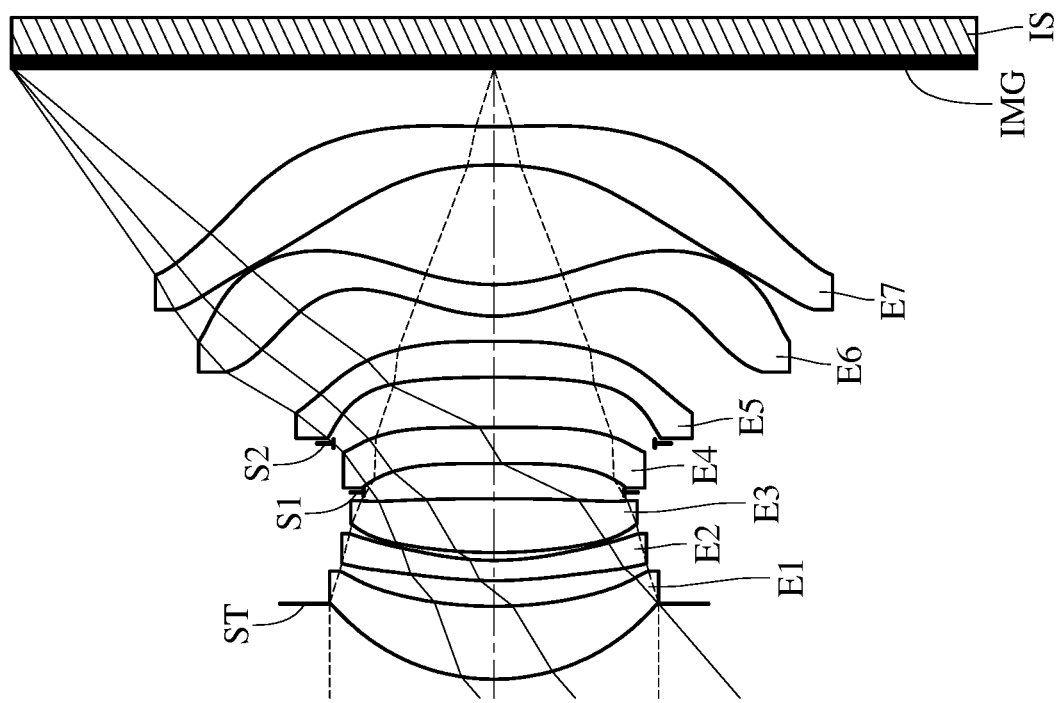
FIG. 11 is a schematic view of an image capturing unit according to the 6th embodiment of the present disclosure.
Figure 12:
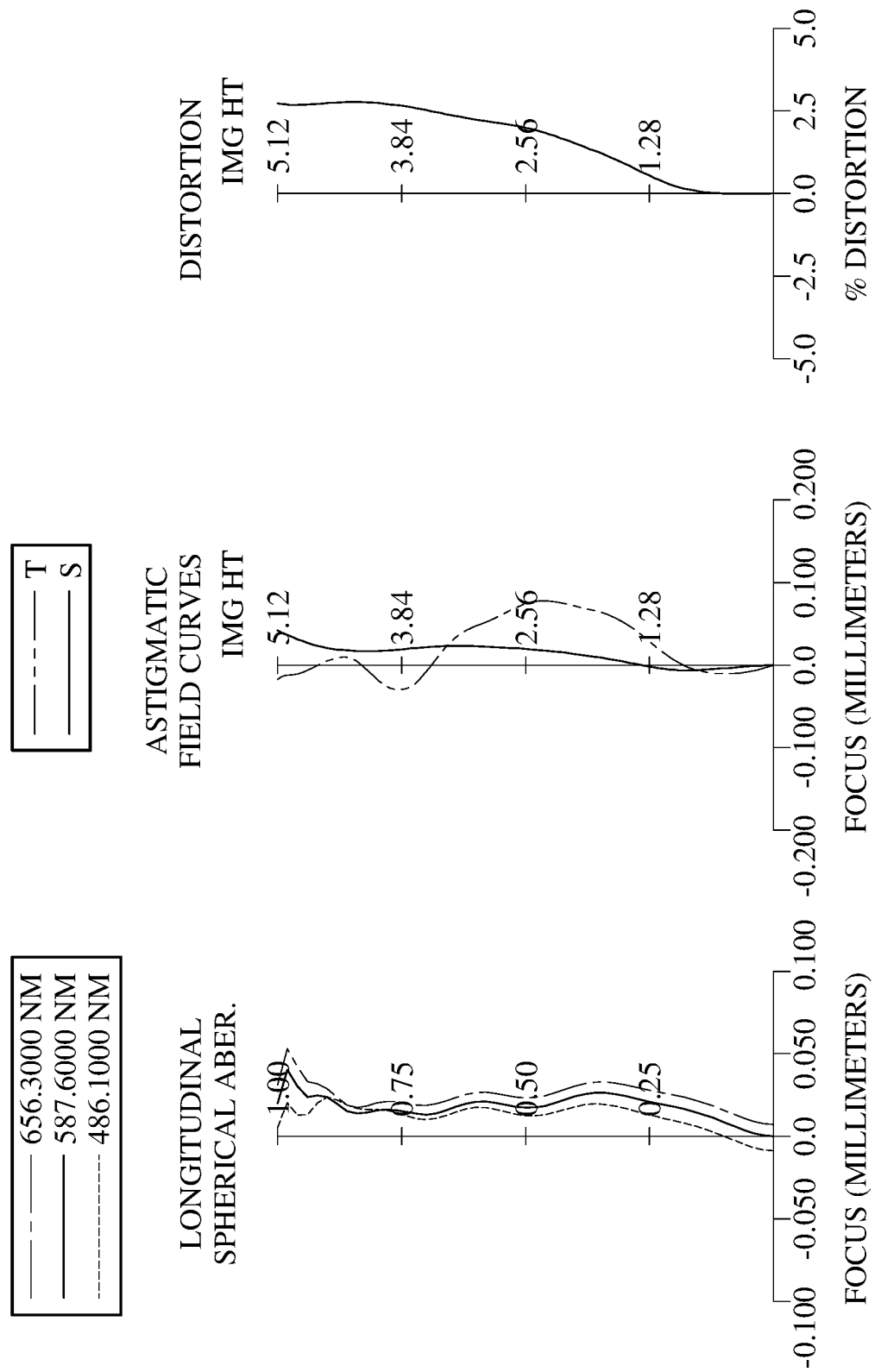
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes an imaging lens system (its reference numeral is omitted) of the present disclosure and an image sensor IS. The imaging lens system includes, in order from an object side to an image side along an optical path, an aperture stop ST, a first lens element E1, a second lens element E2, a third lens element E3, a stop S1, a fourth lens element E4, a stop S2, a fifth lens element E5, a sixth lens element E6, a seventh lens element E7 and an image surface IMG. The imaging lens system includes seven lens elements (E1, E2, E3, E4, E5, E6 and E7) with no additional lens element disposed between each of the adjacent seven lens elements.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric. The object-side surface of the first lens element E1 has one inflection point in an off-axis region thereof. The image-side surface of the first lens element E1 has one inflection point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point in an off-axis region thereof. The image-side surface of the second lens element E2 has one inflection point in an off-axis region thereof.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has one inflection point in an off-axis region thereof. The image-side surface of the third lens element E3 has two inflection points in an off-axis region thereof. The image-side surface of the third lens element E3 has one critical point in an off-axis region thereof.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The image-side surface of the fourth lens element E4 has two inflection points in an off-axis region thereof. The image-side surface of the fourth lens element E4 has one critical point in an off-axis region thereof.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point in an off-axis region thereof. The image-side surface of the fifth lens element E5 has two inflection points in an off-axis region thereof.

The sixth lens element E6 with positive refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points in an off-axis region thereof. The image-side surface of the sixth lens element E6 has two inflection points in an off-axis region thereof. The object-side surface of the sixth lens element E6 has one critical point in an off-axis region thereof. The image-side surface of the sixth lens element E6 has one critical point in an off-axis region thereof.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The object-side surface of the seventh lens element E7 has three inflection points in an off-axis region thereof. The image-side surface of the seventh lens element E7 has two inflection points in an off-axis region thereof. The image-side surface of the seventh lens element E7 has one critical point in an off-axis region thereof.

In this embodiment, the first lens element E1 has an average light transmission less than 10% at wavelengths of 700 nm to 1000 nm for infrared filtering. For example, a lens surface of the first lens element can be coated with a film configured to absorb infrared light. The image sensor IS is disposed on or near the image surface IMG of the imaging lens system.

The detailed optical data of the 6th embodiment are shown in Table 6A and the aspheric surface data are shown in Table 6B below.

TABLE 6A

6th Embodiment f = 5.77 mm, Fno = 1.65, HFOV = 40.7 deg.

| Surface # |           | Curvature Radius |       | Thickness | Material | Index | Abbe # | Focal Length |
|-----------|-----------|------------------|-------|-----------|----------|-------|--------|--------------|
| 0         | Object    | Plano            |       | Infinity  |          |       |        |              |
| 1         | Ape. Stop | Plano            |       | −0.801    |          |       |        |              |
| 2         | Lens 1    | 2.2735           | (ASP) | 0.775     | Glass    | 1.589 | 61.2   | 6.95         |
| 3         |           | 4.4634           | (ASP) | 0.273     |          |       |        |              |
| 4         | Lens 2    | 4.4035           | (ASP) | 0.215     | Plastic  | 1.686 | 18.4   | −13.55       |
| 5         |           | 2.9286           | (ASP) | 0.084     |          |       |        |              |
| 6         | Lens 3    | 5.4551           | (ASP) | 0.572     | Plastic  | 1.544 | 56.0   | 9.25         |
| 7         |           | −62.8713         | (ASP) | 0.069     |          |       |        |              |
| 8         | Stop      | Plano            |       | 0.306     |          |       |        |              |
| 9         | Lens 4    | −72.7305         | (ASP) | 0.382     | Plastic  | 1.686 | 18.4   | −44.20       |
| 10        |           | 52.1165          | (ASP) | −0.170    |          |       |        |              |
| 11        | Stop      | Plano            |       | 0.705     |          |       |        |              |
| 12        | Lens 5    | −17.4418         | (ASP) | 0.382     | Plastic  | 1.596 | 30.7   | −39.80       |
| 13        |           | −66.4155         | (ASP) | 0.269     |          |       |        |              |
| 14        | Lens 6    | 1.6317           | (ASP) | 0.335     | Plastic  | 1.544 | 56.0   | 9.34         |
| 15        |           | 2.2299           | (ASP) | 1.272     |          |       |        |              |
| 16        | Lens 7    | −3.7645          | (ASP) | 0.407     | Plastic  | 1.534 | 56.0   | −4.81        |
| 17        |           | 8.3858           | (ASP) | 0.617     |          |       |        |              |
| 18        | Image     | Plano            |       | —         |          |       |        |              |

Note:

Reference wavelength is 587.6 nm (d-line).

An effective radius of the stop S1 (Surface 8) is 1.385 mm.

An effective radius of the stop S2 (Surface 11) is 1.707 mm.

TABLE 6B

| Aspheric Coefficients | | | | |
|---|---|---|---|---|
| Surface # | 2 | 3 | 4 | 5 |
| k = | 0.00000E+00 | 0.00000E+00 | 0.00000E+00 | 0.00000E+00 |
| A4 = | −1.579954566E−02 | −2.385950348E−03 | −4.795225350E−02 | −6.465978170E−02 |
| A6 = | 8.601091708E−02 | 2.434785713E−02 | 2.135686203E−02 | 8.969129768E−02 |
| A8 = | −2.699064219E−01 | −6.369713349E−02 | 6.132676249E−03 | −2.308705330E−01 |
| A10 = | 5.426283591E−01 | 9.947914988E−02 | −5.458108197E−02 | 4.539475782E−01 |
| A12 = | −7.307723773E−01 | −7.798074137E−02 | 1.005288177E−01 | −5.912689708E−01 |
| A14 = | 6.782597920E−01 | 1.111295149E−02 | −1.072020189E−01 | 4.893747865E−01 |
| A16 = | −4.395403986E−01 | 3.316708446E−02 | 7.412098250E−02 | −2.514305705E−01 |
| A18 = | 1.984835919E−01 | −3.059236346E−02 | −3.353887435E−02 | 7.737931329E−02 |
| A20 = | −6.120328913E−02 | 1.245518191E−02 | 9.568226990E−03 | −1.303863573E−02 |
| A22 = | 1.228038848E−02 | −2.532088520E−03 | −1.557044627E−03 | 9.230897470E−04 |
| A24 = | −1.444017963E−03 | 2.080631681E−04 | 1.096903741E−04 | — |
| A26 = | 7.541754840E−05 | — | — | — |

| Surface # | 6 | 7 | 9 | 10 |
|---|---|---|---|---|
| k = | 0.00000E+00 | 0.00000E+00 | 0.00000E+00 | 5.89686E+01 |
| A4 = | −2.111966069E−02 | −4.749187371E−02 | −4.944438770E−02 | −4.626161131E−02 |
| A6 = | 1.054000276E−01 | 3.144922120E−01 | −6.250212157E−02 | 7.911447312E−03 |
| A8 = | −3.673740404E−01 | −1.603128131E+00 | 2.708291080E−01 | −1.646336607E−02 |
| A10 = | 8.416007582E−01 | 5.047586158E+00 | −7.014457313E−01 | −5.923663000E−03 |
| A12 = | −1.247182519E+00 | −1.030929677E+01 | 1.120389354E+00 | 9.428068399E−02 |
| A14 = | 1.213504618E+00 | 1.418302824E+01 | −1.131893839E+00 | −2.138625561E−01 |
| A16 = | −7.848978810E−01 | −1.338581457E+01 | 7.082259738E−01 | 2.591183328E−01 |
| A18 = | 3.383507515E−01 | 8.680102132E+00 | −2.453043658E−01 | −1.926302660E−01 |
| A20 = | −9.458462491E−02 | −3.799762715E+00 | 2.334067240E−02 | 9.045591455E−02 |
| A22 = | 1.566516173E−02 | 1.072387988E+00 | 1.399115810E−02 | −2.620001436E−02 |
| A24 = | −1.173001111E−03 | −1.760677805E−01 | −5.069459930E−03 | 4.276458947E−03 |
| A26 = | — | 1.276852121E−02 | 5.166892998E−04 | −3.008477474E−04 |

| Surface # | 12 | 13 | 14 | 15 |
|---|---|---|---|---|
| k = | 0.00000E+00 | 1.88628E−05 | −1.03075E+00 | −9.00116E−01 |
| A4 = | −4.549126682E−02 | −1.631057617E−01 | −1.367627512E−01 | −6.661356956E−03 |
| A6 = | 4.413444481E−02 | 1.677147753E−01 | 7.422296065E−02 | −5.353834448E−02 |
| A8 = | −9.799781160E−02 | −1.231111236E−01 | −5.680111304E−02 | 4.532090517E−02 |
| A10 = | 3.225653171E−01 | 4.749907149E−02 | 3.652480008E−02 | −2.429303031E−02 |
| A12 = | −7.651012873E−01 | 3.825322230E−03 | −1.835686537E−02 | 8.940114069E−03 |
| A14 = | 1.129506073E+00 | −1.701214333E−02 | 6.815924719E−03 | −2.286726779E−03 |
| A16 = | −1.089654047E+00 | 1.083047003E−02 | −1.826178450E−03 | 4.039075210E−04 |
| A18 = | 7.104861915E−01 | −3.855506934E−03 | 3.491762584E−04 | −4.763039727E−05 |
| A20 = | −3.163126522E−01 | 8.636458544E−04 | −4.693361945E−05 | 3.390404961E−06 |
| A22 = | 9.489637363E−02 | −1.209039650E−04 | 4.315599245E−06 | −9.347787923E−08 |
| A24 = | −1.836071664E−02 | 9.662002392E−06 | −2.579376848E−07 | −5.196521879E−09 |
| A26 = | 2.068981895E−03 | −3.356121915E−07 | 9.021668504E−09 | 5.068026708E−10 |
| A28 = | −1.031014377E−04 | — | −1.401216882E−10 | −1.233671203E−11 |

| Surface # | 16 | 17 |
|---|---|---|
| k = | 0.00000E+00 | 0.00000E+00 |
| A4 = | −9.246737698E−02 | −1.147714976E−01 |
| A6 = | 8.888414840E−02 | 8.627349062E−02 |
| A8 = | −6.638046240E−02 | −5.389312035E−02 |
| A10 = | 3.603605988E−02 | 2.403699986E−02 |
| A12 = | −1.345178953E−02 | −7.612905740E−03 |
| A14 = | 3.514848700E−03 | 1.730581786E−03 |
| A16 = | −6.568700747E−04 | −2.845743428E−04 |
| A18 = | 8.854935365E−05 | 3.377554930E−05 |
| A20 = | −8.545859098E−06 | −2.852585395E−06 |
| A22 = | 5.752010010E−07 | 1.665036547E−07 |
| A24 = | −2.559268549E−08 | −6.363998087E−09 |
| A26 = | 6.751019929E−10 | 1.430038014E−10 |
| A28 = | −7.980350168E−12 | −1.430313904E−12 |

In the 6th embodiment, the equation of the aspheric surface profiles of the aforementioned lens elements is the same as the equation of the 1st embodiment. Also, the definitions of these parameters shown in Table 6C below are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

Values of Conditional Expressions

| | |
|---|---|
| f [mm] | 5.77 |
| Fno | 1.65 |
| HFOV [deg.] | 40.7 |
| (V1 + V3)/V2 | 6.37 |
| (CT1 + CT2 + CT3)/T34 | 4.17 |
| (T45 + T56)/CT5 | 2.10 |
| CT3/T23 | 6.81 |
| minT37/minCT46 | 0.80 |
| T34/T12 | 1.37 |
| T67/CT6 | 3.80 |
| TL/ImgH | 1.27 |
| (R1 + R2)/f1 | 0.97 |
| (R11 + R12)/f | 0.67 |
| R13/f7 | 0.78 |
| R2/R3 | 1.01 |
| R5/R4 | 1.86 |
| \|f/f4\| + \|f/f5\| + \|f/f6\| | 0.89 |
| f2/f3 | −1.46 |
| f23/f | 5.25 |
| CRA [deg.] | 40.0 |
| ImgH/BL | 8.30 |
| Y72/Y11 | 2.06 |
| Yc61/Y61 | 0.51 |
| Yc62/Y62 | 0.59 |

7th Embodiment

Figure 13:
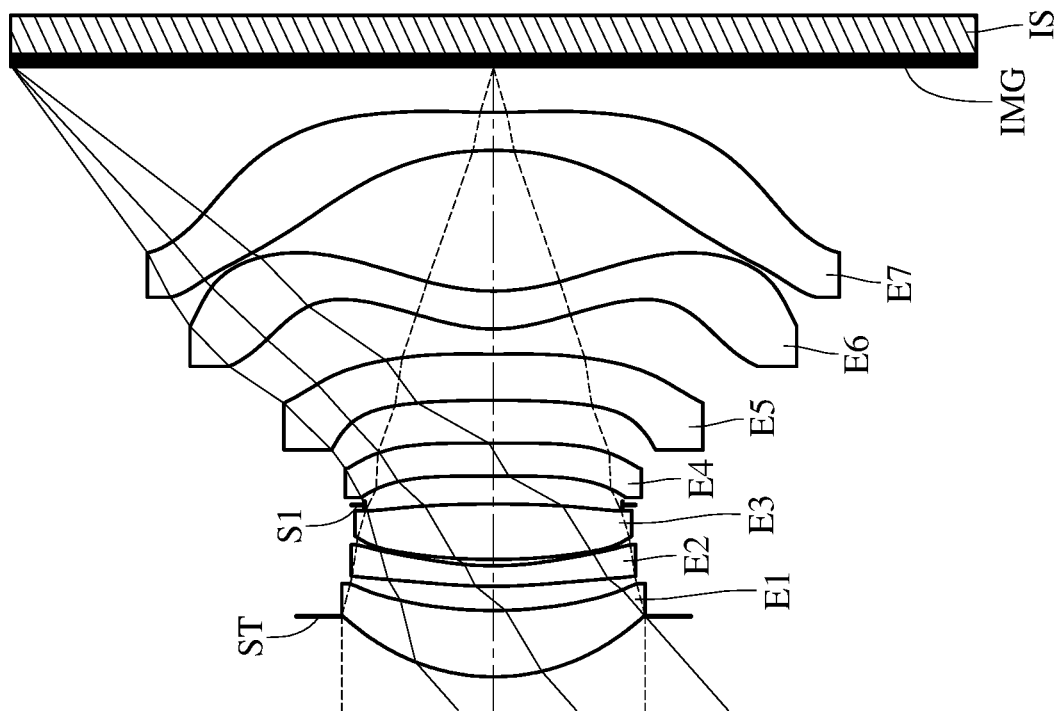
FIG. 13 is a schematic view of an image capturing unit according to the 7th embodiment of the present disclosure.
Figure 14:
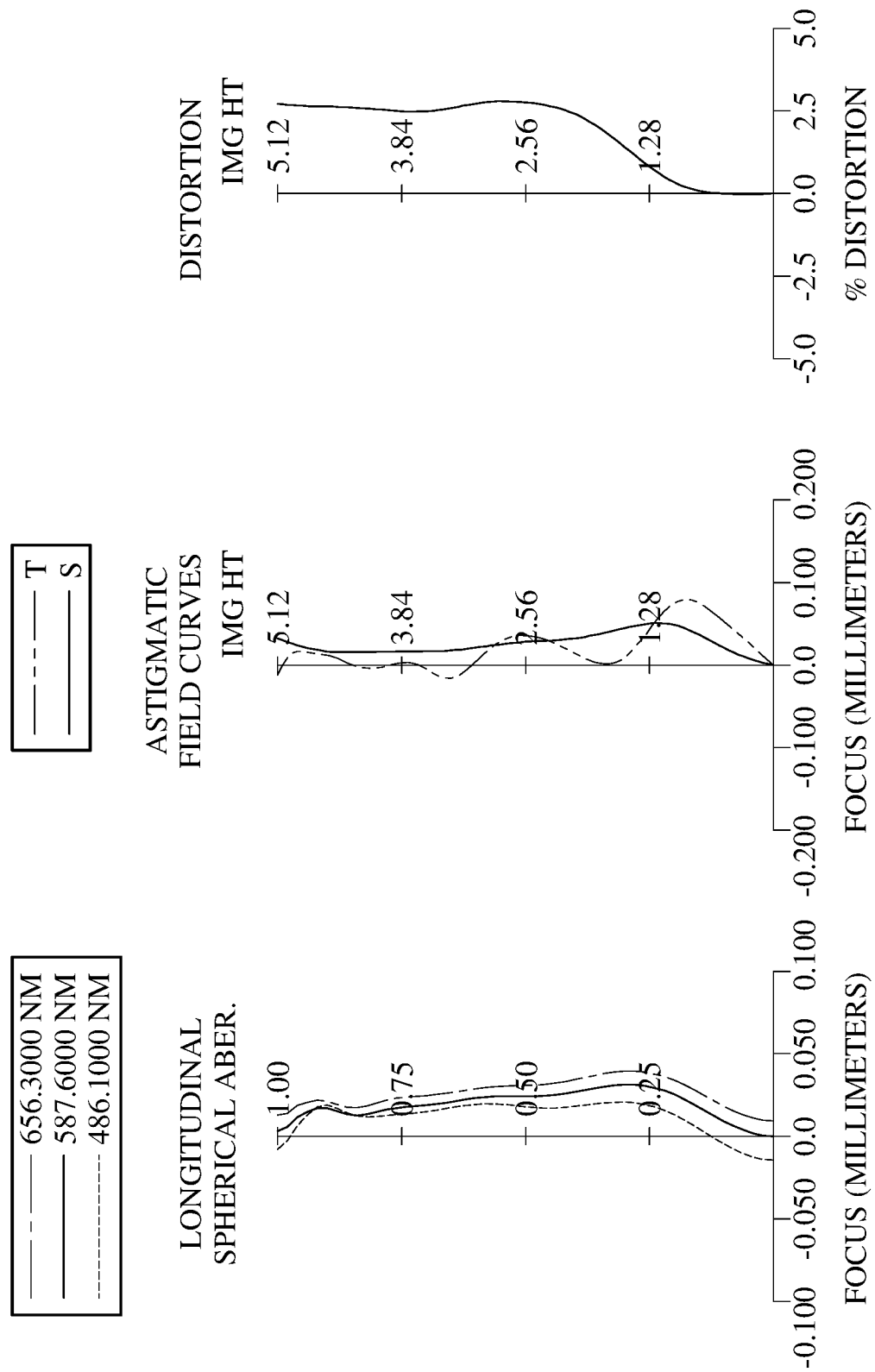
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes an imaging lens system (its reference numeral is omitted) of the present disclosure and an image sensor IS. The imaging lens system includes, in order from an object side to an image side along an optical path, an aperture stop ST, a first lens element E1, a second lens element E2, a third lens element E3, a stop S1, a fourth lens element E4, a fifth lens element E5, a sixth lens element E6, a seventh lens element E7 and an image surface IMG. The imaging lens system includes seven lens elements (E1, E2, E3, E4, E5, E6 and E7) with no additional lens element disposed between each of the adjacent seven lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point in an off-axis region thereof. The image-side surface of the first lens element E1 has one inflection point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has three inflection points in an off-axis region thereof. The image-side surface of the second lens element E2 has one inflection point in an off-axis region thereof.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The image-side surface of the third lens element E3 has one inflection point in an off-axis region thereof. The image-side surface of the third lens element E3 has one critical point in an off-axis region thereof.

The fourth lens element E4 with positive refractive power has an object-side surface being planar in a paraxial region thereof and an image-side surface being convex in a paraxial region thereof. The fourth lens element E4 is made of plastic material and has the object-side surface and the image-side surface being both aspheric. The image-side surface of the fourth lens element E4 has one inflection point in an off-axis region thereof.

The fifth lens element E5 with negative refractive power has an object-side surface being concave in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point in an off-axis region thereof. The image-side surface of the fifth lens element E5 has three inflection points in an off-axis region thereof. The image-side surface of the fifth lens element E5 has one critical point in an off-axis region thereof.

The sixth lens element E6 with positive refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points in an off-axis region thereof. The image-side surface of the sixth lens element E6 has two inflection points in an off-axis region thereof. The object-side surface of the sixth lens element E6 has one critical point in an off-axis region thereof. The image-side surface of the sixth lens element E6 has one critical point in an off-axis region thereof.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The object-side surface of the seventh lens element E7 has three inflection points in an off-axis region thereof. The image-side surface of the seventh lens element E7 has two inflection points in an off-axis region thereof. The image-side surface of the seventh lens element E7 has one critical point in an off-axis region thereof.

In this embodiment, the first lens element E1 has an average light transmission less than 10% at wavelengths of 700 nm to 1000 nm for infrared filtering. For example, a lens surface of the first lens element can be coated with a film configured to absorb infrared light. The image sensor IS is disposed on or near the image surface IMG of the imaging lens system.

The detailed optical data of the 7th embodiment are shown in Table 7A and the aspheric surface data are shown in Table 7B below.

TABLE 7A

7th Embodiment
f = 5.64 mm, Fno = 1.75, HFOV = 41.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.643 | | | | |
| 2 | Lens 1 | 2.2567 | (ASP) | 0.705 | Plastic | 1.545 | 56.1 | 7.30 |
| 3 | | 4.6378 | (ASP) | 0.257 | | | | |
| 4 | Lens 2 | 5.2990 | (ASP) | 0.219 | Plastic | 1.686 | 18.4 | −13.47 |
| 5 | | 3.3113 | (ASP) | 0.067 | | | | |
| 6 | Lens 3 | 6.4325 | (ASP) | 0.589 | Plastic | 1.544 | 56.0 | 8.81 |
| 7 | | −18.1953 | (ASP) | −0.008 | | | | |
| 8 | Stop | Plano | | 0.306 | | | | |
| 9 | Lens 4 | ∞ | (ASP) | 0.351 | Plastic | 1.686 | 18.4 | 209.72 |
| 10 | | −143.8872 | (ASP) | 0.455 | | | | |
| 11 | Lens 5 | −17.5449 | (ASP) | 0.491 | Plastic | 1.587 | 28.3 | −15.81 |
| 12 | | 19.9138 | (ASP) | 0.267 | | | | |
| 13 | Lens 6 | 1.6454 | (ASP) | 0.403 | Plastic | 1.544 | 56.0 | 8.88 |
| 14 | | 2.2802 | (ASP) | 1.496 | | | | |
| 15 | Lens 7 | −3.7587 | (ASP) | 0.404 | Plastic | 1.534 | 56.0 | −4.49 |
| 16 | | 6.8858 | (ASP) | 0.487 | | | | |
| 17 | Image | Plano | | — | | | | |

Note:
Reference wavelength is 587.6 nm (d-line).
An effective radius of the stop S1 (Surface 8) is 1.370 mm.

TABLE 7B

Aspheric Coefficients

| Surface # | 2 | 3 | 4 | 5 |
|---|---|---|---|---|
| k = | 0.00000E+00 | 0.00000E+00 | 0.00000E+00 | 0.00000E+00 |
| A4 = | 2.660090189E−03 | −4.652812517E−03 | −5.392844508E−02 | −6.497705310E−02 |
| A6 = | −1.061156140E−02 | 3.183371639E−04 | 5.273886687E−02 | 1.273399283E−01 |
| A8 = | 1.099237486E−02 | 6.308238502E−02 | −1.076559710E−01 | −3.749808381E−01 |
| A10 = | 1.121081200E−02 | −2.529473863E−01 | 2.148391246E−01 | 8.117861079E−01 |
| A12 = | −4.986213959E−02 | 5.282516975E−01 | −3.057133457E−01 | −1.145838450E+00 |
| A14 = | 7.484315086E−02 | −6.732699517E−01 | 2.905046264E−01 | 1.020662731E+00 |
| A16 = | −6.847907978E−02 | 5.499930967E−01 | −1.793108615E−01 | −5.658182870E−01 |
| A18 = | 4.215994060E−02 | −2.892042600E−01 | 6.955512863E−02 | 1.894143456E−01 |
| A20 = | −1.758112061E−02 | 9.467758699E−02 | −1.582117908E−02 | −3.512252528E−02 |
| A22 = | 4.751251142E−03 | −1.754814908E−02 | 1.799492031E−03 | 2.775188750E−03 |
| A24 = | −7.474867870E−04 | 1.404568546E−03 | −6.401762273E−05 | — |
| A26 = | 5.170561289E−05 | — | — | — |

| Surface # | 6 | 7 | 9 | 10 |
|---|---|---|---|---|
| k = | 0.00000E+00 | 0.00000E+00 | 0.00000E+00 | 0.00000E+00 |
| A4 = | −1.631290112E−02 | −4.434795125E−02 | −8.757690002E−02 | −1.370739685E−02 |
| A6 = | 1.030789362E−01 | 2.407366848E−01 | 2.679893497E−01 | −2.288973414E−01 |
| A8 = | −3.667537446E−01 | −1.202307250E+00 | −1.165424742E+00 | 1.010410723E+00 |
| A10 = | 8.444646979E−01 | 3.809797139E+00 | 3.147739531E+00 | −2.733795644E+00 |
| A12 = | −1.221387646E+00 | −7.977829181E+00 | −5.625610619E+00 | 4.798087786E+00 |
| A14 = | 1.102441868E+00 | 1.139141900E+01 | 6.842655151E+00 | −5.688282389E+00 |
| A16 = | −6.206947120E−01 | −1.123742557E+01 | −5.722494259E+00 | 4.643158316E+00 |
| A18 = | 2.161156697E−01 | 7.642303914E+00 | 3.270086058E+00 | −2.612889004E+00 |
| A20 = | −4.491647333E−02 | −3.511649681E+00 | −1.243786771E+00 | 9.955229634E−01 |
| A22 = | 5.121284878E−03 | 1.039540787E+00 | 2.972040523E−01 | −2.451484323E−01 |
| A24 = | −2.562996340E−04 | −1.787122668E−01 | −3.950349300E−02 | 3.519352063E−02 |
| A26 = | — | 1.353982156E−02 | 2.137756046E−03 | −2.235577961E−03 |

| Surface # | 11 | 12 | 13 | 14 |
|---|---|---|---|---|
| k = | 0.00000E+00 | 0.00000E+00 | −1.02319E+00 | −8.73067E−01 |
| A4 = | −3.724592780E−02 | −1.741987968E−01 | −1.698444308E−01 | −3.227921459E−02 |
| A6 = | 3.177357547E−02 | 2.404344044E−01 | 1.520236530E−01 | −1.313733034E−03 |
| A8 = | 1.126613664E−02 | −2.573218856E−01 | −1.448563763E−01 | −4.547455663E−03 |
| A10 = | −8.771950802E−02 | 2.045516359E−01 | 1.025233877E−01 | 6.494984237E−03 |
| A12 = | 9.573015237E−02 | −1.181445637E−01 | −5.200523674E−02 | −3.874435665E−03 |
| A14 = | −1.044774948E−02 | 4.829349915E−02 | 1.887736127E−02 | 1.411007885E−03 |
| A16 = | −8.152978465E−02 | −1.371885795E−02 | −4.917466655E−03 | −3.480534919E−04 |

TABLE 7B-continued

| Aspheric Coefficients | | | | |
|---|---|---|---|---|
| A18 = | 1.002352896E−01 | 2.651514935E−03 | 9.152760334E−04 | 6.032528030E−05 |
| A20 = | −6.258520285E−02 | −3.369329506E−04 | −1.200198505E−04 | −7.385748450E−06 |
| A22 = | 2.369121007E−02 | 2.655367308E−05 | 1.078753111E−05 | 6.266383812E−07 |
| A24 = | −5.489089278E−03 | −1.165859315E−06 | −6.311844594E−07 | −3.505767778E−08 |
| A26 = | 7.181064539E−04 | 2.207428890E−08 | 2.163342156E−08 | 1.161625912E−09 |
| A28 = | −4.067199985E−05 | — | −3.294442771E−10 | −1.722591605E−11 |

| Surface # | 15 | 16 |
|---|---|---|
| k = | 0.00000E+00 | 0.00000E+00 |
| A4 = | −9.830002208E−02 | −1.386762104E−01 |
| A6 = | 1.100491709E−01 | 1.138066763E−01 |
| A8 = | −7.891926833E−02 | −6.436364962E−02 |
| A10 = | 3.783763830E−02 | 2.494902783E−02 |
| A12 = | −1.277503092E−02 | −6.905447754E−03 |
| A14 = | 3.167921626E−03 | 1.381402970E−03 |
| A16 = | −5.838301080E−04 | −1.991333507E−04 |
| A18 = | 7.922875379E−05 | 2.043940712E−05 |
| A20 = | −7.744511841E−06 | −1.463041828E−06 |
| A22 = | 5.266728774E−07 | 7.053677909E−08 |
| A24 = | −2.353171713E−08 | −2.153944195E−09 |
| A26 = | 6.190214834E−10 | 3.690259967E−11 |
| A28 = | −7.250920239E−12 | −2.613374881E−13 |

In the 7th embodiment, the equation of the aspheric surface profiles of the aforementioned lens elements is the same as the equation of the 1st embodiment. Also, the definitions of these parameters shown in Table 7C below are the same as those stated in the 1st embodiment with corresponding values for the 7th embodiment, so an explanation in this regard will not be provided again.

Moreover, these parameters can be calculated from Table 7A and Table 7B as the following values and satisfy the following conditions:

TABLE 7C

| Values of Conditional Expressions | |
|---|---|
| f[mm] | 5.64 |
| Fno | 1.75 |
| HFOV [deg.] | 41.4 |
| (V1 + V3)/V2 | 6.10 |
| (CT1 + CT2 + CT3)/T34 | 5.08 |
| (T45 + T56)/CT5 | 1.47 |
| CT3/T23 | 8.79 |
| minT37/minCT46 | 0.76 |
| T34/T12 | 1.16 |
| T67/CT6 | 3.71 |
| TL/ImgH | 1.27 |
| (R1 + R2)/f1 | 0.94 |
| (R11 + R12)/f | 0.70 |
| R13/f7 | 0.84 |
| R2/R3 | 0.88 |
| R5/R4 | 1.94 |
| |f/f4| + |f/f5| + |f/f6| | 1.02 |
| f2/f3 | −1.53 |
| f23/f | 4.57 |
| CRA [deg.] | 42.6 |
| ImgH/BL | 10.51 |
| Y72/Y11 | 2.28 |
| Yc61/Y61 | 0.57 |
| Yc62/Y62 | 0.65 |

8th Embodiment

Figure 15:
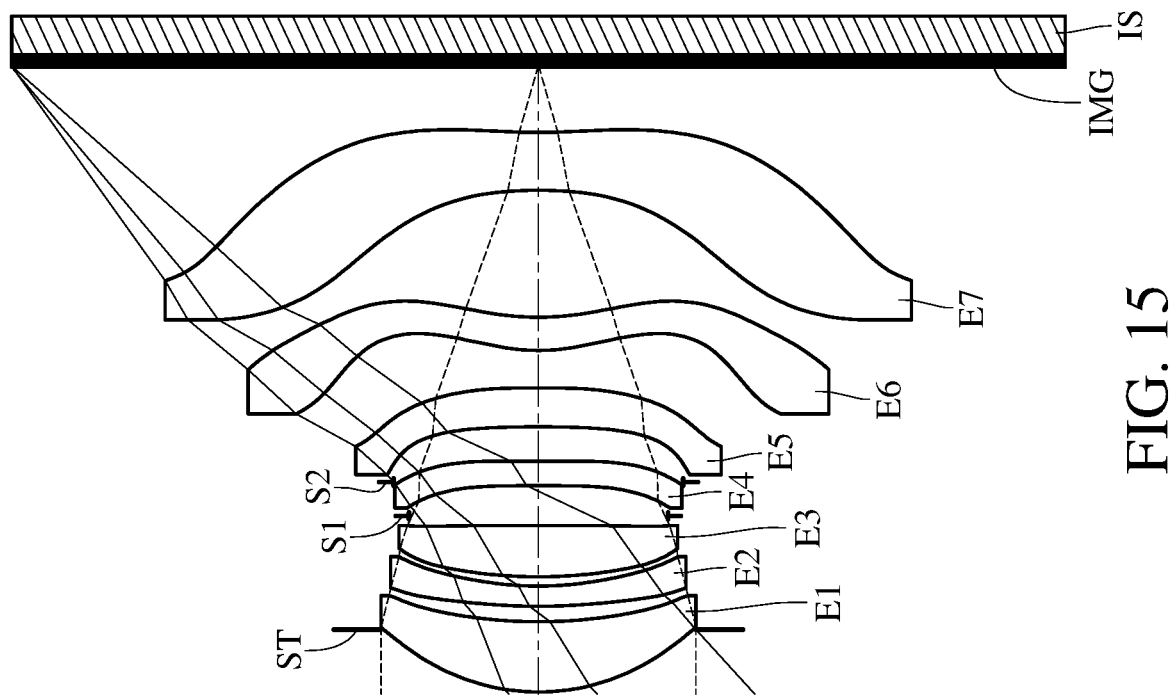
FIG. 15 is a schematic view of an image capturing unit according to the 8th embodiment of the present disclosure.
Figure 16:
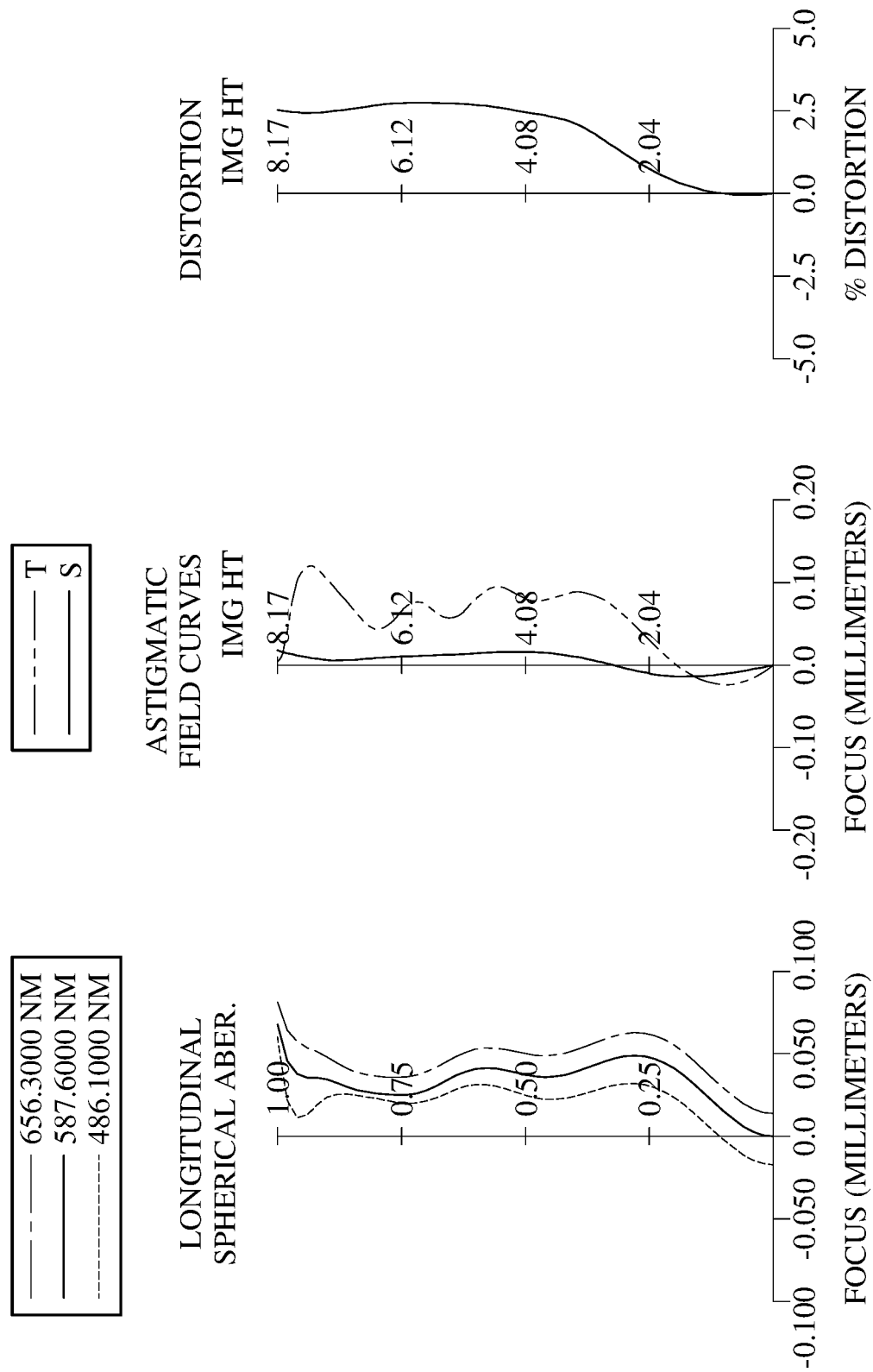
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes an imaging lens system (its reference numeral is omitted) of the present disclosure and an image sensor IS. The imaging lens system includes, in order from an object side to an image side along an optical path, an aperture stop ST, a first lens element E1, a second lens element E2, a third lens element E3, a stop S1, a fourth lens element E4, a stop S2, a fifth lens element E5, a sixth lens element E6, a seventh lens element E7 and an image surface IMG. The imaging lens system includes seven lens elements (E1, E2, E3, E4, E5, E6 and E7) with no additional lens element disposed between each of the adjacent seven lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point in an off-axis region thereof. The image-side surface of the first lens element E1 has one inflection point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point in an off-axis region thereof. The image-side surface of the second lens element E2 has one inflection point in an off-axis region thereof.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point in an off-axis region thereof. The image-side surface of the third lens element E3 has three inflection points in an off-axis region thereof. The image-side surface of the third lens element E3 has two critical points in an off-axis region thereof.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The image-side surface of the fourth lens element E4 has two inflection points in an off-axis region thereof. The image-side surface of the fourth lens element E4 has one critical point in an off-axis region thereof.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point in an off-axis region thereof. The image-side surface of the fifth lens element E5 has two inflection points in an off-axis region thereof.

The sixth lens element E6 with positive refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points in an off-axis region thereof. The image-side surface of the sixth lens element E6 has one inflection point in an off-axis region thereof. The object-side surface of the sixth lens element E6 has one critical point in an off-axis region thereof. The image-side surface of the sixth lens element E6 has one critical point in an off-axis region thereof.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The object-side surface of the seventh lens element E7 has two inflection points in an off-axis region thereof. The image-side surface of the seventh lens element E7 has three inflection points in an off-axis region thereof. The object-side surface of the seventh lens element E7 has two critical points in an off-axis region thereof. The image-side surface of the seventh lens element E7 has one critical point in an off-axis region thereof.

In this embodiment, the first lens element E1 has an average light transmission less than 10% at wavelengths of 700 nm to 1000 nm for infrared filtering. For example, a lens surface of the first lens element can be coated with a film configured to absorb infrared light. The image sensor IS is disposed on or near the image surface IMG of the imaging lens system.

The detailed optical data of the 8th embodiment are shown in Table 8A and the aspheric surface data are shown in Table 8B below.

TABLE 8A

8th Embodiment
f = 8.74 mm, Fno = 1.79, HFOV = 42.2 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.970 |  |  |  |  |
| 2 | Lens 1 | 3.3066 | (ASP) | 1.091 | Plastic | 1.545 | 56.1 | 9.71 |
| 3 |  | 7.7904 | (ASP) | 0.240 |  |  |  |  |
| 4 | Lens 2 | 9.2183 | (ASP) | 0.314 | Plastic | 1.656 | 21.3 | −18.37 |
| 5 |  | 5.1522 | (ASP) | 0.144 |  |  |  |  |
| 6 | Lens 3 | 7.4286 | (ASP) | 0.794 | Plastic | 1.544 | 56.0 | 14.15 |
| 7 |  | 202.3349 | (ASP) | 0.152 |  |  |  |  |
| 8 | Stop | Plano |  | 0.468 |  |  |  |  |
| 9 | Lens 4 | −96.3586 | (ASP) | 0.380 | Plastic | 1.705 | 14.0 | −49.07 |
| 10 |  | 54.0288 | (ASP) | −0.324 |  |  |  |  |
| 11 | Stop | Plano |  | 0.858 |  |  |  |  |
| 12 | Lens 5 | −31.1781 | (ASP) | 0.604 | Plastic | 1.614 | 25.6 | −160.03 |
| 13 |  | −45.9997 | (ASP) | 0.582 |  |  |  |  |
| 14 | Lens 6 | 2.8959 | (ASP) | 0.514 | Plastic | 1.566 | 37.4 | 16.24 |
| 15 |  | 3.9561 | (ASP) | 1.972 |  |  |  |  |
| 16 | Lens 7 | −7.0672 | (ASP) | 0.899 | Plastic | 1.534 | 56.0 | −7.15 |
| 17 |  | 8.6957 | (ASP) | 1.009 |  |  |  |  |
| 18 | Image | Plano |  | — |  |  |  |  |

Note:
Reference wavelength is 587.6 nm (d-line).
An effective radius of the stop S1 (Surface 8) is 2.009 mm.
An effective radius of the stop S2 (Surface 11) is 2.246 mm.

TABLE 8B

| Aspheric Coefficients | | | | |
|---|---|---|---|---|
| Surface # | 2 | 3 | 4 | 5 |
| k = | 0.00000E+00 | 0.00000E+00 | 0.00000E+00 | 0.00000E+00 |
| A4 = | −3.324995461E−03 | 2.080905296E−03 | −1.904131433E−03 | −1.729360275E−03 |
| A6 = | 6.762095433E−03 | −1.664284383E−03 | −4.758489140E−03 | −5.386594426E−03 |
| A8 = | −9.030856584E−03 | 5.496081496E−04 | 6.115360990E−03 | 5.491638765E−03 |
| A10 = | 7.586166404E−03 | 4.367906542E−04 | −5.592380993E−03 | −4.129692247E−03 |
| A12 = | −4.267419655E−03 | −5.841505352E−04 | 3.759473820E−03 | 2.397521185E−03 |
| A14 = | 1.641787750E−03 | 2.979955727E−04 | −1.753810885E−03 | −1.009020205E−03 |
| A16 = | −4.341340907E−04 | −7.923553715E−05 | 5.594310597E−04 | 2.987637343E−04 |
| A18 = | 7.789736111E−05 | 1.035336377E−05 | −1.191777829E−04 | −5.729147246E−05 |
| A20 = | −9.152834965E−06 | −2.464390433E−07 | 1.616094945E−05 | 6.213294268E−06 |
| A22 = | 6.534769037E−07 | −8.457994717E−08 | −1.258079486E−06 | −2.856418699E−07 |
| A24 = | −2.406105010E−08 | 6.600084020E−09 | 4.264602285E−08 | — |
| A26 = | 2.822102602E−10 | — | — | — |

| Surface # | 6 | 7 | 9 | 10 |
|---|---|---|---|---|
| k = | 0.00000E+00 | 0.00000E+00 | 0.00000E+00 | 0.00000E+00 |
| A4 = | 6.194870005E−04 | −5.533054736E−03 | −1.681505047E−02 | −2.435342074E−02 |
| A6 = | 4.093626317E−04 | 1.189273331E−02 | −1.482761443E−02 | 2.170925665E−02 |
| A8 = | −3.531723684E−03 | −3.382003346E−02 | 4.125870379E−02 | −4.235776646E−02 |
| A10 = | 5.811005219E−03 | 5.726294496E−02 | −6.637043488E−02 | 5.847535197E−02 |
| A12 = | −5.402604235E−03 | −6.169040286E−02 | 6.776145770E−02 | −5.759492698E−02 |
| A14 = | 3.245204022E−03 | 4.437656003E−02 | −4.637884169E−02 | 4.046629663E−02 |
| A16 = | −1.283225596E−03 | −2.178818941E−02 | 2.186407870E−02 | −2.030835760E−02 |
| A18 = | 3.348874845E−04 | 7.326452177E−03 | −7.132403824E−03 | 7.267522537E−03 |
| A20 = | −5.561347570E−05 | −1.659081736E−03 | 1.583179230E−03 | −1.835289092E−03 |
| A22 = | 5.311133779E−06 | 2.417288982E−04 | −2.283040892E−04 | 3.189293825E−04 |
| A24 = | −2.213529056E−07 | −2.045368555E−05 | 1.928403412E−05 | −3.623867961E−05 |
| A26 = | — | 7.633122603E−07 | −7.237031000E−07 | 2.420718083E−06 |
| A28 = | — | — | — | −7.198111842E−08 |

| Surface # | 12 | 13 | 14 | 15 |
|---|---|---|---|---|
| k = | 0.00000E+00 | 0.00000E+00 | −9.73867E−01 | −9.12780E−01 |
| A4 = | −3.507663146E−02 | −5.359879858E−02 | −4.200516469E−02 | −1.550525135E−02 |
| A6 = | 5.527487363E−02 | 4.551399015E−02 | 8.331558112E−03 | −1.809297761E−03 |
| A8 = | −9.075631988E−02 | −4.455048167E−02 | −1.787498663E−03 | 1.304490666E−03 |
| A10 = | 1.096970521E−01 | 3.674729485E−02 | −1.066983066E−04 | −5.476530819E−04 |
| A12 = | −9.446890922E−02 | −2.266812096E−02 | 2.225939485E−04 | 1.559946654E−04 |
| A14 = | 5.765907397E−02 | 1.006069606E−02 | −7.901803001E−05 | −2.937169287E−05 |
| A16 = | −2.509907287E−02 | −3.188684388E−03 | 1.621372179E−05 | 3.710863821E−06 |
| A18 = | 7.803891713E−03 | 7.184170804E−04 | −2.215418260E−06 | −3.189761466E−07 |
| A20 = | −1.718105801E−03 | −1.137230023E−04 | 2.075403266E−07 | 1.864250870E−08 |
| A22 = | 2.613870689E−04 | 1.232484711E−05 | −1.312263961E−08 | −7.235637276E−10 |
| A24 = | −2.611764344E−05 | −8.685642716E−07 | 5.328114355E−10 | 1.746851456E−11 |
| A26 = | 1.540817452E−06 | 3.578428376E−08 | −1.249642337E−11 | −2.191827497E−13 |
| A28 = | −4.062435917E−08 | −6.529561296E−10 | 1.283997527E−13 | 4.657278596E−16 |
| A30 = | — | — | — | 1.277987237E−17 |

| Surface # | 16 | 17 |
|---|---|---|
| k = | 0.00000E+00 | 0.00000E+00 |
| A4 = | −2.159215438E−02 | −2.608507857E−02 |
| A6 = | 3.328088089E−03 | 5.770305762E−03 |
| A8 = | 2.221719178E−04 | −1.252806245E−03 |
| A10 = | −2.644860289E−04 | 2.438264127E−04 |
| A12 = | 6.310776959E−05 | −3.906261269E−05 |
| A14 = | −8.166355351E−06 | 4.695541117E−06 |
| A16 = | 6.729866399E−07 | −4.079290347E−07 |
| A18 = | −3.758139844E−08 | 2.542454662E−08 |
| A20 = | 1.455599474E−09 | −1.133713790E−09 |
| A22 = | −3.903055775E−11 | 3.580915996E−11 |
| A24 = | 7.056178742E−13 | −7.815499886E−13 |
| A26 = | −8.088368253E−15 | 1.120192731E−14 |
| A28 = | 5.157593531E−17 | −9.481899091E−17 |
| A30 = | −1.304976824E−19 | 3.590496097E−19 |

In the 8th embodiment, the equation of the aspheric surface profiles of the aforementioned lens elements is the same as the equation of the 1st embodiment. Also, the definitions of these parameters shown in Table 8C below are the same as those stated in the 1st embodiment with corresponding values for the 8th embodiment, so an explanation in this regard will not be provided again.

Moreover, these parameters can be calculated from Table 8A and Table 8B as the following values and satisfy the following conditions:

TABLE 8C

Values of Conditional Expressions

| | |
|---|---|
| f [mm] | 8.74 |
| Fno | 1.79 |
| HFOV [deg.] | 42.2 |
| (V1 + V3)/V2 | 5.27 |
| (CT1 + CT2 + CT3)/T34 | 3.55 |
| (T45 + T56)/CT5 | 1.85 |
| CT3/T23 | 5.51 |
| minT37/minCT46 | 1.41 |
| T34/T12 | 2.58 |
| T67/CT6 | 3.84 |
| TL/ImgH | 1.19 |
| (R1 + R2)/f1 | 1.14 |
| (R11 + R12)/f | 0.78 |
| R13/f7 | 0.99 |
| R2/R3 | 0.85 |
| R5/R4 | 1.44 |
| |f/f4| + |f/f5| + |f/f6| | 0.77 |
| f2/f3 | −1.30 |
| f23/f | 7.27 |
| CRA [deg.] | 40.0 |
| ImgH/BL | 8.09 |
| Y72/Y11 | 2.37 |
| Yc61/Y61 | 0.50 |
| Yc62/Y62 | 0.46 |

9th Embodiment

Figure 17:
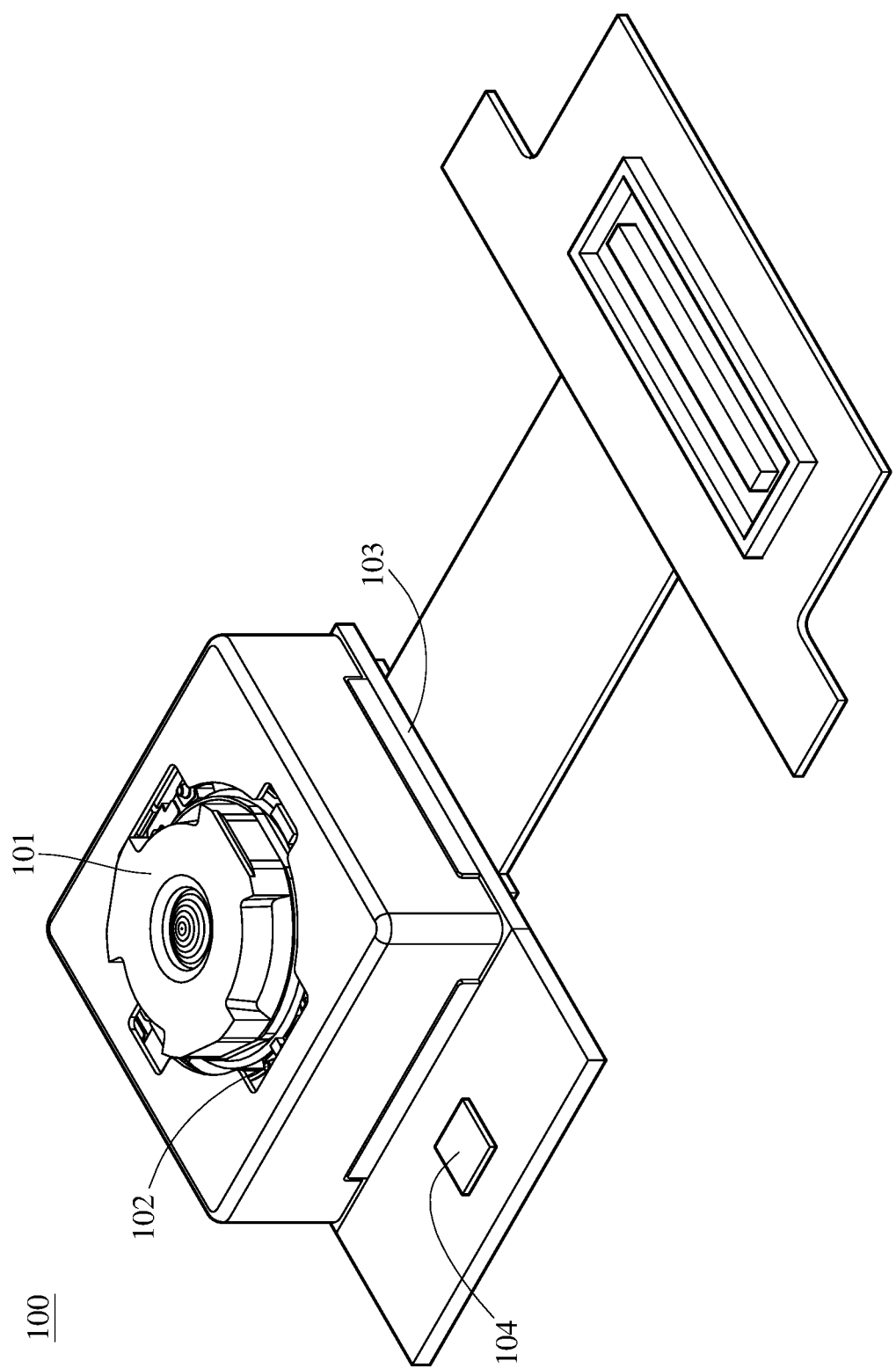
FIG. 17 is a perspective view of an image capturing unit according to the 9th embodiment of the present disclosure.

FIG. 17 is a perspective view of an image capturing unit according to the 9th embodiment of the present disclosure. In this embodiment, an image capturing unit 100 is a camera module including a lens unit 101, a driving device 102, an image sensor 103 and an image stabilizer 104. The lens unit 101 includes the imaging lens system as disclosed in the 1st embodiment, a barrel and a holder member (their reference numerals are omitted) for holding the imaging lens system. However, the lens unit 101 may alternatively be provided with the imaging lens system disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the imaging lens system to provide higher image quality.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

10th Embodiment

Figure 18:
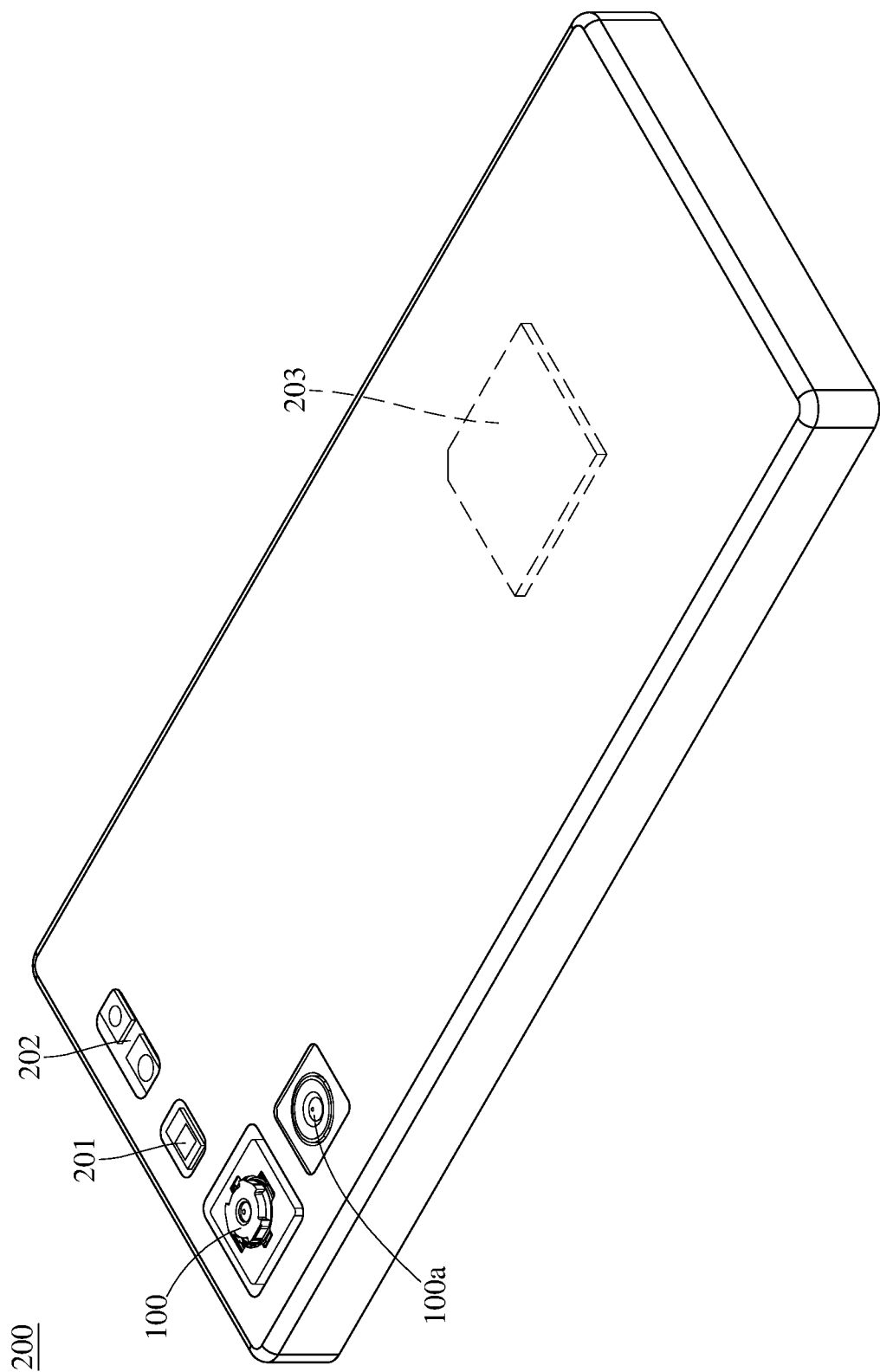
FIG. 18 is one perspective view of an electronic device according to the 10th embodiment of the present disclosure.
Figure 19:
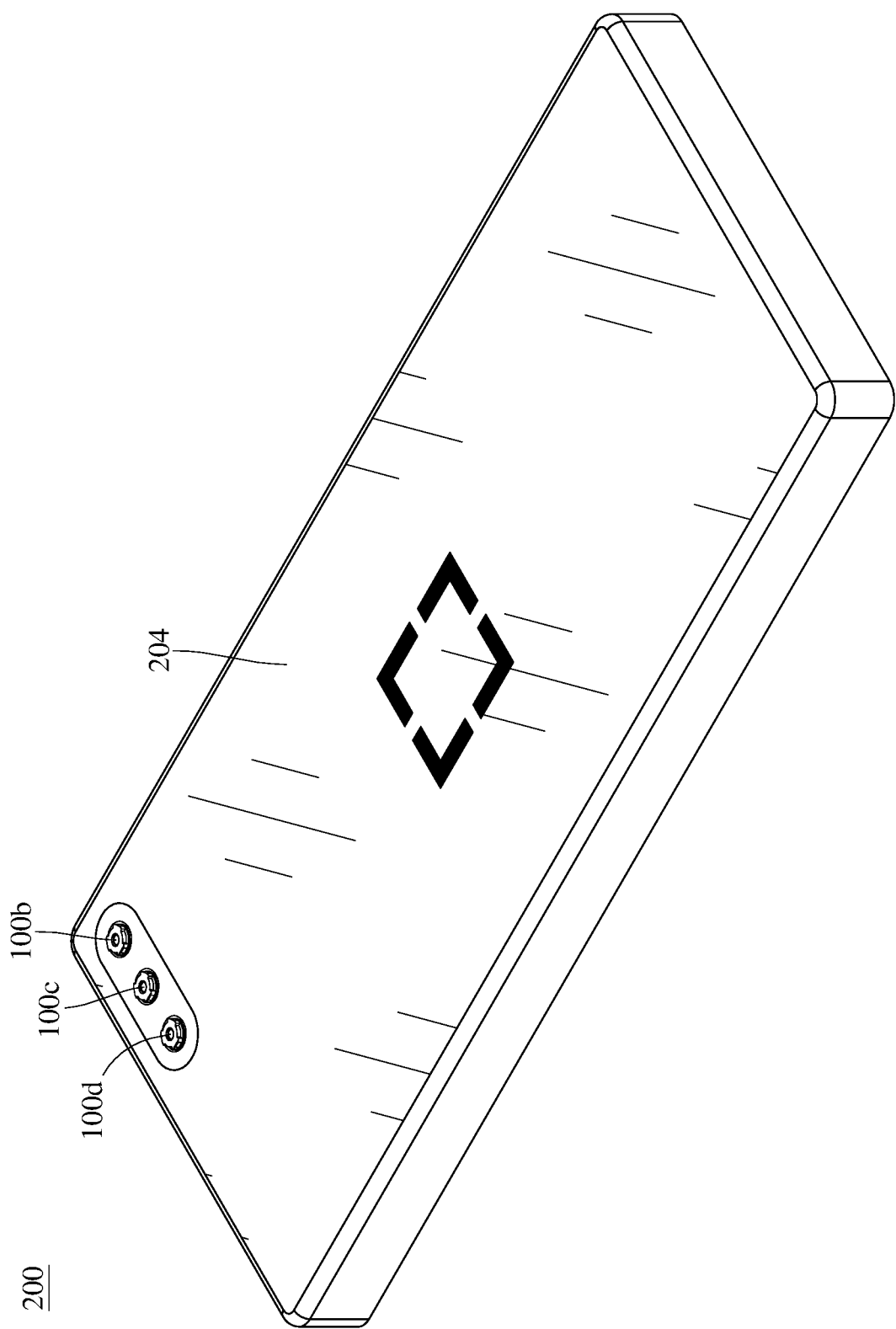
FIG. 19 is another perspective view of the electronic device in FIG. 18.
Figure 20:
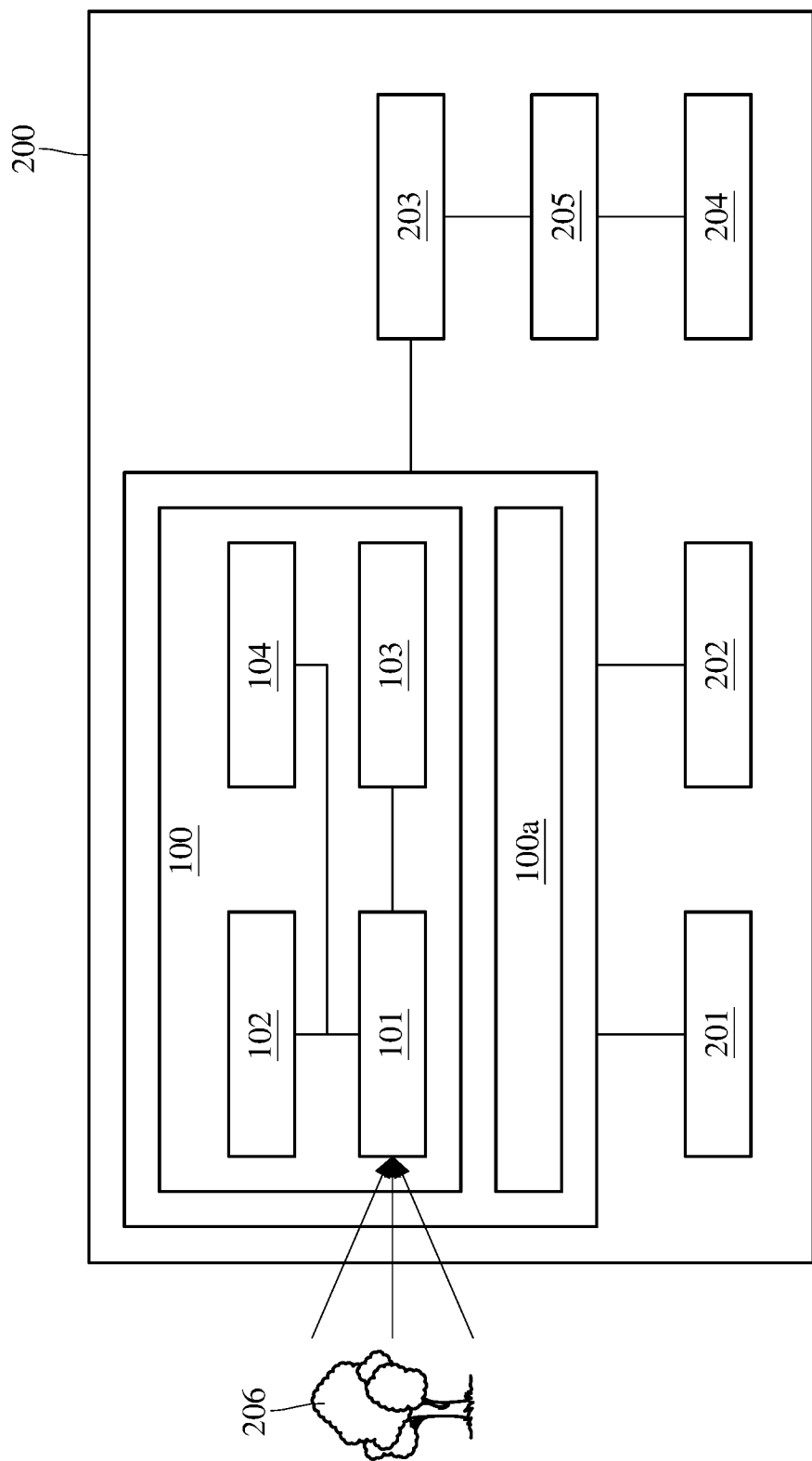
FIG. 20 is a block diagram of the electronic device in FIG. 18.

FIG. 18 is one perspective view of an electronic device according to the 10th embodiment of the present disclosure. FIG. 19 is another perspective view of the electronic device in FIG. 18. FIG. 20 is a block diagram of the electronic device in FIG. 18.

In this embodiment, an electronic device 200 is a smartphone including the image capturing unit 100 disclosed in the 9th embodiment, an image capturing unit 100a, an image capturing unit 100b, an image capturing unit 100c, an image capturing unit 100d, a flash module 201, a focus assist module 202, an image signal processor 203, a display module 204 and an image software processor 205. The image capturing unit 100 and the image capturing unit 100a are disposed on the same side of the electronic device 200. The focus assist module 202 can be a laser rangefinder or a ToF (time of flight) module, but the present disclosure is not limited thereto. The image capturing unit 100b, the image capturing unit 100c, the image capturing unit 100d and the display module 204 are disposed on the opposite side of the electronic device 200, and the display module 204 can be a user interface, such that the image capturing units 100b, 100c, 100d can be front-facing cameras of the electronic device 200 for taking selfies, but the present disclosure is not limited thereto. Furthermore, each of the image capturing units 100a, 100b, 100c and 100d can include the imaging lens system of the present disclosure and can have a configuration similar to that of the image capturing unit 100. In detail, each of the image capturing units 100a, 100b, 100c and 100d can include a lens unit, a driving device, an image sensor and an image stabilizer, and can also include a reflective element for folding optical path. In addition, each of the lens unit of the image capturing units 100a, 100b, 100c and 100d can include an optical lens assembly such as the imaging lens system of the present disclosure, a barrel and a holder member for holding the imaging lens system.

The image capturing unit 100 is a wide-angle image capturing unit, the image capturing unit 100a is an ultra-wide-angle image capturing unit, the image capturing unit 100b is a wide-angle image capturing unit, the image capturing unit 100c is an ultra-wide-angle image capturing unit, and the image capturing unit 100d is a ToF image capturing unit. In this embodiment, the image capturing units 100 and 100a have different fields of view, such that the electronic device 200 can have various magnification ratios so as to meet the requirement of optical zoom functionality. In addition, the image capturing unit 100d can determine depth information of the imaged object. In this embodiment, the electronic device 200 includes multiple image capturing units 100, 100a, 100b, 100c and 100d, but the present disclosure is not limited to the number and arrangement of image capturing units.

When a user captures images of an object 206, the light rays converge in the image capturing unit 100 or the image capturing unit 100a to generate images, and the flash module 201 is activated for light supplement. The focus assist module 202 detects the object distance of the imaged object 206 to achieve fast auto focusing. The image signal processor 203 is configured to optimize the captured image to improve image quality. The light beam emitted from the focus assist module 202 can be either conventional infrared or laser. In addition, the light rays may converge in the image capturing unit 100b, 100c or 100d to generate images. The display module 204 can include a touch screen, and the user is able to interact with the display module 204 and the image software processor 205 having multiple functions to capture images and complete image processing. Alternatively, the user may capture images via a physical button. The image processed by the image software processor 205 can be displayed on the display module 204.

11th Embodiment

Figure 21:
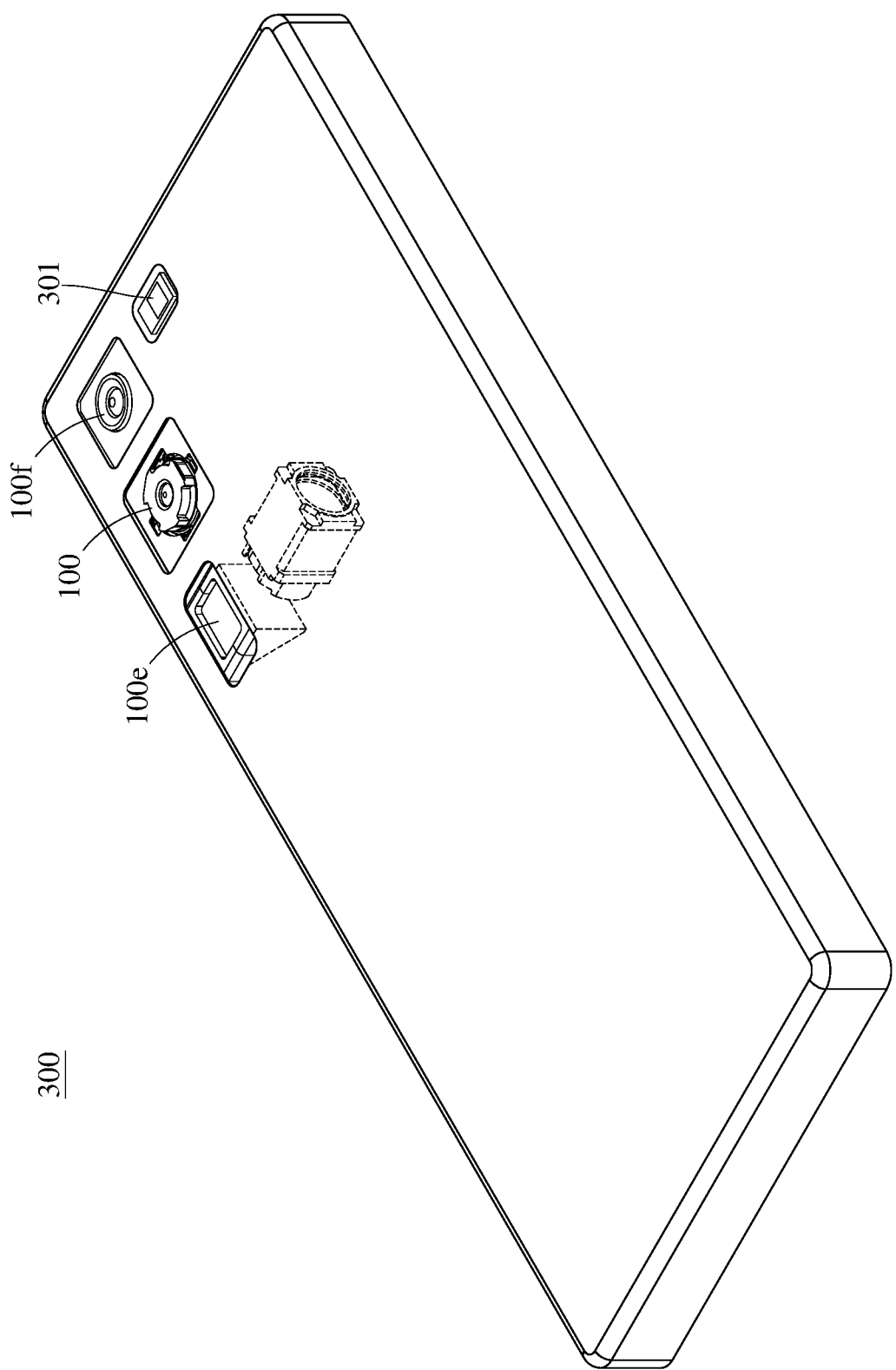
FIG. 21 is one perspective view of an electronic device according to the 11th embodiment of the present disclosure.

FIG. 21 is one perspective view of an electronic device according to the 11th embodiment of the present disclosure.

In this embodiment, an electronic device 300 is a smartphone including the image capturing unit 100 disclosed in the 9th embodiment, an image capturing unit 100e, an image capturing unit 100f, a flash module 301, a focus assist module, an image signal processor, a display module and an image software processor (not shown). The image capturing unit 100, the image capturing unit 100e and the image capturing unit 100f are disposed on the same side of the electronic device 300, while the display module is disposed on the opposite side of the electronic device 300. Furthermore, each of the image capturing units 100e and 100f can include the imaging lens system of the present disclosure and can have a configuration similar to that of the image capturing unit 100, and the details in this regard will not be provided again.

The image capturing unit 100 is a wide-angle image capturing unit, the image capturing unit 100e is a telephoto image capturing unit, and the image capturing unit 100f is an ultra-wide-angle image capturing unit. In this embodiment, the image capturing units 100, 100e and 100f have different fields of view, such that the electronic device 300 can have various magnification ratios so as to meet the requirement of optical zoom functionality. Moreover, the image capturing unit 100e can be a telephoto image capturing unit having a light-folding element configuration, such that the total track length of the image capturing unit 100e is not limited by the thickness of the electronic device 300. The light-folding element configuration of the image capturing unit 100e can be similar to, for example, one of the structures shown in FIG. 24 to FIG. 26, which can be referred to foregoing descriptions corresponding to FIG. 24 to FIG. 26, and the details in this regard will not be provided again. In this embodiment, the electronic device 300 includes multiple image capturing units 100, 100e and 100f, but the present disclosure is not limited to the number and arrangement of image capturing units. When a user captures images of an object, light rays converge in the image capturing unit 100, 100e or 100f to generate images, and the flash module 301 is activated for light supplement. Further, the subsequent processes are performed in a manner similar to the abovementioned embodiment, so the details in this regard will not be provided again.

12th Embodiment

Figure 22:
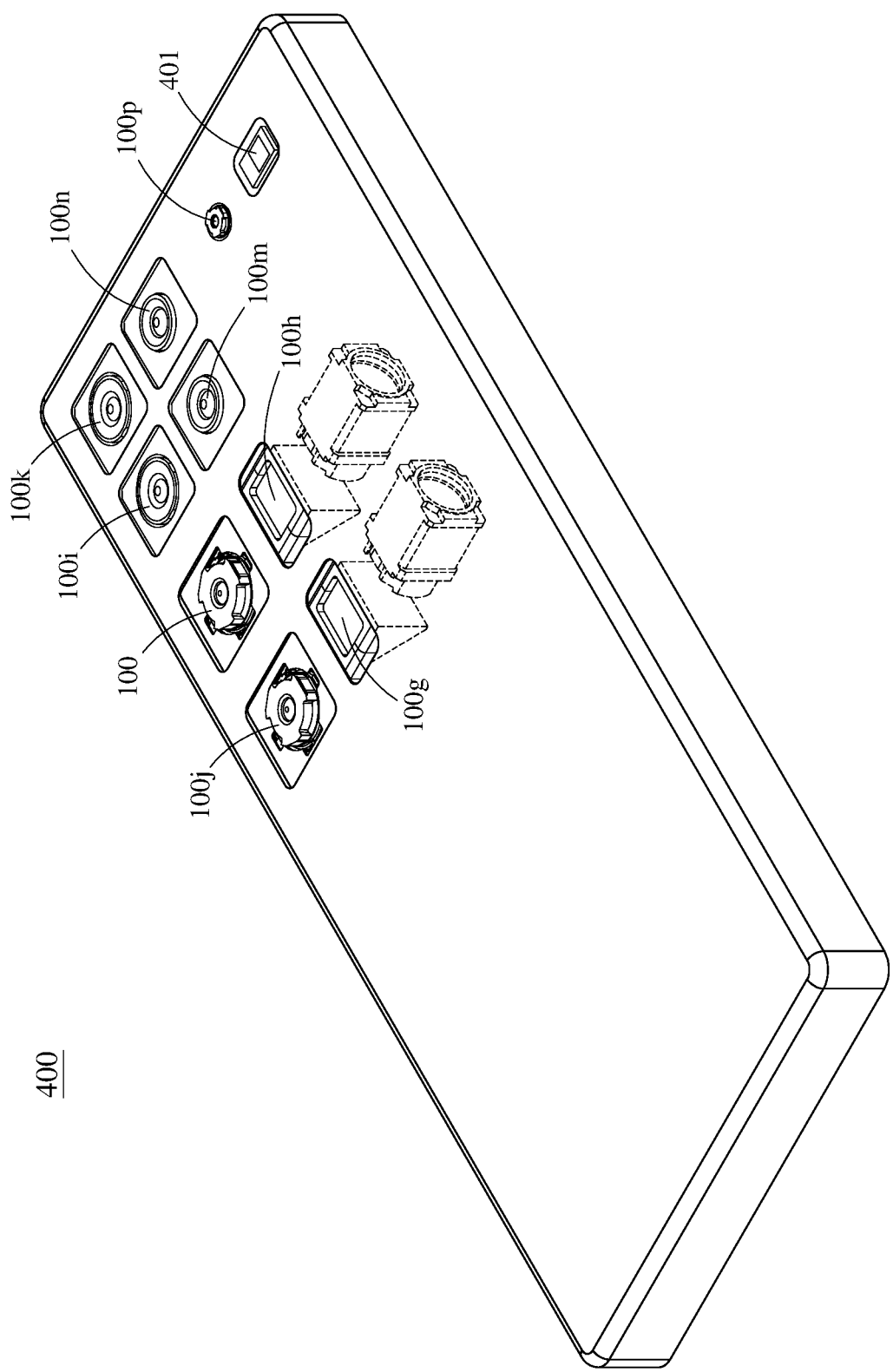
FIG. 22 is one perspective view of an electronic device according to the 12th embodiment of the present disclosure.

FIG. 22 is one perspective view of an electronic device according to the 12th embodiment of the present disclosure.

In this embodiment, an electronic device 400 is a smartphone including the image capturing unit 100 disclosed in the 9th embodiment, an image capturing unit 100g, an image capturing unit 100h, an image capturing unit 100i, an image capturing unit 100j, an image capturing unit 100k, an image capturing unit 100m, an image capturing unit 100n, an image capturing unit 100p, a flash module 401, a focus assist module, an image signal processor, a display module and an image software processor (not shown). The image capturing units 100, 100g, 100h, 100i, 100j, 100k, 100m, 100n and 100p are disposed on the same side of the electronic device 400, while the display module is disposed on the opposite side of the electronic device 400. Furthermore, each of the image capturing units 100g, 100h, 100i, 100j, 100k, 100m, 100n and 100p can include the imaging lens system of the present disclosure and can have a configuration similar to that of the image capturing unit 100, and the details in this regard will not be provided again.

The image capturing unit 100 is a wide-angle image capturing unit, the image capturing unit 100g is a telephoto image capturing unit, the image capturing unit 100h is a telephoto image capturing unit, the image capturing unit 100i is an ultra-wide-angle image capturing unit, the image capturing unit 100j is a wide-angle image capturing unit, the image capturing unit 100k is an ultra-wide-angle image capturing unit, the image capturing unit 100m is a telephoto image capturing unit, the image capturing unit 100n is a telephoto image capturing unit, and the image capturing unit 100p is a ToF image capturing unit. In this embodiment, the image capturing units 100, 100g, 100h, 100i, 100j, 100k, 100m and 100n have different fields of view, such that the electronic device 400 can have various magnification ratios so as to meet the requirement of optical zoom functionality. Moreover, each of the image capturing units 100g and 100h can be a telephoto image capturing unit having a light-folding element configuration. The light-folding element configuration of each of the image capturing unit 100g and 100h can be similar to, for example, one of the structures shown in FIG. 24 to FIG. 26, which can be referred to foregoing descriptions corresponding to FIG. 24 to FIG. 26, and the details in this regard will not be provided again. In addition, the image capturing unit 100p can determine depth information of the imaged object. In this embodiment, the electronic device 400 includes multiple image capturing units 100, 100g, 100h, 100i, 100j, 100k, 100m, 100n and 100p, but the present disclosure is not limited to the number and arrangement of image capturing units. When a user captures images of an object, the light rays converge in the image capturing unit 100, 100g, 100h, 100i, 100j, 100k, 100m, 100n or 100p to generate images, and the flash module 401 is activated for light supplement. Further, the subsequent processes are performed in a manner similar to the abovementioned embodiments, and the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the imaging lens system of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, aerial cameras, wearable devices, portable video recorders and other electronic imaging devices.

The foregoing description, for the purpose of explanation, has been described with reference to specific embodiments. It is to be noted that TABLES 1A-8C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;
   wherein the object-side surface of the second lens element is convex in a paraxial region thereof, the third lens element has positive refractive power, the image-side surface of the sixth lens element is concave in a paraxial region thereof, the object-side surface of the seventh lens element is concave in a paraxial region thereof, and at least one of the object-side surface and the image-side surface of at least one of the seven lens elements has at least one inflection point in an off-axis region thereof;
   wherein a central thickness of the third lens element is CT3, a central thickness of the fifth lens element is CT5, a central thickness of the sixth lens element is CT6, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, an axial distance between the sixth lens element and the seventh lens element is T67, a curvature radius of the object-side surface of the seventh lens element is R13, a focal length of the seventh lens element is f7, and the following conditions are satisfied:

$$3.4 < CT3/T23;$$

$$1.4 < T67/CT6 < 5.5;$$

$$0.98 < T34/T12 < 3.2;$$

$$1.00 < (T45+T56)/CT5 < 5.50; \text{ and}$$

$$0.20 < R13/f7 < 1.4.$$

2. The imaging lens system of claim 1, wherein the central thickness of the third lens element is CT3, the axial distance between the second lens element and the third lens element is T23, and the following condition is satisfied:

$$3.8 < CT3/T23 < 13.$$

3. The imaging lens system of claim 1, wherein the axial distance between the fourth lens element and the fifth lens element is T45, the axial distance between the fifth lens element and the sixth lens element is T56, the central thickness of the fifth lens element is CT5, and the following condition is satisfied:

$$1.15 < (T45+T56)/CT5 < 5.00.$$

4. The imaging lens system of claim 1, wherein the second lens element has negative refractive power, a focal length of the second lens element is f2, a focal length of the third lens element is f3, and the following condition is satisfied:

$$-1.75 < f2/f3 < -1.10.$$

5. The imaging lens system of claim 1, wherein the object-side surface of the third lens element is convex in a paraxial region thereof, a focal length of the imaging lens system is f, a focal length of the fourth lens element is f4, a focal length of the fifth lens element is f5, a focal length of the sixth lens element is f6, and the following condition is satisfied:

$$|f/f4|+|f/f5|+|f/f6| < 1.1.$$

6. The imaging lens system of claim 1, wherein a vertical distance between a critical point on the image-side surface of the sixth lens element and an optical axis is Yc62, a maximum effective radius of the image-side surface of the sixth lens element is Y62, and the image-side surface of the sixth lens element has at least one critical point in an off-axis region thereof satisfying the following condition:

$$0.20 < Yc62/Y62 < 0.85;$$

wherein a focal length of the imaging lens system is f, a curvature radius of the object-side surface of the sixth lens element is R11, a curvature radius of the image-side surface of the sixth lens element is R12, and the following condition is satisfied:

$$0 < (R11+R12)/f < 2.2.$$

7. The imaging lens system of claim 1, wherein at least one lens element of the imaging lens system has an average light transmission less than 10% at wavelengths of 700 nm to 1000 nm for infrared filtering.

8. An image capturing unit, comprising:
   the imaging lens system of claim 1; and
   an image sensor disposed on an image surface of the imaging lens system.

9. An electronic device, comprising:
the image capturing unit of claim 8.

10. An imaging lens system comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;
wherein the second lens element has negative refractive power, the object-side surface of the sixth lens element is convex in a paraxial region thereof, the image-side surface of the sixth lens element is concave in a paraxial region thereof, the object-side surface of the seventh lens element is concave in a paraxial region thereof, and at least one of the object-side surface and the image-side surface of at least one of the seven lens elements has at least one inflection point in an off-axis region thereof;
wherein a central thickness of the third lens element is CT3, a central thickness of the fifth lens element is CT5, a central thickness of the sixth lens element is CT6, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, an axial distance between the sixth lens element and the seventh lens element is T67, a curvature radius of the object-side surface of the seventh lens element is R13, a focal length of the seventh lens element is f7, and the following conditions are satisfied:

$3.4 < CT3/T23;$ $1.4 < T67/CT6 < 5.5;$ $0.98 < T34/T12 < 3.2;$ $1.00 < (T45 + T56)/CT5 < 5.50;$ and $0.20 < R13/f7 < 1.4.$ 11. The imaging lens system of claim 10, wherein the image-side surface of the second lens element is concave in a paraxial region thereof, at least one of the object-side surface and the image-side surface of each of at least two of the seven lens elements has at least one inflection point in an off-axis region thereof, and at least one of the object-side surface and the image-side surface of at least one of the seven lens elements has at least one critical point in an off-axis region thereof.

12. The imaging lens system of claim 10, wherein the axial distance between the first lens element and the second lens element is T12, the axial distance between the third lens element and the fourth lens element is T34, and the following condition is satisfied:

$1.1 < T34/T12 < 2.9.$

13. The imaging lens system of claim 10, wherein a central thickness of the first lens element is CT1, a central thickness of the second lens element is CT2, the central thickness of the third lens element is CT3, the axial distance between the third lens element and the fourth lens element is T34, and the following condition is satisfied:

$2.7 < (CT1 + CT2 + CT3)/T34 < 9.0.$

14. The imaging lens system of claim 10, wherein an f-number of the imaging lens system is Fno, half of a maximum field of view of the imaging lens system is HFOV, a maximum image height of the imaging lens system is ImgH, an axial distance between the image-side surface of the seventh lens element and an image surface is BL, and the following conditions are satisfied:

$1.4 < Fno < 2.0;$ $35.0 \text{ degrees} < HFOV < 50.0 \text{ degrees};$ and $6.5 < \text{Img}H/BL < 15.$ 15. The imaging lens system of claim 10, wherein the first lens element has positive refractive power, the object-side surface of the first lens element is convex in a paraxial region thereof, the image-side surface of the first lens element is concave in a paraxial region thereof, a curvature radius of the object-side surface of the first lens element is R1, a curvature radius of the image-side surface of the first lens element is R2, a focal length of the first lens element is f1, and the following condition is satisfied:

$0.75 < (R1 + R2)/f1 < 1.2.$

16. An imaging lens system comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;
wherein the third lens element has positive refractive power, the object-side surface of the sixth lens element is convex in a paraxial region thereof, the image-side surface of the sixth lens element is concave in a paraxial region thereof, the object-side surface of the seventh lens element is concave in a paraxial region thereof, and at least one of the object-side surface and the image-side surface of at least one of the seven lens elements has at least one inflection point in an off-axis region thereof;
wherein a central thickness of the third lens element is CT3, a central thickness of the fifth lens element is CT5, a central thickness of the sixth lens element is CT6, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, an axial distance between the sixth lens element and the seventh lens element is T67, a curvature radius of the object-side surface of the seventh lens element is R13, a focal length of the seventh lens element is f7, and the following conditions are satisfied:

$$3.4 < CT3/T23;$$
$$1.4 < T67/CT6 < 5.5;$$
$$0.85 < T34/T12 < 3.5;$$
$$1.25 < (T45 + T56)/CT5 < 4.50; \text{ and}$$
$$0.20 < R13/f7 < 1.4.$$

17. The imaging lens system of claim 16, wherein the axial distance between the sixth lens element and the seventh lens element is T67, the central thickness of the sixth lens element is CT6, and the following condition is satisfied:

$$1.5 < T67/CT6 < 4.5.$$

18. The imaging lens system of claim 16, wherein the axial distance between the fourth lens element and the fifth lens element is T45, the axial distance between the fifth lens element and the sixth lens element is T56, the central thickness of the fifth lens element is CT5, and the following condition is satisfied:

$$1.35 < (T45 + T56)/CT5 < 4.00.$$

19. The imaging lens system of claim 16, wherein a minimum value among the axial distance between the third lens element and the fourth lens element, the axial distance between the fourth lens element and the fifth lens element, the axial distance between the fifth lens element and the sixth lens element and the axial distance between the sixth lens element and the seventh lens element is minT37, a minimum value among a central thickness of the fourth lens element, the central thickness of the fifth lens element and the central thickness of the sixth lens element is minCT46, and the following condition is satisfied:

$$0.75 < \min T37/\min CT46 < 1.6.$$

20. The imaging lens system of claim 16, wherein a curvature radius of the image-side surface of the first lens element is R2, a curvature radius of the object-side surface of the second lens element is R3, a curvature radius of the image-side surface of the second lens element is R4, a curvature radius of the object-side surface of the third lens element is R5, and the following conditions are satisfied:

$$0.20 < R2/R3 < 1.3; \text{ and}$$
$$0.90 < R5/R4 < 2.1.$$

21. The imaging lens system of claim 16, wherein a composite focal length of the second lens element and the third lens element is f23, a focal length of the imaging lens system is f, and the following condition is satisfied:

$$4.0 < f23/f < 11.$$

22. The imaging lens system of claim 16, wherein the first lens element has positive refractive power, the second lens element has negative refractive power, an Abbe number of the first lens element is V1, an Abbe number of the second lens element is V2, an Abbe number of the third lens element is V3, and the following condition is satisfied:

$$5.0 < (V1 + V3)/V2 < 7.0.$$

23. The imaging lens system of claim 16, wherein a vertical distance between a critical point on the object-side surface of the sixth lens element and an optical axis is Yc61, a maximum effective radius of the object-side surface of the sixth lens element is Y61, and the object-side surface of the sixth lens element has at least one critical point in an off-axis region thereof satisfying the following condition:

$$0.20 < Yc61/Y61 < 0.80;$$

wherein an axial distance between the object-side surface of the first lens element and an image surface is TL, a maximum image height of the imaging lens system is ImgH, a chief ray angle at the maximum image height of the imaging lens system is CRA, and the following conditions are satisfied:

$$0.80 < TL/\text{Img}H < 1.4; \text{ and}$$
$$38.0 \text{ degrees} < CRA < 50.0 \text{ degrees}.$$

24. The imaging lens system of claim 16, wherein the seventh lens element has negative refractive power, the curvature radius of the object-side surface of the seventh lens element is R13, the focal length of the seventh lens element is f7, a maximum effective radius of the object-side surface of the first lens element is Y11, a maximum effective radius of the image-side surface of the seventh lens element is Y72, and the following conditions are satisfied:

$$0.30 < R13/f7 < 1.1; \text{ and}$$
$$1.5 < Y72/Y11 < 4.0.$$

* * * * *